United States Patent
Werth et al.

(10) Patent No.: US 9,304,827 B2
(45) Date of Patent: Apr. 5, 2016

(54) SYSTEMS AND METHODS FOR PROVIDING HIERARCHY OF SUPPORT SERVICES VIA DESKTOP AND CENTRALIZED SERVICE

(71) Applicant: PlumChoice. Inc., Billerica, MA (US)

(72) Inventors: Ted Werth, Bedford, MA (US); Josh Goldlust, Wakefield, MA (US); Chanchal Samanta, Acton, MA (US)

(73) Assignee: PlumChoice, Inc., Lowell, MA (US)

( * ) Notice: Subject to any disclaimer, the term of this patent is extended or adjusted under 35 U.S.C. 154(b) by 224 days.

(21) Appl. No.: 13/658,552

(22) Filed: Oct. 23, 2012

(65) Prior Publication Data

US 2013/0103973 A1    Apr. 25, 2013

Related U.S. Application Data

(60) Provisional application No. 61/550,741, filed on Oct. 24, 2011.

(51) Int. Cl.
*G06F 11/00* (2006.01)
*G06F 9/50* (2006.01)
*G06F 9/44* (2006.01)
*G06Q 10/06* (2012.01)

(52) U.S. Cl.
CPC ............ *G06F 9/5072* (2013.01); *G06F 9/4446* (2013.01); *G06Q 10/06* (2013.01)

(58) Field of Classification Search
CPC . G06F 11/3051; G06F 11/3055; G06F 11/34; G06F 11/3438
USPC .................................... 714/26, 38.14, 46, 57
See application file for complete search history.

(56) References Cited

U.S. PATENT DOCUMENTS

| | | | |
|---|---|---|---|
| 5,974,444 A | 10/1999 | Konrad | |
| 6,477,667 B1 * | 11/2002 | Levi et al. | 714/57 |
| 6,760,746 B1 | 7/2004 | Schneider | |
| 6,898,618 B1 | 5/2005 | Slaughter et al. | |
| 7,293,201 B2 * | 11/2007 | Ansari | 714/38.14 |
| 7,506,241 B2 * | 3/2009 | Chefalas et al. | 714/819 |
| 7,694,192 B2 * | 4/2010 | Bantz et al. | 714/57 |

(Continued)

OTHER PUBLICATIONS

US Office Action for U.S. Appl. No. 13/658,552 dated Jan. 20, 2015.

(Continued)

*Primary Examiner* — Dieu-Minh Le
(74) *Attorney, Agent, or Firm* — Foley & Lardner LLP; Christopher J. McKenna

(57) ABSTRACT

The present solution provides increases in automation, scalability and efficiency for delivering technical support services to devices. Systems and methods of the present solution provide a hierarchy or layers of automated desktop services with remote technical support services, which may be automated. The present solution provides an on desktop automation support system that detects and automatically remediates problems on a device of the user. If the problem is not fixed or fixable via local automated remediation at the desktop, a centralized service may remotely deliver technical support services to the device in the form of automated support services delivered to the device or remote technical agents connecting remotely with the device. With the combination of local support automation, remote support automation, remote and onsite technicians, the centralized service may deliver a hierarchy or multi-layers of services to any device.

22 Claims, 21 Drawing Sheets

(56) References Cited

U.S. PATENT DOCUMENTS

| | | | |
|---|---|---|---|
| 7,861,127 B2* | 12/2010 | Yamashita | 714/57 |
| 7,890,802 B2* | 2/2011 | Gerber | 714/26 |
| 8,141,164 B2 | 3/2012 | Kamath et al. | |
| 8,145,798 B1 | 3/2012 | Buck et al. | |
| 8,280,978 B2 | 10/2012 | Ansari et al. | |
| 8,375,251 B2* | 2/2013 | Ness et al. | 714/26 |
| 8,762,451 B2 | 6/2014 | Katzin et al. | |
| 2002/0129264 A1* | 9/2002 | Rowland et al. | 713/200 |
| 2003/0028827 A1* | 2/2003 | Gray | 714/46 |
| 2003/0229900 A1 | 12/2003 | Reisman | |
| 2005/0086630 A1* | 4/2005 | Chefalas et al. | 717/100 |
| 2005/0132253 A1* | 6/2005 | Gail et al. | 714/25 |
| 2005/0190769 A1 | 9/2005 | Smith | |
| 2008/0162249 A1 | 7/2008 | Leventhal | |
| 2008/0178093 A1 | 7/2008 | Brandl | |
| 2008/0208475 A1 | 8/2008 | Karr | |
| 2008/0215450 A1 | 9/2008 | Gates et al. | |
| 2009/0164853 A1* | 6/2009 | Gokhale et al. | 714/57 |
| 2010/0064046 A1 | 3/2010 | Jung et al. | |
| 2011/0072312 A1* | 3/2011 | Fan et al. | 714/46 |
| 2011/0154231 A1 | 6/2011 | Cherdron et al. | |
| 2011/0202380 A1 | 8/2011 | Vera et al. | |
| 2011/0202798 A1 | 8/2011 | Vera et al. | |
| 2011/0209064 A1 | 8/2011 | Jorgensen et al. | |
| 2011/0307548 A1 | 12/2011 | Fisk et al. | |
| 2012/0036442 A1 | 2/2012 | Dare et al. | |
| 2012/0069131 A1 | 3/2012 | Abelow | |
| 2012/0144242 A1* | 6/2012 | Vichare et al. | 714/39 |
| 2012/0174212 A1 | 7/2012 | Dart et al. | |
| 2012/0265872 A1* | 10/2012 | Chilton | 709/224 |

OTHER PUBLICATIONS

US Office Action for U.S. Appl. No. 13/658,530 dated Feb. 12, 2015.
US Office Action in U.S. Appl. No. 13/658,530 DTD Aug. 4, 2015.
US Office Action in U.S. Appl. No. 13/658,571 DTD Sep. 21, 2015.
US Office Action on U.S. Appl. No. 13/658,530 Dtd Dec. 9, 2015.
US Office Action on U.S. Appl. No. 13/658,571 Dtd Feb. 4, 2016.

* cited by examiner

SYSTEMS AND METHODS FOR PROVIDING HIERARCHY OF SUPPORT SERVICES VIA DESKTOP AND CENTRALIZED SERVICE

RELATED APPLICATION

The present application claims the benefit of and priority to U.S. Provisional Application No. 61/550,741 entitled "Systems and Methods For Configuring and Launching Automated Services To A Remote Device" filed on Oct. 24, 2011, which is ins incorporated herein by reference in its entirety for all purposes.

BACKGROUND

In a technical support and service environment, a multitude of concurrent customer support calls may be active at any given time. With the increase in number of concurrent calls, there is an increase need in personnel to handle each customer issue. Each of these support calls may require a support person to initiate a set of actions to be performed on a customer's device experiencing the issue or needing service. Even for relatively straightforward solutions, the support person needs to spend time with the customer to remedy the problem. As more and more calls are received, support personnel spends more and more time resolving problems with relatively straightforward solutions. This takes time and availability aware from the support personnel to deal with more complex issues.

SUMMARY

The present solution provides increases in automation, scalability and efficiency for delivering technical support services to devices. Systems and methods of the present solution provide a hierarchy or layers of automated desktop services with remote technical support services, which may be automated. The present solution provides an on desktop automation support system that detects and automatically remediates problems on a device of the user. If the problem is not fixed or fixable via local automated remediation at the desktop, a centralized service may remotely deliver technical support services to the device in the form of automated support services delivered to the device or remote technical agents connecting remotely with the device. With the combination of local support automation, remote support automation, remote and onsite technicians, the centralized service may deliver a hierarchy or multi-layers of services to any device. In one example, the centralized service may deliver the following hierarchy of services: 1) desktop automated remediation, 2) remote delivery of support automated solutions to perform a service on the device and 3) remote technicians remotely connecting to the device to perform a service.

In some aspects, the present solution is directed to a method for providing a hierarchy of automated local and remote support services to a device. The method includes detecting, by an agent executing on a device, a problem to be remediated on the device and performing, by the agent, automated remediation of the detected problem on the device. The method also includes determining, by a centralized service operating on one or more services remote to the device responsive to receiving a request for support on the device, a service to perform on the device. The method also includes communicating, automatically by the centralized service via a remote connectivity tool providing a remote connection to the device, a local automation service to the device to perform the service.

In some embodiments, the method includes detecting, by the agent, the problem with one or more of the following: network connectivity, compliance with a policy, resource usage and application issues. In some embodiments, the method includes monitoring, by the agent, a configuration of hardware and software on the device. In some embodiments, the method includes prompting, by the agent, a user of the device to select a self-healing automation tool to remediate the problem. In some embodiments, the method includes executing, by the agent, a self-healing automation tool to remediate the problem. In some embodiments, the method includes receiving, by the agent, from the centralized service a self-healing automation tool to remediate the problem. In some embodiments, the method includes determining automatically, by the centralized service responsive to the request, a type of work for the request and the service corresponding to the type of work. In some embodiments, the method includes communicating, automatically by a support automation tool of the centralized service, the local automation service to the remote device without interaction from a remote support agent. In some embodiments, the method includes establishing, automatically by the centralized service, the remote connection via the remote connectivity tool to the remote device. In some embodiments, the method includes transferring, automatically by the centralized service, access via the remote connection to the device to a remote support agent responsive to a predetermined event associated with execution of the local automation service. In some embodiments, the method includes transferring, automatically by the centralized service, access via the remote connection to the device to a remote support agent responsive to completion of the service via the local automation service.

In some aspects, the present solution is directed to a system for providing a hierarchy of automated local and remote support services to a device. The system may include an agent executing on a device that detects a problem to be remediated on the device and performs automated remediation of the detected problem on the device. The system may include a centralized service operating on one or more services remote to the device responsive to receiving a request for support on the device. The system may include a support automation tool determining a service to perform on the device. The system may also include a remote connectivity tool establishing a remote connection to the device. The support automation tool may automatically communicate via the remote connection to the device a local automation service to the device to perform the service.

In some embodiments, the agent detects the problem with one or more of the following: network connectivity, compliance with a policy, resource usage and application issues. In some embodiments, the agent monitors a configuration of hardware and software on the device. In some embodiments, the agent prompts a user of the device to select a self-healing automation tool to remediate the problem. In some embodiments, the agent executes a self-healing automation tool to remediate the problem. In some embodiments, the agent receives from the centralized service a self-healing automation tool to remediate the problem. In some embodiments, the support automation tool determines a type of work for the request and the service corresponding to the type of work. In some embodiments, the support automation tool automatically communicates the local automation service to the remote device without interaction from a remote support agent. In some embodiments, the remote connectivity tool automatically establishes, responsive to the request, the remote connection the device. In some embodiments, the centralized service automatically transfers access via the remote connection to the device to a remote support agent responsive to a predetermined event associated with execution of the local automation service. In some embodiments, the centralized service automatically transfers access via the remote connection to the device to a remote support agent responsive up completion of the service via the local automation service.

In some aspects, the present solution is directed to a method for providing a hierarchy of automated support services and remote agent support services to a remote device. The method may include receiving, by a centralized service operating on one or more services, a request for support on a remote device of a user. The centralized service, responsive to the request, may determine a plurality of services to perform on the remote device. The plurality of services comprising a first service to be provided by a local automation service and a second service to be provided by one of a plurality of remote support agents. The centralized service may automatically communicate via a remote connectivity tool providing a remote connection to the remote device, the local automation service to the remote device to perform the first service and transfer from the support automation tool to a remote support agent of the plurality of remote support agents, access to the remote device via the remote connectivity tool to perform the second service.

In some embodiments, the method includes receiving, by the centralized service, the request via a network from an agent executing on the remote device. In some embodiments, the method includes determining automatically, by the centralized service responsive to the request, a type of work for the request and the plurality of services corresponding to the type of work. In some embodiments, the method includes communicating, automatically by a support automation tool of the centralized service, the local automation service to the remote device without interaction from the remote support agent. In some embodiments, the method includes establishing, automatically by the centralized service, a remote connection via a remote connectivity tool to the remote device. In some embodiments, the method includes transferring, automatically by the centralized service, access to the remote device to the remote support agent responsive to a predetermined event associated with execution of the local automation service. In some embodiments, the method includes transferring, automatically by the centralized service, access to the remote device to the remote support agent responsive up completion of the first service. In some embodiments, the method includes communicating, by the remote support agent, via the remote connectivity tool to the remote device to perform the second service.

In some aspects, the present solution is directed to a method for providing a hierarchy of automated support services and remote agent support services to a remote device. The method may include receiving, by a centralized service operating on one or more services, a request for support on a remote device of a user. Responsive to the request, the centralized service may determine a hierarchy of services to perform on the remote device. The hierarchy of services comprising a first tier of one or more automated services and a second tier of one or more services provided by one or more remote support agents. The method may include delivering, automatically by the centralized service via a remote connectivity tool to the remote device responsive to the request, a local automation service to the remote device to perform one or more automated services of the first tier in the hierarchy of services; and communicating, by a remote support agent via the remote connectivity tool, to the remote device to perform one or more services of the second tier in the hierarchy of services on the remote device.

In some embodiments, the method includes executing, automatically by the centralized service via the remote connectivity tool to the remote device responsive to the request, the local automation service on the remote device. In some embodiments, the method includes transferring, by the centralized service, access via the remote connectivity tool to the remote device to the remote support agent automatically upon completion of the first tier of the one or more automated services. In some embodiments, the method includes transferring, by the centralized service, access from the support automation tool via the remote connectivity tool to the remote device to a second remote support agent to perform a service of the one or more services of the second tier.

BRIEF DESCRIPTION OF DRAWINGS

The foregoing and other objects, aspects, features, and advantages of the present invention will become more apparent and better understood by referring to the following description taken in conjunction with the accompanying drawings, in which.

DETAILED DESCRIPTION

Figure 1:
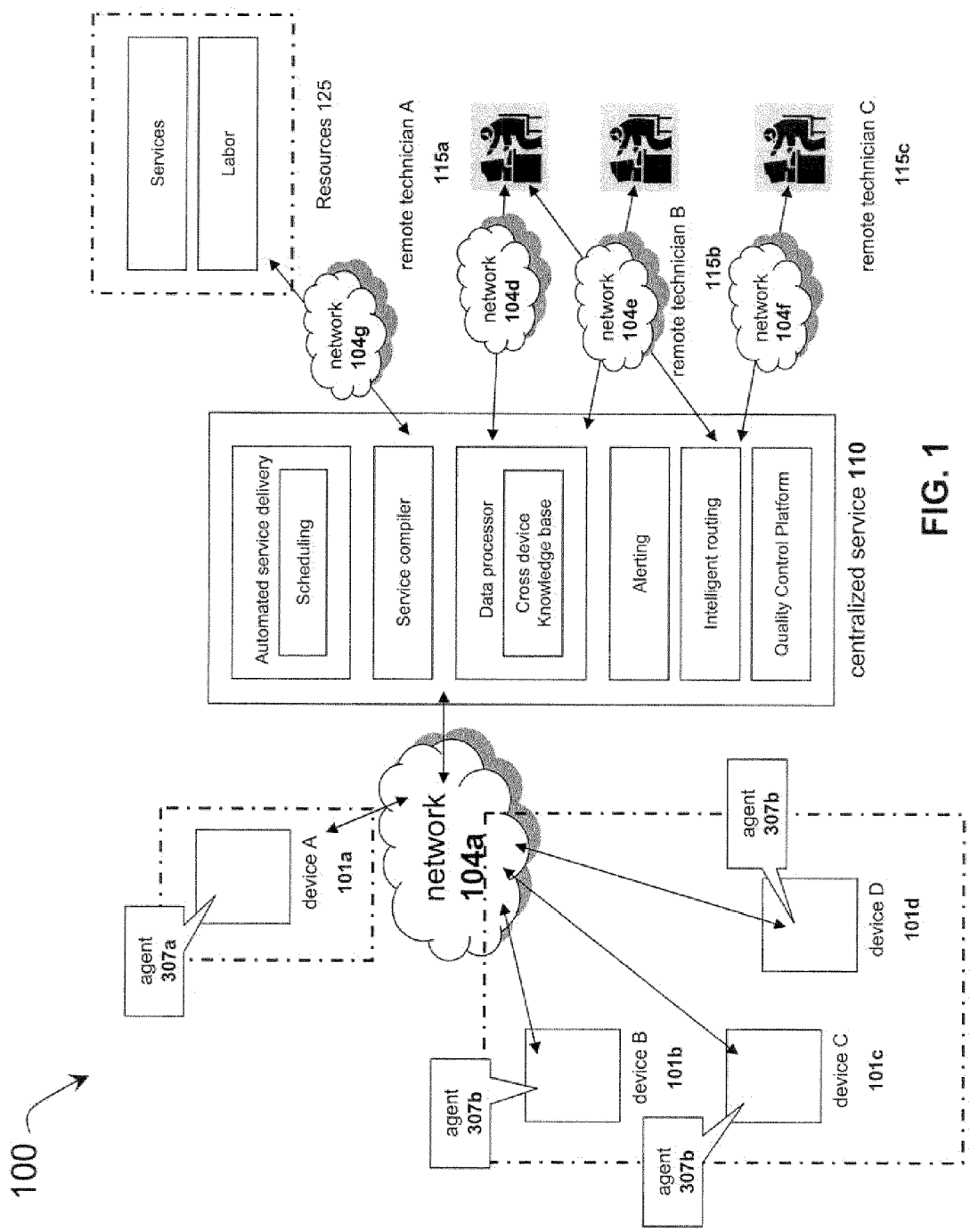
FIG. 1 is a block diagram that depicts an embodiment of an environment to provide resources to devices via a centralized service.

For purposes of reading the description of the various embodiments below, the following descriptions of the sections of the specification and their respective contents may be helpful:

Section A describes embodiments of systems and methods for delivering remote technical support via a centralized service;

Section B describes embodiments of systems and methods for delivering technical support via a hybrid of remote and local technical support;

Section C describes embodiments of systems and methods for delivering services via a Platform As A Service (PAAS);

Section D describes embodiments of systems and methods for an intelligent client to deliver services;

Section E describes embodiments of systems and methods for providing and using a cross-device database;

Section F describes embodiments of systems and methods for automated brokering of a remote connection to a device;

Section G describes embodiments of systems and methods for configuring and launching automated services to a device; and Section H describes embodiments of systems and methods for a hierarchy of desktop support services and remote centralized services.

A. Systems and Methods for Delivering Remote Technical Support Via a Centralized Service Referring to FIG. 1, a block diagram of an environment 100 to provide resources to one or more devices via a centralized service is shown and described. In brief overview, the system includes one or more devices 101a, 101b, 101c, 101d (101 in general) connected via one or more networks 104 to a centralized service 110. The centralized service 110 is connected via one or more networks 104 to resources 125. A customer or an agent 307 on a device 101 may request a resource for a device 101 from the centralized service 110, and in response, the centralized service 110 delivers the resource or arranges for access thereto. Resources may include software applications to install on the devices 101, software applications that render services for the devices 101, remote technicians 115a, 115b, 115c (115 in general) who connect remotely to provide support services, pools of labor who schedule on-site visits, or any other resource known to one of ordinary skill in the art.

The device 101 may comprise any type and form of electronic device. In one embodiment, a device 101 is any type of computing device such as a desktop computer or a laptop computer. In another embodiment, the device 101 is any electronic equipment capable of connecting to a network. In still another embodiment, the device 101 is any type and form of communications device. In yet another embodiment, the device 101 is a cellular phone. In one embodiment, the 101 is a BLACKBERRY device manufactured by Research in Motion (RIM) of Waterloo, Ontario, Canada. In another embodiment, the device 101 is a personal digital assistant (PDA) phone or smartphone such as one manufactured by Palm Inc. of Sunnyvale, Calif. In still another embodiment, the device 101 is an IPHONE manufactured by Apple Inc. of Cupertino, Calif.

In some embodiments, the device 101 is television, such as a High Definition Based television (HDTV), a Liquid Crystal Display (LCD) television, a Plasma based television, a Digital Light Processing (DLP) television, or a Cathode Ray Tube (CRT) based television. In some embodiments, the device 101 is a projector. In further embodiments, the device 101 can be a digital camera, a video cassette recorder (VCR), a digital video recorder (DVR) such as one manufactured by TiVo Inc. of Alviso, California, a printer, a telephone, a digital music player, a stereo, a printer, a scanner, a speaker, a cable box, a media server, or any other electronic gadget and equipment as apparent to one skilled in the art.

Furthermore, the device 101 may include a network interface to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface may comprise a built-in network adapter, network interface card, PCMCIA network card, card bus network adapter, wireless network adapter, USB network adapter, modem or any other device suitable for interfacing the device 101 to any type of network capable of communication and performing the operations described herein.

The device 101 may include any type and form of operating system, which control scheduling of tasks and access to system resources. In some embodiments, the device 101 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP and WINDOWS VISTA, all of which are manufactured by Microsoft Corporation of Redmond, Wash.; MacOS, manufactured by Apple Computer of Cupertino, California; OS/2, manufactured by International Business Machines of Armonk, N.Y.; and Linux, a freely-available operating system distributed by Caldera Corp. of Salt Lake City, Utah, or any type and/or form of a Unix operating system, among others.

Each device 101 may be associated with a customer account on the centralized service 110. A customer account may include a single device 101 or multiple devices 101. Devices 101 receive resources delivered by the centralized service 110. In some embodiments, a customer uses a device 101 associated with the customer account to request the resource. For example, the customer may press a button on a personal digital assistant (PDA) or an icon on a smartphone to contact a customer service representative, and the representative may cause the centralized service 110 to deliver the resource to the device 101. In other embodiments, a customer uses a separate device to request the resource for the device 101. In some embodiments, a customer may dial a service number using a telephone to speak with a representative. In additional embodiments, a customer may access a web portal associated with the centralized service 110 using a computer and complete a work order form. The computer may submit the completed work order form to the centralized service 110 for processing and subsequent delivery of resources to the device 101 associated with the customer account. In other embodiments, an agent 307 on the device 101 requests the resource, as explained in further detail below.

The agent 307 may be, for example, implemented as a software program and/or as a hardware device, such as, for example, an ASIC or an FPGA. The agent 307 may comprise any program, application, process, task or set of executable instructions capable of connecting to and communicating with the device 101 or the centralized service 110. In some embodiments, the agent 307 may be a daemon process or network driver for listening, receiving and/or sending communications for an application, such as email, database or an enterprise application. In some embodiments, the agent 307 may communicate on a specific IP address, or IP address and port. In some embodiments, the agent 307 may comprise a collection of agents. In some embodiments, the agent 307 includes remote assist technology, such GoToAssist technology manufactured by Citrix Online, LLC of Santa Barbara, Calif., part of Citrix Systems, Inc. of Ft. Lauderdale, Fla. or Bamboo technology manufactured by Atlassian Pty Ltd. of Sydney, Australia. In various embodiments, the agent is configured to connect to the centralized service 110. The agents 307 on various devices may be integrated into a common application programming interface (API).

In some embodiments, service personnel may install a hardware agent 307 on a device 110 at a point of service. In other embodiments, a customer may cause a software agent 307 to be downloaded to a device. For example, a customer may create a customer account using the device 101 and download the agent 307 onto the device 101. In other examples, a customer may add a device 101 to a customer account, and the centralized service 110 may deliver an agent 307 to the device 101. The customer may request delivery of a resource to the device 101, and the centralized service 110 may automatically add the device 101 to the customer account and deliver an agent 307 in conjunction with the requested resource. In some embodiments, the customer requests access to a remote technician 115, and the remote technician 115 downloads an agent 307 onto the device 101. In various embodiments, an agent 307 on one device 101 initiates the delivery of an agent to another device 101. An agent 307 on one device may detect the presence of a device 101 newly added to an environment. The agent 307 may communicate with the centralized service 110 to deliver an agent 307 to the newly connected device, or the agent 307 may replicate itself to deliver an agent 307 directly to the device. In these embodiments, the agent 307 communicates with the centralized service 110 to add the new device 101 to the customer account.

The agent 307 communicates with the centralized service 110 to deliver resources to the device 101. The agent 307 and service 110 cooperate to improve or optimize the overall quality of resources the device 101 receives. The agent 307 may discover information regarding the device 101. The agent 307 may collect information regarding an individual device 101 or multiple devices 101 in an environment. The agent 307 may communicate the information to the centralized service 110 for storage and analysis. The agent 307 may coordinate with the centralized service 110 to deliver resources to the device 101, and in some embodiments, the agent 307 may first provision the device 101 to accommodate the resources. The agent 307 may perform diagnostics upon the device 101. The agent 307 may generate reports regarding the history and performance of the device 101. The agent 307 may communicate with the centralized service 110 to generate alerts for recommended service actions or identify potential problems. The agent 307 may provide targeted advertising, and subsequently work order forms, for products and services. The agent 307 may generate alerts or targeted advertising according to the results of discovery, data collection, diagnostics, or any other event known to persons of ordinary skill in the art.

In one embodiment, the centralized service 110 is executed on one or more servers. The server may be referred to as a file server, application server, web server, proxy server, or gateway server. In some embodiments, the server may have the capacity to function as either an application server or as a master application server. In one embodiment, the system 100 may include multiple, logically-grouped servers. In these embodiments, the logical group of servers may be referred to as a server farm. In some of these embodiments, the servers of the farm may be geographically dispersed. In some cases, a farm may be administered as a single entity. In other embodiments, the server farm comprises a plurality of server farms. In one embodiment, the server and/or server farm executes one or more applications on behalf of the centralized service 110. The servers within each farm can be heterogeneous. One or more of the servers can operate according to one type of operating system platform (e.g., WINDOWS NT, manufactured by Microsoft Corp. of Redmond, Wash.), while one or more of the other servers can operate on according to another type of operating system platform (e.g., UNIX or Linux). The group of servers logically grouped as a farm may be interconnected using a wide-area network (WAN) connection or metropolitan area network (MAN) connection. Data transmission speeds between servers in the farm 38 can be increased if the servers are connected using a local-area network (LAN) connection or some form of direct connection.

The centralized service 110 organizes, coordinates, and optimizes the delivery of resources to the devices 101. The centralized service 110 may include a service compiler that aggregates information about the resources and acts as a subscription or point product offering of various resources for sale to the devices 101. In some embodiments, the centralized service 110 aggregates the resources by offering itself as a platform as a service (PaaS). The centralized service 110 may include an automated service delivery unit that communicates with the service compiler, the agents 307, a data processor, an alert generator, or any combination thereof to deliver automatically a resource to a device 101. A scheduling unit of the automated service delivery unit may store and process action items for delivering various types of resources to devices 101 according to various rules.

The data processor may store information about customer accounts and individual devices. The data process may also store in a cross device knowledge base information received from customers, OEMs, agents, and remote technicians about compatibility or conflicts associated with various combinations of devices and resources. Additionally, the data processor may include an engine that analyzes information about devices and combinations thereof and store the results in the knowledge base. The alert generator may generate and send alerts to agents regarding recommended services or potential problems, and the generator may communicate with the cross device knowledge base, the automated service delivery unit, any other unit, or any combination thereof to decide when and how to generate an alert.

The centralized service 110 may include an intelligent routing unit. The intelligent routing unit may communicate with other units on the centralized service 110 or agents 307 to determine which resource shall be delivered to a device 101. The centralized service 110 may include a quality control platform to monitor and assess the quality of the services being delivered to the devices.

Although FIG. 1 shows a plurality of networks including network 104*a* between the devices 101 and the centralized service 110 and networks 104*d*-104*g* between the centralized service 110 and the resources, any or all of the devices 101, the centralized service 110, and the resources may be on the same network 104. In one embodiment, any of the networks 104 may be the same type of network or different types of networks. The network 104 can be a local-area network (LAN), such as a company Intranet, a metropolitan area network (MAN), or a wide area network (WAN), such as the Internet or the World Wide Web. The network(s) 104 may be a private or public network. In one embodiment, the network of the devices 101 may be a private network and network of the centralized services or resources may be a public network, or vice versa. In another embodiment, the network of the centralized services and the network of the devices may be private networks. In still another embodiment any network 104 may include one or more networks of different kinds as apparent to one of ordinary skill in the art.

In one embodiment, the network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may comprise a wireless link, such as an infrared channel or satellite band. In another embodiment, the topology of the network may be a bus, star, or ring network topology. In other embodiments, the network and network topology may be of any such network or network topology as known to those ordinarily skilled in the art capable of supporting the operations described herein.

In some embodiments, the centralized service 110 may connect to the devices 101 using any type and form of protocol, such as any internet protocols for communications. Examples of such protocols include but are not limited to application layer protocols such as HyperText Transfer Protocol (HTTP) and Dynamic Host Configuration Protocol (DHCP), transport layer protocols such as Transmission Control Protocol (TCP) and User Datagram Protocol (UDP), network layer protocols such as Internet Protocol (IP), datalink layer protocols such as IEEE 802.11, Token Ring and Ethernet and physical layer protocols such as RS-232 and Synchronous Optical Networking (SONET). In some embodiments, secure communications between a resource and the centralized service 110 are established via encryption, for example via a secure socket layer (SSL) or a virtual private network (VPN). In other embodiments, secure communications between the resources and the device 101 are established via encryption, for example via a secure socket layer (SSL) or a virtual private network (VPN). In yet another embodiment, end to end security is established between the resource and the device 101. With secured communications, the privacy of the data on a device 101 may be protected and/or maintained. Because of the ubiquity of networks, network connectivity and the internet the systems and methods of the system described herein is available in just about any possible customer scenario as apparent to one ordinarily skilled in the art.

Various types and forms of resources may be connected to the centralized service 110 for delivery to or access for the devices 101. In some embodiments, the resources may be proprietary or licensed by the centralized service provider. In additional embodiments, the resources may be third-party resources. In some embodiments, the resources may be software applications. For example, the software applications may be programs available for purchase, download, and/or installation from the centralized service 110. In another example, the software applications may be programs delivered to and executed on devices 101 to provide services. In other embodiments, the resources may be remote technicians. The remote technicians may connect to the devices 101 via the network 104 and perform any type and form of support, service, and repair on the devices 101. In additional embodiments, the resources may be pools of labor. Labor may arrive at any site and performance any type and form of physical activity for a devices, such as installation, network set-up and configuration, or physical moves.

Figure 2:
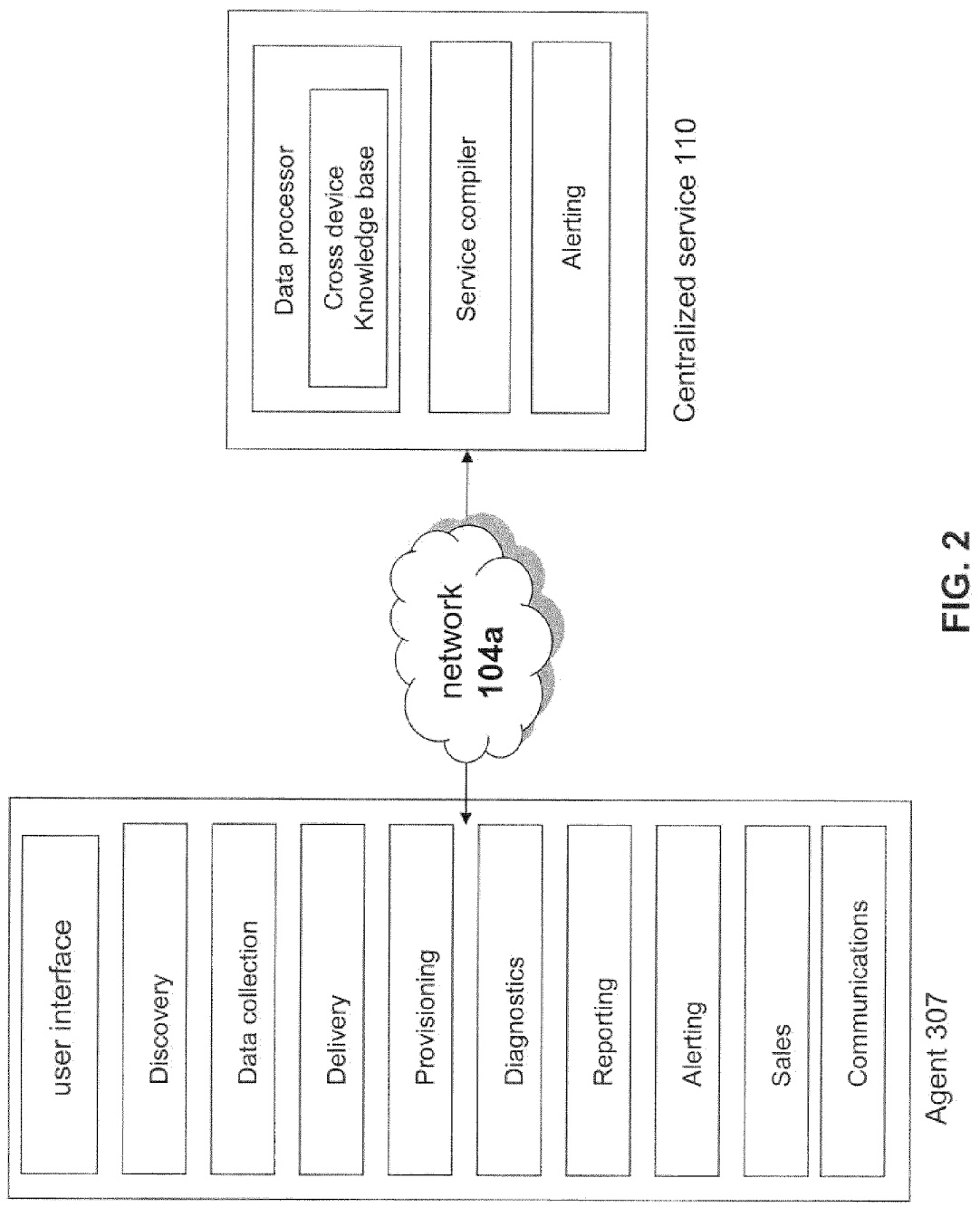
FIG. 2 is a block diagram that depicts an embodiment of an environment including an agent on a device in communication with a centralized service to provide resources to the device.

Referring now to FIG. 2, a block diagram of an example of an agent 307 is shown and described. The agent 307 may exist on a single device 101 or multiple devices associated with a customer account. In the latter case, the agent 307 may be integrated to a common application programming interface (API). The agent 307 may execute functions such as discovery, data collection, delivery, provisioning, diagnostics, reporting, alerting, and sales. For some of these functions, the agent 307 may communicate with the centralized service 110 over a network 104 to perform the execution.

In various embodiments, the agent 307 may discover any information regarding the device 101, such as any operational and/or performance related characteristics of the device or any hardware and/or software of the device. For example, the agent 307 may discover the manufacturer, the product line, the model, or any combination thereof for the device 101. The agent 307 may discover any information of any component or software on the device 101. For example, the agent 307 may discover the manufacturer, model, or speed of a processor. The agent 307 may discover the size of the hard drive and amount of available memory. The agent 307 may discover the type and version of the operating system running on the device 101. The agent 307 may discover the type and version of the office suite, media player, anti-virus protection, malware protection, operating system, or any other type of software installed on the device 101. The agent 307 may discover any information stored in a registry on the device 101. The agent 307 may discover information regarding the configuration of hardware, the operating system, any other software installed on the device 101. The agent 307 may discover information regarding the configuration of settings for services from the centralized service 110. The agent 307 may discover the resolution and size of a display of the device 101. The agent 307 may discover the communication capabilities of the device 101. For example, the agent 307 may discover that a smartphone operates on the T-Mobile network or a computer has a Bluetooth interface. The agent 307 may discover the number and type of input/output interfaces on the device 101, as well as information regarding the peripherals or other devices connected to the device 101. The agent 307 may discover the audio capabilities of the device 101.

The agent 307 may store the discovered information about a device 101 to storage or memory. The storage or memory may be located on the device 101 or the centralized service 110. In some embodiments, the agent 307 may store the information in a designated directory on the device 101. In other embodiments, the agent 307 may communicate with the centralized service 110 to store the information on the service. The information may be associated with a customer account. The information about the device 101 may be stored alone or in conjunction with information about other devices associated with the customer account. The agent 307 or the centralized service 110 may access the information at any time, whether the information is stored on the device 101 or the centralized service 110.

Discovery of information about a device 101 may occur at any time. In some embodiments, the user schedules the discovery of information. In many embodiments, the centralized service 110 schedules the discovery of information and instructs the agent 307 regarding the scheduling. In additional embodiments, the discovery of information occurs on an ad hoc basis. In some embodiments, the agent 307 discovers information about a device 101 when the agent 307 is installed upon the device. In other embodiments, the agent 307 discovers information at predetermined, periodic intervals and stores the updated information on the device 101 or the centralized service 110. In other embodiments, the agent 307 discovers information when the device 101 detects that a new device, such as a peripheral, has been connected or disconnected. In additional embodiments, the agent 307 discovers information when the device 101 detects that new components or software have been installed or removed.

In various embodiments, the agent 307 may collect data about a device 101 or multiple devices. In some embodiments, the agent 307 may collect data when the agent 307 discovers information about a device 101. The data may relate to the compatibility or conflicts regarding hardware and/or software on the device 101 or across devices. In some examples, the agent 307 may collect data on whether a software application can be successfully installed on a device 101 running a known operating system and set of other applications. In another example, a customer may wish to install a graphics-intense video game on a home entertainment system including a PC desktop running Windows VISTA, an Apple laptop running Mac OS in conjunction with VMware Fusion, a plasma television, and a Sony PSP. The agent 307 on the PC desktop and the agent 307 on the Apple laptop may collect data on whether the game can be installed to their respective devices. The agents may also collect data on whether their respective devices can communicate with one another and/or the Sony PSP to provide a networked gaming environment.

In another example, a customer may wish to install open source media development software on a home office system. The home office may include a PC laptop running Linux, an iPhone, an electronic photo album, and a speaker system. The agent 307 on the laptop may collect data on whether the software may be installed and whether the software can receive media files from the iPhone or electronic photo album for incorporation into projects in progress via the software. The agent 307 on the laptop may collect data on whether the software can communicate with the speaker system. The agent 307 on the iPhone may collect data on whether the iPhone can communicate with the laptop to accept and play media files developed by the software.

In many embodiments, the agent 307 may collect data when new hardware or software is installed upon the device 101. In some embodiments, the agent 307 may collect data whenever a customer initiates an action requiring communicate between devices using new or recently installed hardware or software. In many embodiments, the agent 307 may transmit the collected data to the centralized service 110 for storage and analysis. The centralized service 110 may store and analyze the data in the data processor and/or cross device knowledge base, as will be described in more detail below.

In various embodiments, the agent 307 performs diagnostics. The agent 307 may perform diagnostics on any hardware or software of the device. The agent 307 may perform diagnostics to identify configuration issues, sources of unsatisfactory performance, sources of instability, security vulnerabilities, privacy vulnerabilities, or any combination thereof. In many embodiments, the agent 307 may perform diagnostics in response to device events, at predetermined intervals, in response to customer initiatives, or any combination thereof. For example, the agent 307 may monitor the device to detect when a component has failed, the display has frozen, or the system has crashed and requires rebooting, and the agent 307 then performs diagnostics to identify the source of the malfunction. In other examples, the agent 307 may periodically scan system files to detect activities that may be slowing processing speeds or review the operating systems for known vulnerabilities. In additional examples, a customer may submit a work order to the centralized service 110 explaining her dissatisfaction with the device's performance, and the agent 307 may communicate with the centralized service 110 to perform diagnostics appropriate for the customer's concerns.

In many embodiments, the agent 307 may execute any procedure or run any application to perform the diagnostics. In some embodiments, the agent 307 may check the device configuration for problematic settings. In other embodiments, the agent 307 may evaluate processes running on the device 101 to identify potential viruses that are consuming processing capacity. In additional embodiments, the agent 307 may run applications that perform diagnostics, such as anti-virus or malware software. In other embodiments, after exhausting diagnostic capabilities at its immediate disposal, the agent 307 may communicate with the centralized service 110 to deliver more diagnostic resources to the device 101. In some embodiments, the agent 307 may request connection between the device 101 and a remote technician 115 for additional diagnostic support. In any of these embodiments, the agent 307 may use the results of the diagnosis to deliver resources to remedy the source of failure or sub-optimal performance, as will be explained in more detail below.

In various embodiments, the agent 307 may provision the device 101 for new or updated resources. In many embodiments, the agent 307 may provision the device 101 automatically. The automatic provisioning may occur in response to an alert or prior to delivery of software or services. In various embodiments, the agent 307 may provision the device 101 according to a scheduled basis. The agent 307 may refer to the user account to determine the schedule. In some embodiments, the agent 307 may provision the device 101 on an ad hoc basis. In many embodiments, the agent 307 may provision the device 101 upon confirmation that a user has approved the provisioning. In some of these embodiments, the agent 307 may appropriate and configure components for the resource. In other embodiments, the agent 307 may organize and expand the device capabilities to accommodate the resource. In many embodiments, the agent 307 may coordinate with the service compiler on the centralized service 110 to deliver a resource to the device 101. In some of these embodiments, the agent 307 and centralized service 110 may coordinate to deliver resources automatically according to predetermined rules, as will be explained in more detail below. In some embodiments, provisioning may include installing software or hardware on the device 101. In various embodiments, provisioning may include configuring and testing installed software or hardware on the device 101.

In various embodiments, the agent 307 may generate alerts, either alone or in conjunction with the centralized service 110, to recommend any type and form of product, service, or action. Through these alerts, the centralized service provider may exert more control over the customers' awareness of offered products and services, instead of relying on third-party channels of information and communication. The agent 307 may couple each alert with a work order form to facilitate the customer's acceptance of a recommended product or service. In some embodiments, the alerts may generate recommendations to optimize the customer's current use of his devices. In other embodiments, the recommendations serve to expand the customer's knowledge of available resources. The alerts may leverage information gathered through discovery, diagnosis, the customer's historical behavior, or any other collected data.

In many embodiments, the agent 307 may generate alerts to recommend provisioning actions. In one example, the agent 307 may diagnose a moderate amount of fragmentation on the device's 101 hard drive. The agent 307 may analyze how frequently the customer installs new applications or creates new files and recognize that the hard drive will become inadequate to support the customer's needs in the short-term. As a result, the agent 307 may generate an alert to recommend defragmentation of the hard drive to optimize the device's capacities. In another example, the agent 307 may begin to deliver a resource in response to a customer's work order form and detect that the resource requires greater access than the device's 101 privacy settings allow. The agent 307 may generate an alert to inform the customer of the necessary change before fulfilling the order.

In numerous embodiments, the agent 307 may generate alerts to recommend products or services. In many embodiments, the agent 307 may generate alerts in real-time. In some embodiments, the agent 307 may generate alerts on a scheduled basis. In various embodiments, the user may configure his account to determine when the agent 307 may generate alerts. In many embodiments, the agent 307 may refer to the user account or the centralized service 110 to determine when to generate alerts. In some embodiments, the agent 307 may generate alerts according to the user's type of subscription to the centralized service 110. In other embodiments, the agent 307 may generate alerts according to the level of complexity associated with the user's account. In various embodiments, the agent 307 may allow users to purchase products or services through the alerts. In some embodiments, the agent 307 may allow users to change their subscriptions through the alerts. In many of these embodiments, the agent 307 identifies the change to the subscription and adds, removes, or modifies products or services in the user account.

In some embodiments, the agent 307 may generate alerts based on discovered information. For example, the agent 307 may discover that a smartphone newly added to the customer's account has anti-virus protection, but no malware protection. In response, the agent 307 may generate an alert regarding the lack of malware protection and provide a work order form for malware resources available through the centralized service 110 and compatible with the smartphone. In another example, the agent 307 may test a component and note significant performance degradation since the last testing. The agent 307 may generate an alert warning the customer of potential component failure and provide work order forms for recommended replacement components and installation services. In another example, the agent 307 may discover that the device 101 is running older versions of software applications. The agent 307 may generate an alert to inform the customer that newer versions are available and provide a work order form for upgrades. The agent 307 may also generate this alert upon communications from the service compiler on the centralized service 110 that new versions and upgrades for software are available.

In other embodiments, the agent 307 may generate alerts based on the customer's historical data stored on the centralized service 110. In one example, a customer may historically configure her devices to the same level of privacy control. When the customer adds a new device 101 to her account and downloads an agent 307, the agent 307 may compare the privacy settings on the device to the customer's preferences and generate an alert if the settings do not match. In another example, a customer may historically add the same set of applications to devices used for business purposes. When the customer adds a new device 101 to her account, the agent 307 may determine whether the device 101 may be used for business purposes and generate an alert to add the preferred set of applications. As such, the agent 307 would generate this alert for a personal digital assistant (PDA) or desktop, but not for a television, camera, or set of speakers. In another example, the centralized service 110 may know that a customer's laptop and smartphone include the same application that recommends restaurants based on geographic location. When the customer adds a GPS system to her account, the agent 307 installed on the GPS system may generate an alert to install the restaurant recommendation application appropriate for the GPS system.

In another example, a device 101 may demonstrate a history of vulnerability or instability. The agent 307 may generate an alert to recommend services to identify sources of the vulnerability or instability and the appropriate remedies. Thus, an agent 307 may note that a device 101 has sought performance-related support once a week over the past month, and each investigation has discovered and eliminated spyware processes slowing down the device 101. The agent 307 may generate an alert to recommend anti-spyware programs compatible with the device.

Although the agent 307 generates alerts based on discovered information about the devices 101 or customers' historical data in the embodiments described herein, the agent 307 may generate alerts based on any type or kind of information, or combination thereof, known to persons in the art.

In various embodiments, the agent 307 may generate alerts to display advertisements to the customer. The agent 307 may display general or targeted advertisements. The agent 307 may display advertisements for the centralized service's proprietary or licensed resources or those owned by third parties. The agent 307 may display advertisements according to customer preferences regarding form, type, and content. The agent 307 may communicate with the centralized service 110 to select advertisements for display. The advertisements may facilitate the sale of products or services by providing access to order forms, which the centralized service may process and/or fulfill.

The advertisements may use any information to select advertisements for display. In one embodiment, the agent 307 may use information from the service compiler to advertise promotions for products or services. In another embodiment, the agent 307 may use information from the cross device knowledge base to cross-sell popular products and services known to be compatible with the customer's devices. In some embodiments, the agent 307 may use any information associated with a customer. For example, the agent 307 may use information about the customer's devices or the customer's history of usage. The agent 307 may display advertisements for hardware components with greater speeds or capacities than components on the customer's devices. The agent 307 may display advertisements for new releases of media players after observing that the customer frequently orders services associated with entertainment.

In various embodiments, the agent 307 may generate reports about the device 101. The report may contain information stored on the device 101, the centralized service 110, or both. In some embodiments, the report may contain information associated with the device's 101 hardware or software. In many embodiments, the report may contain information associated with the device's 101 use of the centralized service. In some embodiments, the report may contain information associated with the device's 101 performance. In all these embodiments, the report may categorize the information. The information may be categorized according to customer-defined categories, the centralized service's 110 categories, or any other means of categorizing the activities. For example, the report may categorize customer use of services according to those rendered in response to customer requests and those rendered in response to alerts.

The agent may include any type and form of communications interface such as email, instant messenger, texting, VoIP, chatroom, etc. In some embodiments, the communications interface establishes a form of communication with the centralized service. In some embodiments, the communications interface establishes a form of communication with another agent. In some embodiments, the communications interface establishes a connection with the centralized service. In some embodiments, the communications interface automatically establishes a connection with the centralized service and establishes communications with a remote technician of the centralized service. In some embodiments, the communications interface establishes a form of communications between a user of the device of the agent and another user on another device. In some embodiments, the communications interface establishes a form of communications between a user of the device of the agent and wireless device, such as PDA, cellphone or smartphone. In some embodiments, the communications interface establishes a form of communications between a user of the device of the agent and a landline phone. In some embodiments, the communications interface establishes a remote online support session between the device of the agent and another device. In some embodiments, the communications interface establishes a remote online support session between the centralized service and the device of the agent. In some embodiments, the communications interface establishes a multi-party communications session.

The agent may be componentized in any manner to provide any combination of the functionality related to data collection, diagnostics, discovery, delivery, provisioning, reporting, alerting and sales. The agent may be configurable to add, install or otherwise incorporate or include any of these components. The agent may be configurable to add, install or otherwise incorporate or include any of these components dynamically. The agent may be configurable to add, install or otherwise incorporate or include any of these components in real-time. The agent may be configurable to add, install or otherwise incorporate or include any of these components on demand. The agent may be configurable to add, install or otherwise incorporate or include any of these components via request by the centralized service. In some embodiments, the centralized service may add, install or otherwise incorporate or include any of these components in an agent. In some embodiments, the agent may download, obtain any of these components and add, install or otherwise incorporate or include any of these components in the agent. Any of these components may be added, installed, included or incorporated seamless and without user interaction. Any of these components may be removed, uninstalled or changes seamlessly and without user interaction. In some embodiments, the centralized service and/or agent may configure or change the configuration of any these components.

The agent may comprise any type and form of user interface. The user interface may have any arrangement and combination of user interface elements. A user may configure, interact and/or control and manage the agent via the user interface. A user may configure, interact and/or control and manage any one or more components of the user interface. A user may configure and manage any one or more policies or rules corresponding to the functionality of the agent and/or centralized service.

The agent may provide any selectable user interface or user interface element to launch any component of the agent. The agent may provide any selectable user interface or user interface element to launch connectivity to the centralized service. The agent may provide any selectable user interface or user interface element to request support or service from the centralized service. This selectable user interface element may be in any form, such as an icon, a shortcut, image of an app on a deck of a mobile device, a hyperlink, a URL, a menu item, etc.

In some embodiments, the agent comprises one of a discovery component, a data collection component, a delivery component, a provisioning component, a diagnostics component, a reporting component, an alerting component, a sales component and a communications component.

In some embodiments, the agent comprises any one of a discovery component, a data collection component, a delivery component, a provisioning component, a diagnostics component, a reporting component, an alerting component, a sales component and a communications component.

In some embodiments, the agent comprises a combination of any one of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component. In some embodiments, the agent comprises a combination of any two of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component. In some embodiments, the agent comprises a combination of any three of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component.

In some embodiments, the agent comprises a combination of any four of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component. In some embodiments, the agent comprises a combination of any five of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component. In some embodiments, the agent comprises a combination of any six of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component. In some embodiments, the agent comprises a combination of any seven of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component.

Figure 5:
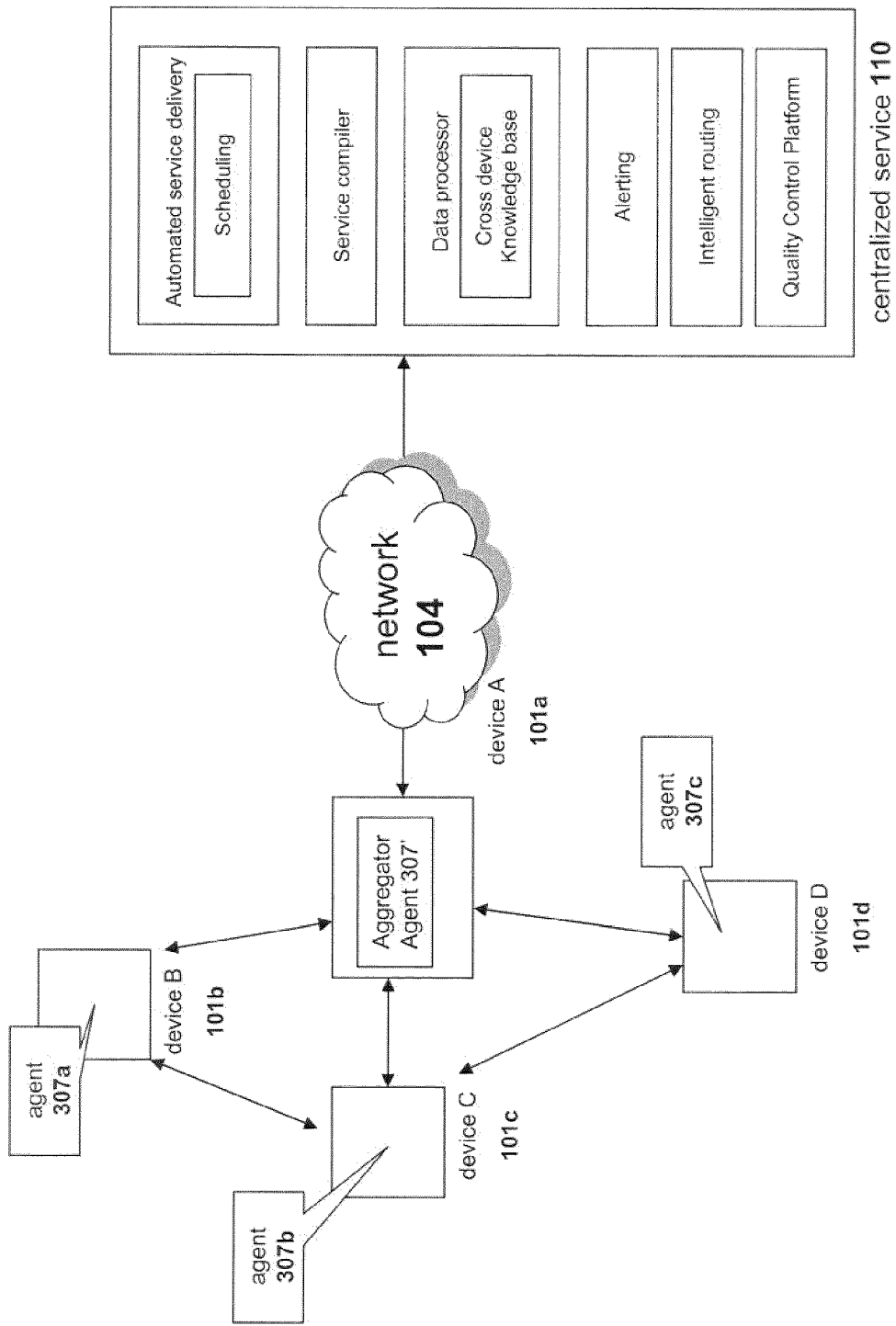
FIG. 5 is a block diagram that depicts an embodiment of an agent acting as an aggregator to the other agent.

Prior to going on to FIG. 3, other embodiments of the agent will be discussed in conjunction with FIG. 5. In brief overview, FIG. 5 illustrates an environment in which a plurality of agents may be in communication and communicate with each other. One of the agents, such as agent 307' may act as a central point and/or aggregator to one or more other agents, such as agents 307a-307c. The aggregator agent 307' may interface and/or communicate with the centralized service. The other agents 307A-307C may communicate with the aggregator agent 307'. The aggregator agent 307' may communicate with the centralized service on behalf of agents 307A-307C. The aggregator agent may act as a localized collection point of data and information collected from other agents. For example, an aggregator agent may be deployed at a site to collect data from all site agents and provide a collection of site data to the centralized service. In some embodiments, the aggregator agent installs, configures and manages the other agents on the network or site.

Each of the agents may be designed and constructed to communicate with another agent. The agents may communicate using any type and form of protocols. In some embodiments, any one agent may establish a transport layer connection, such as a TCP/IP connections with another agent. In some embodiments, an agent discovers via any discovery protocol, communications or processes that other agents on the network. In some embodiments, an agent may send out broadcast messages to find other agents on a network. In some embodiments, an agent may be configured with network identification information of one or more agents to use to establish communications. In some embodiments, an agent may query or request the centralized service to identify information about the other agents, such as network identifier information, (IP address/domain name and/or port) of device executing the agent.

An agent may share any collected data, discovered information, diagnostics information with another agent. In some embodiments, a plurality of agents communicate any collected data, discovered information or diagnostics information to the aggregator agent. The agent may provide this data to the centralized service as a package of individual device specific data. The agent may aggregate the data in a form to provide site data for all the devices on the site.

In some embodiments, different agents are provided on each device on the site or network configured or constructed to perform different functionality or have different components. For example, one device may have an agent that is configured to perform sales and provisioning. In another example, one device may have an agent perform alerts and reporting. In some embodiments, an agents performs one or more of the functionality of the agent components on behalf or for any other agent or device. For example, one agent may perform any function or component for all devices on network in communications with each other. In some embodiments, the aggregator agent performs a component or functionality for all of the other agents or one or more of these agents.

Figure 3:
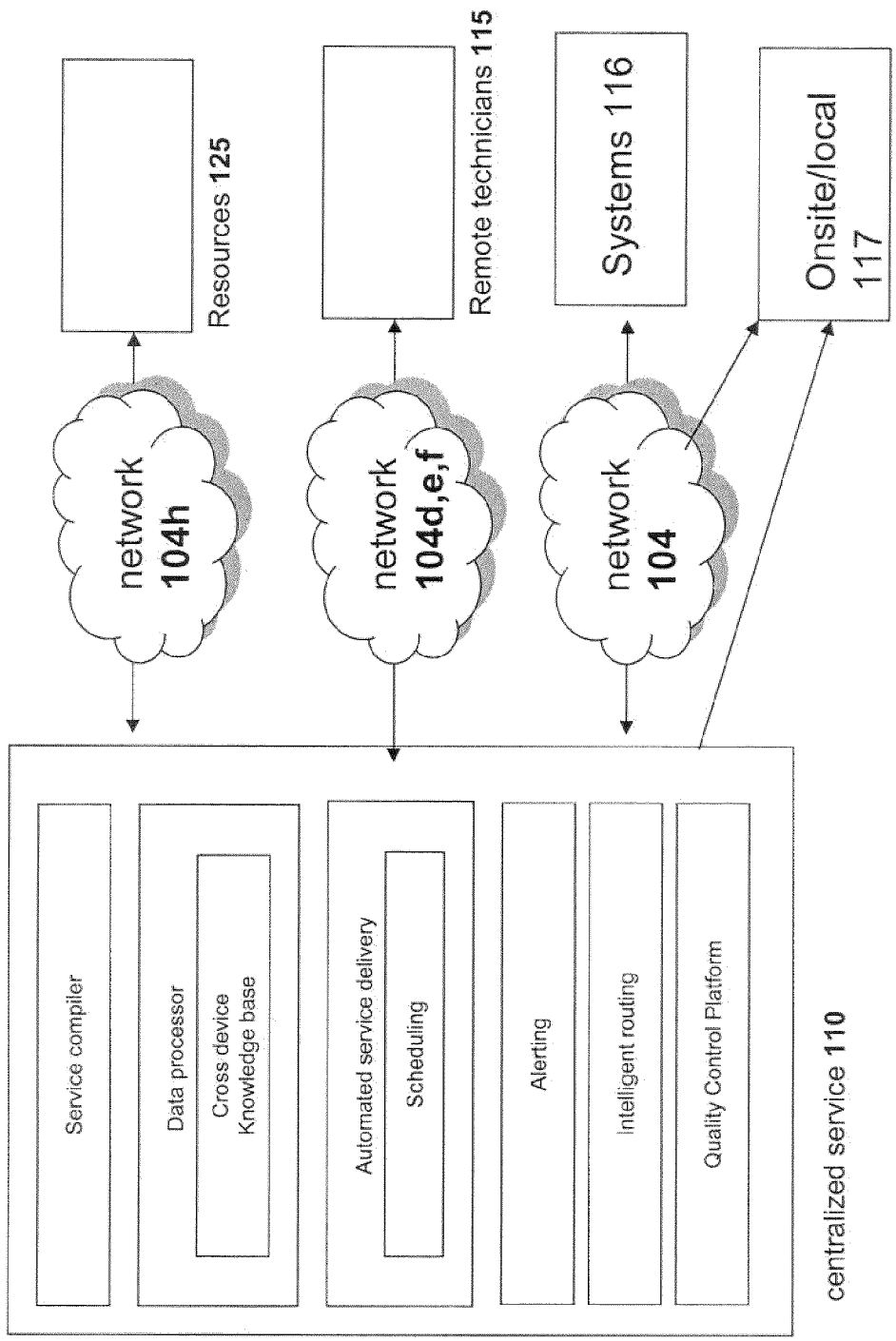
FIG. 3 is a block diagram that depicts an embodiment of a centralized service that provides access to resources for devices.

Referring now to FIG. 3, a block diagram of an example of a centralized service 110 is shown and described. The centralized service 110 aggregates access to resources, delivers resources to the devices 101, and collects and analyzes information to improve the quality of resource delivery. To these ends, the centralized service 110 may include a multi-service compiler, a data processor with a cross device knowledge base, an automated service delivery unit with a scheduling unit, an alerting unit, an intelligent routing unit, and a quality control platform.

The centralized service may identify and/or select any one or more of remote technicians, 115, systems 116 and/or onsite or local labor 117 to deliver a resource and/or perform a service, of any portions thereof. The centralized service may aggregate any combination of the systems, remote technicians and onsite labor to deliver or provide a service. For example, the centralized service may select and assign a remote technician to perform one task of a service, select and assign a system to perform another task of a service and select and identify onsite or local labor to perform yet another task of the service. Based on the request, customer or user of the request, and/or service requested, the centralized service may select from a remote technician, system or localized or onsite labor to perform a service based on any number of criteria, rules or policy.

The system 116 may comprise any type and form of applications, services, scripts programs, process, tasks or executable instructions to perform or provide a function, resource or service. In some embodiments, the systems may automatically perform or provide the function, resource or service. In some embodiments, the system may perform or provide the function, resource or service remotely via a network. In some embodiments, the system may perform or provide the function, resource or service on a device of the user. In some embodiments, the system may perform or provide the function, resource or service via combination of executing on the device of the user and remotely executing on a device of the system.

The system may automatically perform any of the functions, operations and/or services of the centralized service or any portions thereof. The system may perform any administrative functionality, such as account setup, user administration, subscription management, etc. The system may perform any billing management related functionality and operations. The system may perform any IT management related functionality and operations, such as system administration functions. The system may perform any device support and services, such as antivirus detection and resolution, device diagnostics, device performance or optimization tuning, software installation, system configuration, etc. The system may perform any type and form of entitlement services regarding the user's entitlement to software and software licenses for the device. The system may perform any type and form of license granting and management such any licenses for software and services. The system may perform any type and form of warranty service and management, including automating device or component repair, return and/or replacement services.

Resources may also include any type and form of human labor 117 that may be deployed locally or onsite for the requestor of the service. This type of labor may visit one or more locations associated with the requestor or as may be identified or requested by the requestor. The type of labor may perform services that cannot be automated and/or delivered remotely. This type of labor may perform services that are desirable or more efficient to handle in person or at a locale of the device or user. This labor 117 may deploy any resources, such as tools, vehicles, equipment, etc. to deliver or perform a service, or task thereof.

In various embodiments, the centralized service 110 includes a service compiler. The service compiler may identify and aggregate one or more services and/or products for delivery to the devices 101. In many embodiments, the service compiler may enumerate a list of resources based on an analysis of any data or information. In some embodiments, the service compiler may communicate with databases within the compiler, databases on the centralized service 110, third party databases, or any combination thereof to provide access to resources. The databases on the centralized service 110 may include proprietary or licensed resources. The service compiler may cache copies of the most frequently accessed resources. The centralized service 110 may be a platform as a service (PaaS) that allows resources on third party databases to be accessed by the devices 101.

In some embodiments, the service compiler may enumerate a list of products and/or services for subscription or sale. In additional embodiments, the service compiler may identify or present subscriptions to the centralized service 110 for packages of products, services, or both. In some embodiments, the subscriptions may vary by level of complexity. For example, the compiler may offer basic, advanced, and premium subscriptions that may differ according to the included type and number of products and level of support. The service compiler may offer subscriptions organized by type of resource, subscriptions that bundle different types of resources, or both. The service compiler may permit customers to customize their subscriptions. In some embodiments, a customer may create a subscription by adjusting a predefined subscription offered by the service compiler, and in other embodiments, a customer may create a subscription by selecting products and services made available through the service compiler.

In various embodiments, the centralized service 110 may include a data processor with a cross device knowledge base. The data processor communicates with agents 307 from devices 101 to collect data. The data may be associated with individual devices 101 or multiple devices 101 associated with a customer account. As previously discussed, the data processor may collect and store information about individual devices 101, such as the manufacturer, model, processor speed, display resolution, hard drive size, operating system, installed applications, attached peripherals, or any other information. The data processor may collect the same information about multiple devices 101 associated with a customer account.

In many embodiments, the data processor receives information associated with compatibility or conflict between devices and resources, and the processor may store the information in the cross device knowledge base. In some embodiments, the data processor receives the information from agents 307 when agents 307 detect events associated with compatibility or conflict. For example, after a customer attempts to install a software application on a device 101, the agent 307 may detect if the installation was successful. The agent 307 may transmit information to the data processor indicating whether a particular software application can be successfully installed on a device 101 of known model, memory size, operating system, and pre-existing set of applications. In other embodiments, the data processor receives the information from original equipment manufacturers (OEMs) regarding known compatibilities between their devices and resources. In further embodiments, the data processor receives the information from remote technicians. When the remote technicians access the devices 101 to deliver resources or troubleshoot issues, they may transmit their findings to the data processor.

In many embodiments, upon learning that a resource failed to install on a device 101, the data processor may search for a solution. The data processor may search the cross device knowledge base to determine if a known adjustment may enable the resource to install on the device 101. The data processor may search the cross device knowledge base for successful combinations of similar devices and resources, and suggest alternate resources of comparable utility to the customer. The data processor may store information regarding the unsuccessful attempted installation with a negative indicator. In some embodiments, the data processor may link entries with negative indicators (e.g., flags) to known, successful, alternate combinations of devices and resources to suggest to the customer. In some embodiments, the data processor may generate a notice regarding the unsuccessful attempted installation. The notice may be broadcast to any person or entity associated with the centralized service 110. The notice may invite the persons or entities to provide any knowledge regarding the unsuccessful installation to the data processor. As a result, the data processor may collect and store known solutions in the cross device knowledge base.

In many embodiments, the data processor may consult the cross device knowledge base when the service compiler receives a request to deliver a resource to a device 101. If the data processor determines that the resource will not install successfully, the data processor may cause the alerting unit to generate an alert informing the agent 307 of the problem. Additionally, the data processor may search the cross device knowledge base for known, successful, alternate combinations of devices and resources and include the possible alternatives in the alert. In some embodiments, the alerts may include work order forms for the possible alternatives that the customer may order.

In various embodiments, the centralized service 110 may include an automated service delivery unit. The automated service delivery unit may include rules associated with customer accounts. The rules may determine when services are delivered automatically to devices 101. In some embodiments, rules may be based on customer account settings. The customer may configure the settings when she first creates an account or reconfigure the settings at any time thereafter. The customer may require express consent to deliver any recommended services generated by alerts. The customer may permit delivery of any recommended services generated by alerts. The customer may require express consent to deliver certain types of recommended services, but permit automatic delivery of other types of services. In other embodiments, rules may be based on historical customer behavior. In additional embodiments, rules may be based on centralized service policies.

The automated service delivery unit may communicate with the service compiler to deliver resources to devices 101 according to the rules. The automated service delivery unit may include a scheduling unit, and the scheduling unit may store action items that trigger resource delivery at predetermined times according to the rules.

In some embodiments, the automated service delivery unit delivers resources at predetermined intervals according to settings in a customer account. In one example, the customer may schedule weekly removal of privacy-compromising files, monthly tune-ups, and quarterly virus scans and anti-virus definition reviews for a desktop computer. In another example, the customer may schedule weekly hard drive backups and biannual hard drive defragmentation. In a third example, the customer may schedule yearly operating system reviews. In many embodiments, the centralized service may prompt a customer to schedule future services when the customer initially orders a service. In all of these examples, the scheduling unit may store action items that trigger delivery of the services at the predetermined times.

In some embodiments, the automated service delivery unit delivers resources in response to predetermined events. In some embodiments, the customer designates the events. For example, the customer may configure her account to accept recommended services from alerts that optimize laptop performance. As a result, whenever the agent 307 and centralized service 110 generate alerts diagnosing hard drive fragmentation, a threshold number of temporary and start-up files, or spyware processes consuming a threshold level of processor capacity, the automated service delivery unit delivers services to defragment the hard drive and delete the temporary files, start-up files, and spyware processes. In some embodiments, the automated service delivery unit may update or upgrade the laptop's anti-spyware software. In another example, the customer may configure her account to accept updates for software installed on devices 101. This setting may authorize the automated service delivery unit to deliver new versions of software or patches whenever the service compiler learns of their releases.

In other embodiments, the automated service delivery unit learns from customer behavior to identify the events. In one example, the centralized service 110 may observe that the customer has accepted recommended services related to anti-virus and malware protection for a predetermined number of alerts. In response, the automated service delivery unit may create a rule to deliver anti-virus and malware protection services automatically without first requesting the customer's consent. The automated service delivery unit may create the rule even if the customer's account does not explicitly authorize automatic service delivery under any conditions, although in some embodiments, lack of authority for automatic service delivery may bar the automated service delivery from creating any behavior-based rules.

In some embodiments, the automated service delivery unit delivers resources according to the centralized service's policies. In one embodiment, the centralized service may deliver resources whenever the device malfunctions. For example, an agent 307 may inform the service whenever a device crashes, freezes, or reboots. The automated service delivery unit may deliver resources to identify and repair the source of malfunction. In another example, an agent 307 may inform the service whenever a component fails. The automated service delivery unit may order a replacement component and communicate with the customer to schedule an installation appointment.

In various embodiments, the centralized service 110 may include an intelligent routing unit that connects devices with resources. The intelligent routing unit may receive and process requests from agents 307 to access resources, and processing the requests may connect agents 307 with the requested resources. In some embodiments, the intelligent routing unit processes a request by storing the network address associated with the requesting agent 307 and determining a network address associated with the requested resource. The unit may communicate with the requested resource over a network to deliver the resource to the centralized service. The centralized service may then deliver the resource to the requesting agent. The intelligent routing unit may include an intelligent switch that connects devices 101 with remote technicians 115, as will be explained in more detail below.

In various embodiments, the centralized service 110 may include a quality control platform. In some embodiments, the platform maintains and monitors the quality of the resources being delivered. For example, the platform may analyze common elements among the resources to assess their performance. In many embodiments, the platform may review the quality of the automated service delivery. For example, the platform may assess the services delivered automatically to determine the accuracy and appropriateness of the deliveries. The platform may generate quality reports regarding any type or form of assessment. The reports may compare the assessments against service level thresholds of the centralized service 110. In some embodiments, the platform may respond to the assessments through escalation, whereas in other embodiments, the platform may respond with remedial action. In further embodiments, the reports may compare the assessment against terms in service level agreements between the centralized service 110 and the third parties providing the services. The reports may summarize discrepancies between the assessments and the terms.

Referring still to FIG. 3, in greater detail, the centralized service 110 may provide access to any type and form of resource, which may be in the form of labor or a service. The centralized service 110 may provide access to proprietary or licensed resources. The centralized service 110 may provide access to third party resources. The resources may be people-based, computer-based, or a combination thereof.

Resources provided by the centralized service 110 may offer services to install, configure, or provide updates (e.g., new versions, patches) to software, or any combination thereof. Resources provided by the centralized service 110 may provide training for software applications. Resources provided by the centralized service 110 may perform device maintenance and tune-ups. Resources provided by the centralized service 110 may provide security-related support. For example, a resource may clean devices of spyware, install anti-virus software, or review anti-virus definition. In other examples, a resource may check and enable controls regarding encryption, file sharing, and firewalls. In additional examples, a resource may provide privacy-related support. The resource may erase browser histories and cookies, as well as any other information related to customer activity (e.g., frequently visited websites stored in caches, auto-complete parameters, document histories, messaging service conversations).

A resource may provide back-up services. Such back-up services may store a copy of the device's contents on the centralized service or associated locations, and the back-up services may periodically deliver a hardcopy of the backed-up data to the customer's mailing address. A resource may provide data transfer storages. In some embodiments, an agent 307 on one device may transmit data on the device to the centralized service 110, and the centralized service 110 may transmit the data to another device 101 associated with the customer account. In another embodiment, the resource sends a hardcopy of the data to the customer's mailing address in any medium that permits easy transfer of data to another device (e.g., CD).

The centralized service 110 may connect customers with pools of labor. In some embodiments, the customers may complete work order forms to access the pools of labor, and in other embodiments, agents 307 on devices 101 may initiate the process of scheduling appointments for labor-related tasks. In some examples, customers may schedule appointments for service personnel to physically move systems (e.g., relocate a home office to another location, either on- or off-site), install new hardware components, set up cable service, set up and configure a multi-device home network system, or any other task that requires manual labor. In other examples, agents 305 may detect component failure and generate alerts to order a replacement component and schedule an appointment for component installation. In additional embodiments, the centralized service 110 may connect devices to remote technicians 115. The remote technicians 115 may launch remote desktop applications to access a device 101. The remote technicians may then install software, troubleshoot problems, provide routine maintenance, or execute any other support task known in the art. The remote technicians may report the status of any labor-related task back to the centralized service 110.

Figure 4:
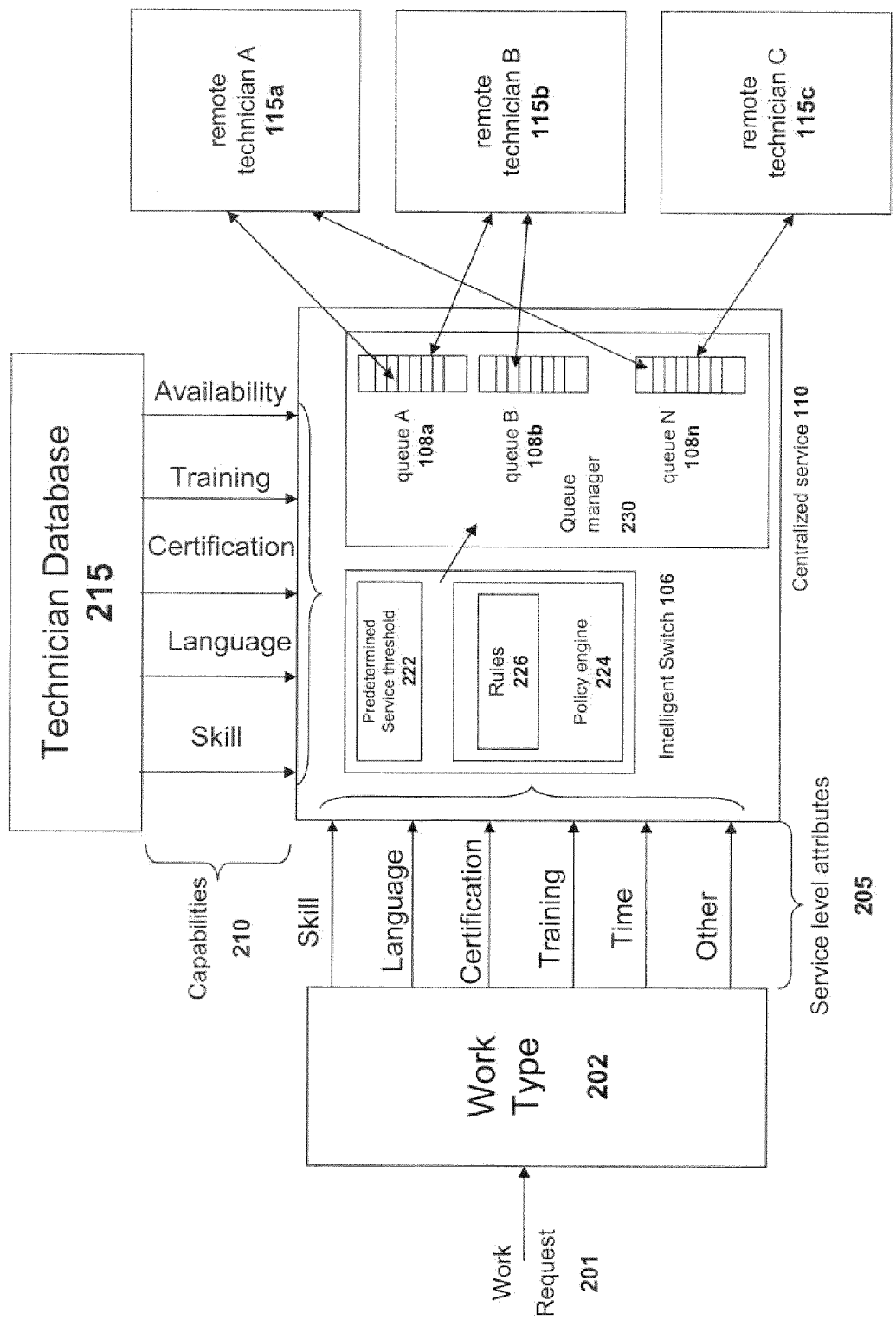
FIG. 4 is a block diagram that depicts an embodiment of allocating a service request to a remote technician by an intelligent routing unit on a centralized service.

Referring now to FIG. 4, a block diagram depicting an embodiment of a centralized service for allocating a service request to a remote technician is shown and depicted. In one embodiment, the centralized service receives a request for work 201. A work type 202 is determined from the work request 201 to identify one or more service level attributes 205 required to service the work request 201. In another embodiment, the centralized service communicates with a technician database 215 to determine capabilities 210 of technicians available to service the work request. In still another embodiment, an intelligent switch 106 routes the incoming work request 201 to a queue 108a of a plurality of queues 108a-108n (108 in general). In yet another embodiment, the intelligent switch 106 matches the service level attributes 205 of the work request 201 with the capabilities 210 of the remote technicians 115 to determine a remote technician 115a suited to service the work request 201 at a predetermined service level 222. In one embodiment, the intelligent switch 106 includes a policy engine 224 that communicates with a set of rules 226 to perform the matching. In a further embodiment a queue manager 230 manages allocation and moving of requests between the plurality of queues 108.

In one embodiment, the Intelligent Switch 106 comprises any type and form of mechanism and interface for connecting, dispatching, identifying and managing the flow of work from a consumer outlet 103 to a remote technician 115. In another embodiment, the Intelligent Switch 106 may comprise software, hardware or any combination of software and hardware. In some embodiments, the Intelligent Switch 106 includes dispatching and/or scheduling logic, functions and operations to identify and select the most appropriate technician and then pass the connection to the computer so the service may be performed. In another embodiment, the Intelligent Switch 106 may have information on which technicians 115 are logged in and currently available and the skill sets, capabilities 210 and/or knowledge that they have and type of work or service they may perform. In some embodiments, the Intelligent Switch 106 tracks in real-time which technicians are available and which technicians are currently performing a service, and for which device 101. In still another embodiment, the Intelligent Switch 106 has, obtains or maintains profiles for each of the remote technicians 115. A profile identifies the technician's technical capabilities, certifications, types of service or work authorized or assigned to perform, and/or performance information and statistics for past service work. In one embodiment, the technician profiles are stored in a technician database 215 in communication with the centralized service 110.

A work type 202 comprises any type and form of information, data or identification of the work to be performed in response to the work request 201. In one embodiment, a work type 202 is identified from the incoming work request 201. In another embodiment, the work type identification includes identifying one or more service level attributes 205 from the work request 201. In still another embodiment, the service level attributes 205 include but are not limited to one or more of the following: a level of skill, a certification or a level of training to perform the type of work on the device at the predetermined service threshold. In another embodiment, the service level attributes 205 include but are not limited to a language, location or time to perform the type of work on the device at the predetermined service threshold. In yet another embodiment, a service level attribute 205 may include one or more sub-attributes derived from one or more service level attributes 205. In a further embodiment, a service level attribute may be a function of one or more service level attributes 205. In one embodiment one or more service level attributes 205 of a work type 202 may be determined using any algorithm or qualitative and/or quantitative analysis on the work request 201. In another embodiment, the service level attributes are explicitly specified in the work request 201. In still another embodiment, the service level attributes 205 are encoded in the work request 201.

In one embodiment, the technician database 215 stores the profiles of one or more remote technician 115. The technician database 215, generally also referred to as data source, may comprise any type and form of data. In one embodiment, the technician database 215 comprises any type and form of relational database, non-relational database, object database, or object-oriented database. In some embodiments, the technician database 215 comprises any of the database products manufactured by Oracle of Redwood Shores, Calif. In another example, the technician database 215 comprises any of the versions of Microsoft SQL Server manufactured by Microsoft Corporation of Redmond, Wash. In one embodiment, the technician database 215 provides an Open Database Connectivity (ODBC) interface for accessing the database. In another embodiment, the technician database 215 comprises a server farm of databases. In some embodiments, the technician database 215 comprises a database cluster.

In other embodiments, the technician database 215 comprises a file, such as a CSV (command separated) formatted file. In another embodiment, the technician database 215 comprises a file having fields or values delimited in any manner by using fixed length field or any predetermined field or value delimiters. The file may have a structure, format, and/or content readable and understandable by the centralized service 110, or any portion thereof. In other embodiments, the technician database 215 includes an application, program, software, service, process or task providing access to data. The technician database 215 may provide any type and form of application programming interface (API), such as an XML, object, or web-service based interface for accessing or providing data.

A capability 210 of a remote technician 115 comprises any type and form of information, data and identification related to one or more of a background, skill level, knowledge, training, experience, certification and any other attribute of the technician 115. In one embodiment the technician profiles identify the capabilities 210 of each of the one or more remote technicians 115. In another embodiment, the capabilities 210 of a remote technician may include but are not limited to one or more of the following: skill set, language spoken, certifications, training received, availability and any other attribute as apparent to one ordinarily skilled in the art. In yet another embodiment, a capability 210 of a remote technician 115 may be a function of one or more capabilities 210. In one embodiment, the capabilities 210 of a remote technician 115 may include an attribute derived from a performance history of the technician 115. In another embodiment, the capabilities 210 of a remote technician 115 may be classified according to one or more different attributes such as work type, customer type, interaction with a specific customer and any other attribute. In still another embodiment, a remote technician 115 acquires a capability 210 by testing out at a certain level of certification. In one embodiment, the remote technician is certified for a skill or level of skill by passing any type and form of testing or certification. In yet another embodiment, if a technician 115 with valid certification is not available, a related or previous certification may be considered as a capability 210. For example, if a technician with currently valid certification is not available, a substantially recently expired certification may be considered as a capability 210. In some embodiments, a technician's certification may become obsolete, old or no longer valid. In one case, although the technician's certification is not current, the technician may be selected by the centralized service for that task based on previous certification.

In one embodiment, the Intelligent Switch 106 matches the service level attributes 205 with the capabilities 210 of the technicians 115. In another embodiment, the Intelligent Switch communicates with the technician database 215 to identify the capabilities 210 of one or more remote technicians 115. In still another embodiment the service level attributes 205 are matched to capabilities 210 by the Intelligent Switch 106 based on an algorithm. In yet another embodiment, each of the service level attributes 205 and/or the capabilities are assigned weights by the centralized service 110 in communication with the policy engine 224. In one embodiment, the Intelligent Switch 106 executes a learning algorithm to match the service level attributes 205 to the capabilities 210. In another embodiment, the Intelligent Switch 106 uses any algorithm, software, hardware or a combination thereof to match the service level attributes 205 to the capabilities 210. In still another embodiment, the service level attributes 205 and the capabilities 210 are matched to determine a technician 115 substantially suited to service a work request 201.

In some embodiments, the service level attribute of a level of skill may be matched to a skill level of a remote technician 115. In one of these embodiments, a skill may represent a general area of expertise such as hardware, software or networks. In another of these embodiments, a skill may represent more focused expertise in any hardware related area such as motherboards, graphics cards, monitors or network cards. In still another of these embodiments, a skill may represent a focused expertise in a software related area such as databases, anti-virus software, firewalls and operating systems.

In other embodiments, the service level attribute of language may be matched to a corresponding language capability of a remote technician 115. In one embodiment, a language may represent a spoken and/or written language such as English, Chinese, Spanish or Hindi. In another embodiment, a language may be a computer language such as C, C++, Java, HTML or Pascal. In still another embodiment, a language may be any form of communication between two individuals such as sign language.

In still other embodiments, service level attributes such as certification and/or level of training are matched to corresponding capabilities of the remote technicians 115. In one embodiment, a certification may be from an organization or a company such as Cisco Certified Network Associate (CCNA) certifications from Cisco Systems Inc. of San Jose, Calif. or Microsoft Certified Technology Specialist (MCTS), Microsoft Certified Professional Developer (MCPD), Microsoft Certified IT Professional (MCITP) and Microsoft Certified Architect (MCA) certifications from Microsoft Corporation of Redmond, Wash. In other embodiments, a certification may be one or more of an authorization, an endorsement, a promotion, a validation and an authentication from any company, organization, institution or individual as apparent to one skilled in the art. In one embodiment, a training may be a formal education received in an area of concentration. In another embodiment, a training may represent hands on experience in a related field. In still other embodiments, a training may represent means for developing a skill and/or expertise in one or more areas.

In yet other embodiments, a service level attribute of time is matched to a corresponding capability of a remote technician 115. In one embodiment, time may be a service level attribute such as the time the work request is received at the centralized service 110. In another embodiment, a time may represent a capability of a remote technician 115 such as a window of availability. In other embodiments, a time may represent one or more of service level attributes and/or capabilities such as maximum/minimum turn-around time, maximum/minimum waiting time and any other related time as apparent to one ordinarily skilled in the art. In still another embodiment, the time may represent a period by which a technician executes a task at a predetermined service threshold 222. For example, a technician may be selected based on average historical times to execute one or more support tasks or any statistical temporal measurement of task execution. In some embodiment, the centralized services selects and assigns work to technicians based on their speed of execution, such as indicated by average task times.

In one embodiment, the Intelligent Switch 106 determines the technician suitable to service a work request 201 to meet a predetermined service threshold 222. A predetermined service threshold is any type and form of a metric used to identify one or more qualitative and/or quantitative aspect related to performing a service, such as any measurable element of the service. In one embodiment, the predetermined service threshold is a quantitative metric such as turnaround time. In another embodiment, the service threshold is a qualitative metric such as customer satisfaction. In yet another embodiment, the service threshold 222 is considered as a service level attribute 205 in determining a technician to service a work request 201. In one embodiment, the service threshold 222 may be specified as a part of the work request 201. In another embodiment, a technician 115 is selected by the Intelligent Switch 106 to optimize the probability of meeting the service threshold 222. In other embodiments, the service threshold 222 may be one or more characteristics and/or capabilities of the remote technician 115 such as age, language spoken, accent, dialect, sex, ethnicity or any other characteristics for which a customer may indicate a preference. Via customer selection or profile, a technician may be selected based on any number of non-technical characteristics.

In some embodiments, the Intelligent Switch 106 includes a policy engine 224. In another embodiment, the policy engine 224 is driven by a set of rules 226. In one embodiment, the policy engine 224 may include, for example, an intelligent statistical engine or other programmable application(s). In another embodiment, the policy engine 224 provides a configuration mechanism to allow a user to identifying, specify, define or configure a matching policy. The policy engine 224, in some embodiments, also has access to memory to support data structures such as lookup tables or hash tables to enable user-selected matching policies. In other embodiments, the policy engine 224 may comprise a set of rules 226 including any logic, rules, functions or operations to determine and provide access, control and management of service level attributes 205 and capabilities 210 being matched by the intelligent switch 106.

In one embodiment, the Intelligent Switch 106 includes the Citrix Online GoToAssist support portal. In other embodiments, the Intelligent Switch may include any online support systems from WebEx Communications, LogMeIn or Microsoft. In some embodiments, the Intelligent Switch 106 includes software, functions or logic that call an application programming interface (API) to the support portal and software system to perform desired functionality and operations described herein. In one embodiment, the Intelligent Switch 106 is designed and constructed to forward work to specific agents or technical resources or pools of agents/technical resources based upon information received via the Internet Interface, such as answers to questions on a web form.

In one embodiment, the Intelligent Switch 106 may include any type and form of logic, functions or executable instructions to organize support and/or work request into queues 108 and to dispatch or schedule such request to technicians 115. In another embodiment, the Intelligent Switch 106 may identify, arrange or organize queues 108a-108n (108 in general) in any manner, scheme or into any type and form of categories. In some embodiments, the queues 108 may be organized by consumer outlet or locations thereof. In other embodiments, the queues 108 may be organized by groups of consumer outlets 103, such as for a retail chain. In another embodiment, the queues 108 may be organized by the type of service requested and/or the nature of the problem. For example, queues 108 may be organized for application installation services, checkup and virus scan services or software or operating system upgrades. In still other embodiments, the queues 108 may be organized by the type or category of software, application or operating system. In another embodiment, the queues 108 may be organized by type of device, such as computing, MP3, printer, etc. In further embodiments, the queues may be organized by the manufacturer or brand of the device. In one embodiment, the queues 108 may be organized or arranged by groups of one or more technicians 115. In another embodiment, the queues may be arranged by geographic locations of one or more technicians.

The scheduling and/or dispatching functionality of the Intelligent Switch 106 uses any type and form of logic, algorithm or scheme to match work from a queue to a suitable technician. In one embodiment, the Intelligent Switch determines the next available remote technician 115 to give the work from a queue 108a or any of the queues 108. In some embodiments, the Intelligent Switch 106 characterizes the work type 202 based on one or more service level attributes 205 that are required or desired to perform the work 201. In another embodiment, the Intelligent Switch 106 has knowledge of capabilities 210 of the remote technicians 115, such as from profiles stored in the technician database 215. In still another embodiment, the Intelligent Switch 106 determines and selects a technician 115a suited to service the work request by matching the service level attributes 205 to the capabilities 210 of the technicians. In one embodiment, the Intelligent Switch 106 selects a technician 115a best suited to service the work request. Upon this determination, in one embodiment, the Intelligent Switch 106 delivers or informs the matched or selected technician 115a of the item he or she should work on next. If work type 202 is not known then the Intelligent Switch 106 may assign the queued work to a technical resource that is capable of diagnosing problem for later redirect to the most appropriate technician. For example, after diagnosing the problem, the technical resource may resubmit the work to the Intelligent Switch 106 to be assigned to a technical resource. The diagnosing technical resource may assign the work to the appropriate queue 108 or provide information from the diagnostics for the Intelligent Switch 106 to assign the work to the appropriate queue 108 or technical resource.

The Intelligent Switch 106 uses any rules and/or algorithm to select a technician suited to service a work request. In one embodiment, the service level attributes 205 and/or the capabilities may be ordered based on a priority of requirement. In another embodiment, each attribute 205 and/or capability 210 is assigned a weight prior to the selection. In still another embodiment, one or more of the attributes 205 and/or the capabilities 210 may be marked as essential. In such an embodiment, if a suited technician satisfying the essential capability is not available, the work request 201 is put on hold till a suited technician becomes available. In one embodiment, if the Intelligent Switch 106 cannot select a suited technician 115, a communication is sent out to all available technicians 115 to query if any technician is capable of servicing the work request 201. In one embodiment, one service level attribute is matched to a corresponding capability to select a remote technician. In another attribute, a plurality of service level attributes is matched to a plurality of corresponding capabilities to select a remote technician. In some embodiments, a multi-level process is employed to select a remote technician. In one of these embodiments, in one level, one or more remote technicians are selected as a first group based on matching one or more high priority attributes to one or more corresponding capabilities. In another of these embodiments, in another level, one or more remote technicians are selected from the first group based on matching one or more lower priority attributes to one or more corresponding capabilities. In some embodiments, one or more technicians are selected based on weights assigned to one or more skills and capabilities. For example, a technician A may have skill 1, skill 2 and skill 3 at different levels. Technician 2 may have skill 4 and skills 1-3 at lower levels than that of technician 1. If for a certain task, skill 4 has a very high weight (e.g. it is mandatory and not optional) while skills 1-3 have relatively low weights, technician 2 may be selected over technician 1. As another example, if a task requires a high weight on one or more of skills 1-3 and a low weight on skill 4, technician 1 may be selected over technician 2.

In one embodiment, the remote technical support system technician resources are aggregated by the Intelligent Switch 106 into pools of labor which are used to resolve the issues aggregated from the customer outlets 103. Because the technical resources deliver their services remotely through networks, such as the Internet they can be located in call centers or in a distributed work environment such as a home. As long as the technical resource has access to the network or the Internet they can provide services for customers.

In one embodiment, the Intelligent Switch 106 may include any type and form of logic, function, operations or executable instructions to perform load balancing between one or more queues 108 and the remote technicians 115. For example, the Intelligent Switch 106 may load balance queues 108 based on the type of work and the capabilities 210 of available technicians. In some cases, technicians may have multiple skills sets that may be used to work on request in multiple queues. The Intelligent Switch 106 may load balance service requests or the queues to meet the predetermined service threshold 222 or metrics for a consumer outlet 103. The Intelligent Switch 106 may load balance the queues according to priority levels assigned at a consumer outlet 103. In other embodiments, the Intelligent Switch 106 may load balance queues 108 across a retailer's chain of consumer outlets 103. In yet another embodiment, the Intelligent Switch 106 may load balance queues based on geographic locations, such as for a region of consumer outlets 103. In a further embodiment, the Intelligent Switch 106 may use performance and timing metrics of work performed to load balance to remote technicians 115 based on average support resolution times based on queue type or historical time of the technician 115.

In some embodiments, the remote technical support services provided via the Intelligent Switch 106 may include any type and form of remote technical or online services, such as PlumChoice Online PC services of Billerica, Mass., FireDog services provided by CircuitCity Stores, Inc., online services provided by Support.com and tech24 at tech24.com.

Although the embodiments of the system and methods of FIG. 4 are generally described in connection with remote technicians, these systems and methods may be used for automated systems 116 and/or local labor 117 as well. Furthermore, these systems and methods may be used for intelligently and effectively deploying any combination of remote personnel, systems and/or local labor to deliver or perform a service or delivery a resource. As such, the service level attributes and capabilities may correspond to such different types of services providers. For example, there may be a database 215 comprising capabilities of onsite personnel. In another example, there may be a database 215 comprising capabilities of remote non-technical service personnel. In another example, there may be a database 215 comprising capabilities of systems, such as automated systems. In some embodiments the database(s) 215 comprise capabilities of any type of service provider described herein, such as those corresponding to FIGS. 8A-8C.

B. Systems and Methods for Delivering Technical Support Via a Hybrid of Local and Remote Support Services The systems and methods of the centralized remote technical support services described herein may also be deployed for local onsite services. In these embodiments, the solution uses remote services technology to deliver the most appropriate trained technical resource to resolve the customer needs at the customer's home or location. The innovative application of the centralized technology discussed herein with innovative modification to skills and processes for local onsite service improves and optimizes the amount of cost required to deliver services to the home. Without the use of the technology and processes described herein, one or more technicians visits the consumer's home or location for an indeterminate period of time and for additional appointments to be scheduled when the work exceeds either the time or the skill of the one or more technicians.

By using the systems and methods described herein, the skills of the technician visiting the home may be redefined or re-scoped to be associated with connecting devices and enabling connection of the computers to a network or the Internet. The amount of time to perform these tasks is more deterministic and requires a much more focused set of skills. For example, an onsite service home service technician may be dispatched for ½ hour, hour or other predetermined time increments to perform a preliminary diagnostics and to setup up the service work to the Intelligent Switch, much like the store associate in the consumer outlet scenarios described above. Once the interconnection of the consumer device is complete and the device is hooked up to the Intelligent Switch, remote resources from the centralized service may be connected to complete all the necessary installations, configurations, training and repairs. As such, in these embodiments, appropriate skilled resources are applied without the need to send additional technicians to the consumer's location. The onsite technician may leave to attend other service calls once the device is hooked up to the Intelligent Switch.

A typical example scenario for a local onsite service is that a consumer may call for help because his or her computer is slow, lost connectivity to the Internet, experiencing lots of pop-ups and or perhaps would like to install some new devices. A technician may be assigned a time-frame of 1-3 hours reserved to perform the work. When the technician arrives on site he or she may diagnose the problem, and may start with a set of tools to fix the problem and then proceed to hook the computer up to the Internet, or verify connectivity to the Internet. Once done the technician may start to install new devices and software onto the computer. Without the use of the centralized remote technical services described herein, much of the time spent on site is watching the tools fix the problems as they can take a long time to scan and automatically fix problems. In some cases, the technician may run out of time or that there will be aspects of the work that will require another visit by a technician with a different set of skills. With the user of the centralized remote technical services described herein, a predetermined amount of time may be set for the technician for an onsite visit, such as a 1 hour appointment. In that time-period the technician may perform a diagnostics and connect and configure the device to be connected to the Intelligent Switch and pool of remote technical resources. The onsite technician may go to another place to do the same work—another home visit for a predetermined amount of time, after leaving the computer connected to the centralized remote technical support service. At that point, the computer may be assigned from a queue to a remote technician to perform the desired service based on the onsite technician's diagnostics, description of the problem or information submitted to the Intelligent Switch. The remote technician for example may clean and update the software and configuration of the computer and install any new devices. In addition, the remote technician may deliver training to the consumer at his home, such as live one on one training If the remote technician performing the service is not the best or appropriate resource to perform the service, the connection to the consumer's computer may be transferred electronically and real-time to the next appropriate technician with out the need to reschedule an onsite visit.

Figure 6:
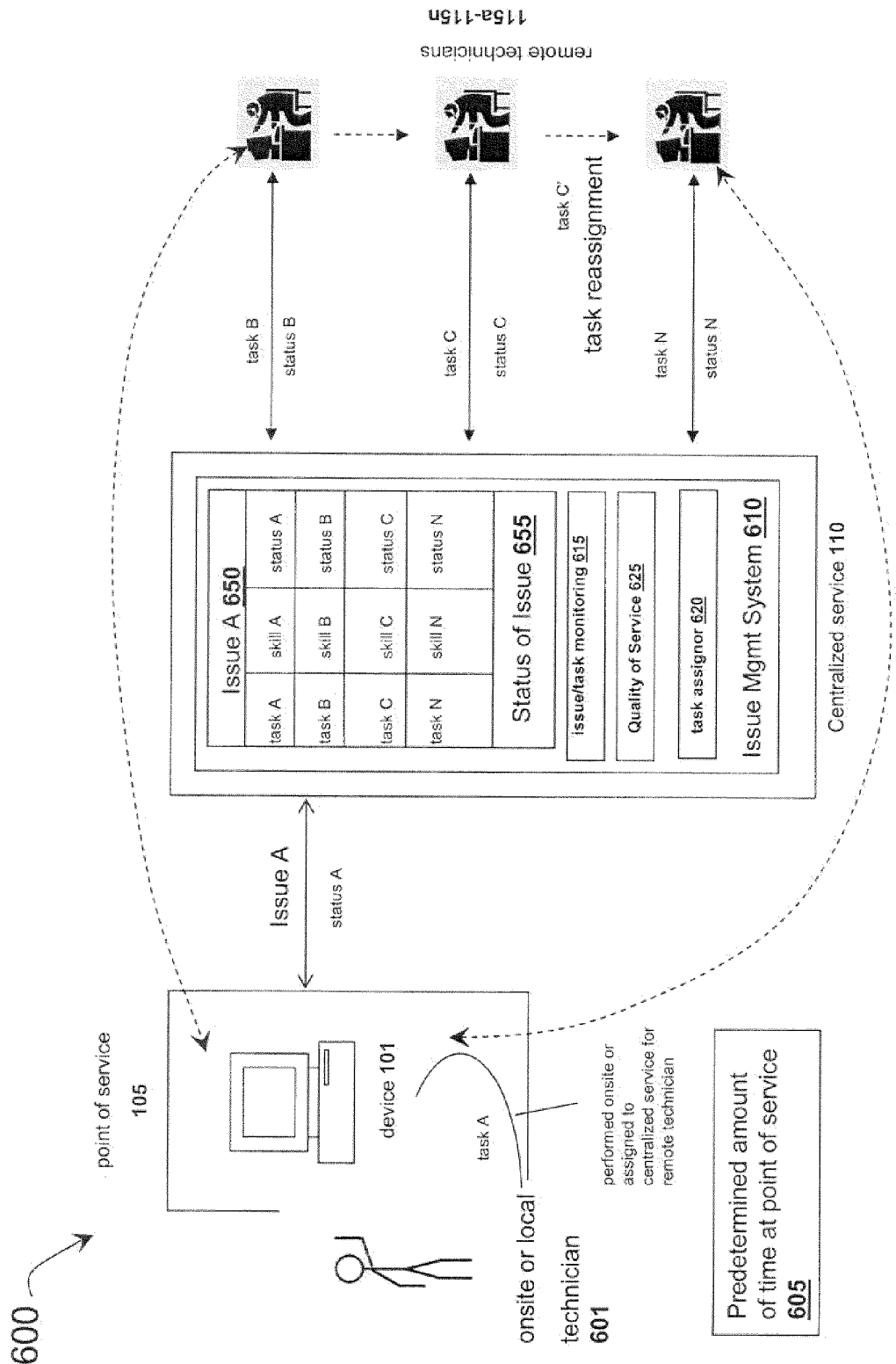
FIG. 6 is a block diagram of an embodiment of an environment to provide hybrid delivery of remote and local technical support via a centralized service.

Referring now to FIG. 6, a block diagram of an embodiment of an environment 600 to provide hybrid delivery of remote and local technical support via a centralized service is shown and described. In such an environment, an onsite or local technician 601 is assigned to provide service to a device 101 located at a point of service 105. The local technician 601 provides service to the device 101 for a predetermined time 605. An issue 650 with the device 101 is identified and communicated to the centralized service 110. The centralized service 110 includes an issue management system 610 that manages one or more issues 650. Each issue 650 may include one or more tasks that require one or more skills. A status 655 of the issue 650 is communicated to the point of service from the centralized service 110. The status 655 may be a function of one or more statuses of the one or more tasks. One or more tasks are assigned by the centralized service 110 to one or more remote technicians (115a-115n). The remote technicians 115 attend to the tasks and communicate a status for each task back to the centralized service 110. The issue management system 610 may include one or more of an issue/task monitoring unit 615, a Quality of Service (QoS) monitor 625 and a task assignor 620.

The point of service 105 may be any type and form of premise at any location. In one embodiment, the premise may be an outlet 103 of a retailer 102. In another embodiment, the premise may be a home. In still another embodiment, the premise may be an office or an office located in a home. In yet another embodiment, the premise may be a store or any other location where a consumer 301 has deployed the device 101. In a further embodiment, the premise may be a company. In some embodiments, the point of service includes any desktop computer or any device located at any type and form of company, business or enterprise. In some embodiments, the premise may be a mobile location. In one of these embodiments, the premise may be any vehicle such as a car, a bus, a truck, a train, a plane or a boat.

In some embodiments, the local technician 601 is an employee, contractor or any other person related to a company which provides onsite support services. An example of such a company is GEEK SQUAD, a subsidiary of BEST BUY of Richfield, Minn. The local technician 601 provides onsite technical support to the device 101. In one embodiment, the local technician 601 is a store associate 305 at an outlet 103 of a retailer 102. In another embodiment, the local technician 601 is a traveling technician deployed at the point of service 105 to provide technical support for the device 101. In one embodiment, the local technician 601 is deployed by a customer support group at an outlet 103 or any other location. In another embodiment, the technician 601 is deployed by the centralized service 110. In still another embodiment, the technician 601 is deployed responsive to receiving a request for technical support at one of the point of service 105, the outlet 103 or the centralized service 110. In yet another embodiment, the technician 601 is chosen based on the request for technical support.

In one embodiment, the local technician 601 receives a communication to provide technical support on the device 101 at the point of service 105. The communication may be generated by any person or automated service at one of a point of service 105, an outlet 103 or the centralized service 110. In another embodiment, the communication may include details based on the request for technical support including but not limited to: nature of the problem, time, date, details of the device 101, history of support provided, name or identification of one or more technicians who previously serviced the device 101, location of the device 101, expected turnaround time and one or more skills required to service the request. The communication may be received by the technician 601 in many ways. In one embodiment, the communication is sent to a mobile device of the technician 601 via one or more networks 104. In another embodiment, the mobile device may include a smartphone, a personal digital assistant (PDA), a laptop or any other mobile device as apparent to one skilled in the art. In still another embodiment, the technician 601 may receive the communication via email, telephone or directly from another individual.

In one embodiment, the technician 601 spends a predetermined amount of time 605 at the point of service 105 in providing technical support to the device 101. In another embodiment, the predetermined amount of time 605 is a fixed amount of time. The predetermined amount of time 605 may be fixed, set or established by any person. In still another embodiment, the predetermined amount of time 605 may be fixed, set or established by an automated service. In one embodiment, the predetermined amount of time 605 is fixed, set or established by the centralized service 110. In another embodiment, the predetermined amount of time 605 is fixed, set or established by the customer. In still another embodiment, the predetermined amount of time 605 is set by the local technician 601. In yet another embodiment, the predetermined amount of time 605 is pre-set by the service provider providing the services described herein. In one embodiment, the predetermined amount of time 605 may be set at any predetermined date, time or schedule. In another embodiment, the predetermined amount of time 605 may be set on the basis of an availability of the local technician 605. In still another embodiment, the predetermined amount of time 605 is an amount of time set or established depending on one or more of nature of the problem, availability of the technician, demand for the technician, nature of the device and feasibility of onsite resolution. In yet another embodiment, the time 605 may be extended till a problem is resolved. In some embodiments, the predetermined amount of time 605 may be reset, re-established or re-fixed depending on one or more of nature of the problem, availability of the technician, demand for the technician, nature of the device, feasibility of onsite resolution and status of resolution. In other embodiments, if the problem is not resolved in the predetermined amount of time 605, the technician 601 refers the problem to the centralized service 110 for resolution. In still other embodiments, the predetermined amount of time 605 can be in any time units including seconds, minutes, hours and days.

The predetermined amount of onsite support time may be based on, caused by or otherwise determined based on the local technician having or applying a limited scope of skills to the issue and/or by limiting the scope of work of the local technicians to a subset of tasks towards resolving the issue. In one embodiment, the predetermined amount of time 605 is enabled by restricting the tasks performed by the local technician 601. In another embodiment, the local technician 601 performs a subset of tasks required for resolving an issue. In still another embodiment, the predetermined amount of time 605 is fixed, set or established on the basis of a predetermined set of tasks that the local technician 601 performs. In yet another embodiment, the predetermined amount of time 605 is determined on the basis of time needed by the local technician 601 to perform the predetermined set of tasks.

In some embodiments, a local technician is deployed having a predetermined or limited set of skills or certification. For example, the local technician may be skilled or certified in an aspect of network connectivity and/or Internet connection configuration or diagnostics of the same. Onsite, the local technician focuses on resolving any issue related to network connectivity in order to establish connectivity to and/or service from the centralized service. In some embodiments, the local technicians task is limited to any one or more of the following: identifying the issue, diagnosing/resolving/establishing operation of the device to connect to a network or the Internet, connecting the device to the Internet and/or the centralized service and providing an identification of the issues and other status information to the centralized service. In another embodiment, if the technician completes the predetermined scope of tasks prior to expiration of the predetermined time period the technician may continue to work on other tasks in resolving the issue for the customer. In one embodiment, the technician may use any remaining time of the predetermined amount of time to upgrade, sell or market any products and services to the customer. In other embodiments, if the technician completes the predetermined scope of tasks prior to expiration of the predetermined time period the technician may complete his visit and go to the next appointment.

The technician 601 provides many different types of technical support to the device 101. In one embodiment, the technician 601 may replace one or more parts of the device 101. In another embodiment, the technician 601 may provide software installation and/or upgrade services to the device 101. In still another embodiment, the technician may run hardware and/or software diagnostics on the device 101. In yet another embodiment, the technician may connect the device to the centralized service for further support and/or resolution of one or more issues 650. In one embodiment, the technician 601 connects the device 101 to the centralized service via an intermediate device 101' (not shown). In another embodiment, the technician 601 installs an agent 307 on the device 101 to connect the device to the centralized system 110. In still another embodiment, the technician 601 transports the device 101 to another location such as another point of service 105 or an outlet 103 to connect the device to the centralized service 110. In a further embodiment, the technician 601 identifies one or more issues 650 for resolution of the problem and communicates the issues to the centralized service 110. In one embodiment, the local technician 601 has a limited skill set of providing connectivity to the centralized service 110. In another embodiment, the local technician 601 may have a skill set to perform one or more of the following: provide remote support, diagnose issues, provide remote connectivity, replace hardware, back up data, load operating system, install software, reload data onto the device 101, set up and configure the device 101 and integrate the device 101 into an environment. In still another embodiment, the local technician 601 may have a skill set to work within a predetermined amount of time.

The local technician 601 may communicate with the centralized service 110 using any type and form of communications and/or devices. In one embodiment, the local technician 601 logs into the centralized service 110 via the device 101. In another embodiment, the local technician 601 logs into the centralized service via a mobile device such as a smartphone, personal assistant (PDA), a BLACKBERRY device or an IPHONE. In still another embodiment, the local technician 601 uses any other laptop, desktop or computing device to log into the centralized service 110. In one embodiment, the local technician 601 records or creates a log of services provided onsite. In another embodiment, the log of services may include but are not limited to the following information: name and/or identification of the local technician, skill set of the local technician, time, nature of problem, details of the device, list of operations performed on the device, results of the operations, identification of an issue, identification of one or more tasks, status of resolution, comments, suggestions and any other information relevant to providing technical support to the device. In still another embodiment, the log of services may be created using a software agent running on the device 101 and in communication with the centralized service 110. In yet another embodiment, the log of services may be created using a web interface. In some embodiments, the centralized service 110 determines, based on the log of services, whether there is an issue that may be resolved by one or more remote technicians.

The centralized service 110 may log, record or capture in any form and format any and all activity performed, occurring or related to use of the centralized service and/or providing of support services, including but not limited to telephone communications, email communications, application use, fax communications, login/logout to device activity, and system, application and operating events. The centralized service 110 may use any type and form of timestamp or mechanism for temporal recording of activities. In some embodiments, the centralized service 110 captures the remote login session to the device to record all the activity from the point of connection to logoff. In some of these embodiments, the centralized service 110 can play back a copy of the entire support session or any portion thereof. In one embodiment, the centralized service 1100 may filter any of the recorded or logged information based on any criteria. In another embodiment, the centralized service 110 may log, record or capture any activity in resolving or support a customer's issue across multiple remote technicians and may include the activity of the local technician. The local technician may log onto the centralized service as soon as possible at the start of the service or any time during the predetermined amount of time to have the centralized service log the local technician's activities as they occur.

In some embodiments, one or more issues 650 are communicated to the centralized service 110. In one of these embodiments, the one or more issues 650 are communicated from the device 101. In another of these embodiments, the one or more issues are communicated to the centralized service 110 via one or more of the point of service 105, the local technician 601, a device of the local technician 601 and one or more intermediate devices 101' including but not limited to servers, computers, networks, hubs, routers, proxies and any other devices as apparent to one skilled in the art. In one embodiment, the issue 650 is one that cannot be resolved by the skill set of the local technician 601. In another embodiment, the issue 650 is one that cannot be resolved by the local technician 601 within the predetermined amount of time 605. In still another embodiment, the issue 650 cannot be resolved by the local technician 601 with the resources available to the technician 601. In yet another embodiment, the issue 650 requires further support to the service performed onsite by the local technician 601. In some embodiments, the issue includes multiple tasks one or more of which cannot be performed by the local technician 601. In one of these embodiments, one or more of the multiple tasks cannot be performed by the local technician 601 within the predetermined amount of time 605.

In one embodiment, the centralized service 110 includes an issue management system 610 to manage the one or more issues 650. The issue management system 610 provides one or more functionalities to manage and/or resolve the one or more issues 650. In one embodiment, the issue management system 610 includes an issue/task monitoring unit 615 that monitors the status of one more issue and/or tasks related to an issue 650. In another embodiment, the issue management system 610 includes a quality of service (QoS) monitor 625 that provides quality control to one or more functionalities of the system 610. In still another embodiment, the issue management system 610 includes a task assignor 620 that manages assignment and/or reassignment of one or more tasks. In some embodiments, the issue management system 610 is implemented as a software. In one of these embodiments, the issue management system 610 includes one or more applications and/or programs. In another of these embodiments, the issue management system 610 executes on one or more devices housing the centralized service 110. In another embodiment, the issue management system 610 is implemented as a hardware unit. In still another embodiment, the issue management unit 610 is implemented as a distributed service/software over one or more hardware units. In still another embodiment, the issue management unit 610 includes both hardware and software components. In yet other embodiments, the issue management unit 610 may include any file, library, executable code, rule engine, database and other software as apparent to one skilled in the art. In some embodiments, the issue management unit communicates with one or more local technicians 601 and one or more remote technicians. In one of these embodiments, the issue management unit includes an interface to communicate with the one or more technicians.

In one embodiment, the issue management system 610 includes the issue/task monitoring unit 615. In another embodiment, the issue/task monitoring unit 615 monitors the statuses of one or more tasks. In still another embodiment, the issue/task monitoring unit 615 communicates the status of issue 655 to one of the device 101, the point of service 105 or a device of the local technician 601. The issue/task monitoring unit 615 may monitor the statuses of the tasks and/or the issue in many ways. In one embodiment, updates about the statuses of the one or more tasks may be pushed to the issue/task monitoring unit as they are received at the centralized unit 110. In another embodiment, the issue/task monitoring unit 615 polls the statuses of the tasks to receive the updates. In still another embodiment, the issue/task monitoring unit 615 communicates with the task assignor 620 and/or the quality of service monitor 625 to provide information on the status of the tasks and/or issue. In one embodiment, the issue/task monitoring unit 615 is implemented as an integrated part of the issue management system 610. In another embodiment, the issue/task monitoring unit 615 is implemented as a separate software and/or hardware unit. For example, the issue/task monitoring unit 615 may be implemented as a function or subroutine. In still other embodiments, execution of the software for the issue monitoring unit 615 may be distributed over one or more hardware units.

The task assignor 620 manages assigning of the one or more tasks to one or more remote technicians 115a-115n (115 in general). In one embodiment, the task assignor 620 is a part of the intelligent switch 106 as described with reference to FIG. 2. In another embodiment, the task assignor 620 includes a policy engine 224 that operates on the basis of a set of rules 226. In still another embodiment, the task assignor 620 communicates with the technician database 215 to choose one or more remote technicians 115 for one or more tasks. In yet another embodiment, the task assignor 620 assigns a technician 115 to a task on the basis of one or more capabilities 210 of the technician 115 corresponding to one or more service level attribute 205 identified for the task. In one embodiment, the task assignor 620 assigns a task to a work queue 108. In another embodiment, the task assignor 620 communicates with the queue manager 230 to manage assignment and/or reassignment of tasks to one or more queues. The technician database 215, remote technicians 115, capabilities 210, service level attributes 205, policy engine 224, rules 226, queue 108 and queue manager 230 are described with reference to FIG. 2.

In some embodiments, the task assignor 620 communicates with the issue/task monitoring unit 615 and QoS monitor 625 to manage assignment of the tasks. For example, if the issue/task monitoring unit 615 reports that a technician 115c has not updated the status of an assigned task C and/or a last update of status C indicates that task C is not being completed as expected, the task assignor 620 reassigns the whole or part of task C as task C' to another technician 115n. In other embodiments, the task assignor 620 receives feedback from the QoS monitor 625 to determine if the quality of service for a task satisfies the predetermined service threshold 222. In one embodiment, if the quality of service falls below the predetermined service threshold 222, the task assignor 620 reassigns the task to another technician. In one embodiment, the task assignor manages assignments and reassignments of local technicians 601 to provide onsite technical support.

The QoS monitor 625 may be implemented in any way and on any device. In one embodiment, the QoS monitor 625 is implemented as software and may include one or more of subroutines, files, libraries, and executable codes. In another embodiment, the QoS monitor 625 may include one or more parameters defining the predetermined service threshold 222. In still another embodiment, the QoS monitor 625 includes one or more hardware units. In some embodiments, the QoS monitor 625 executes a plurality of logical, mathematical and Boolean operations. In one of these embodiments, the QoS monitor 625 performs comparisons and/or calculations on one or more attributes of the tasks and one or more attributes and/or parameters related to the predetermined service threshold 222.

One or more issues 650 may be identified for the device 101. In one embodiment, the one or more issues are identified by the local technician 601. In another embodiment, the one or more issues are identified by the customer. In still another embodiment, the one or more issues are identified by the centralized service 110. In yet another embodiment, one or more of the centralized service 110, the customer and the local technician 601 participate in identifying the one or more issues 650. In one embodiment, the one or more issues 650 are addressed and/or resolved to complete the request for technical support. An issue 650 may include several attributes. In one embodiment, resolving an issue 650 may include completion or execution of one or more tasks (task A, task B, task C, task N etc.). In another embodiment, execution of each task may require a separate skill. For example completing or executing task A may require skill A, completing task B may require skill B and completing task C may require skill C. In still another embodiment, one or more tasks may require one skill or a combination of skills. As an example, task A and task N may require skill C and task C may require one or more of skill A, skill B and skill N. In some embodiments, each of the tasks has a status. In one of these embodiments, the status 655 of the issue 650 may depend on one or more of the task statuses.

In one embodiment, each of the tasks has to be completed to resolve the issue 650. In another embodiment, resolution of the issue 650 may include completion of one or more essential tasks and one or more optional tasks. In still another embodiment, the issue 650 may be resolved via completion of the one or more essential tasks. In yet another embodiment, completion of one or more tasks may be dependent on completion of one or more other tasks. As an example, completing task A may be dependent on completion of tasks B and C. In such cases the tasks are completed in a predetermined order. In a further embodiment, the tasks may be completed in any order. In some embodiments, all or some of the tasks are prioritized.

In some embodiments, the tasks for resolving the issue 650 are determined by the local technician 601. In other embodiments, the tasks for resolving the issue 650 are determined by the centralized service 110. In still other embodiments, the local technician 601 and the centralized service 110 work in conjunction to determine the tasks for resolving the issue 650. In one embodiment, the local technician 601 and/or the centralized service 110 may modify or delete one or more tasks determined by the local technician 601 and/or the centralized service 110. In another embodiment, the centralized service 110 and/or the local technician 601 determines the tasks based on one or more attributes of the issue 650. In one embodiment, one or more mathematical, statistical, logical or Boolean operations are performed by the centralized service 110 on one or more attributes of the issue 650 to determine the tasks for resolving the issue 650. In another embodiment, the tasks for resolving the issue 650 may be determined by a software agent 307 executing on the device 101. In still another embodiment, the software agent 307 may communicate with one or more of the local technician 601 and the centralized service 110 in determining the tasks. In some embodiments, one or more remote technicians determine or identify the issues of the customer with or without the local technician.

In one embodiment, the centralized service 110 identifies one or more skills required for completion of each of the tasks. In another embodiment, the centralized service 110 identifies the one or more skills based on an identification of a work type 202. In still another embodiment, the work type for each task is identified by one or more service level attributes 205. In yet another embodiment, skill is identified as a service level attribute 205. Work type 202 and service level attributes 205 are described with reference to FIG. 2.

The centralized service 110 provides one or more updates on the issue 650 by providing a status 655 of the issue 650. In one embodiment, the status 655 includes information on what percentage of the issue 650 has been resolved. In another embodiment, the status 655 may include one or more queries requiring a feedback from one of the device 101, the point of service 105 or the local technician 601. In still another embodiment, the status 655 includes identification of statuses of one or more tasks. In yet another embodiment, the status 655 identifies which tasks have been completed and/or which tasks are pending. In some embodiments, the statuses of the one or more tasks are communicated to the centralized device 110 from a corresponding remote technician 115 attending to the task. In a further embodiment, the status 655 is derived from the one or more statuses of the tasks identified to resolve the issue 650.

Figure 7:
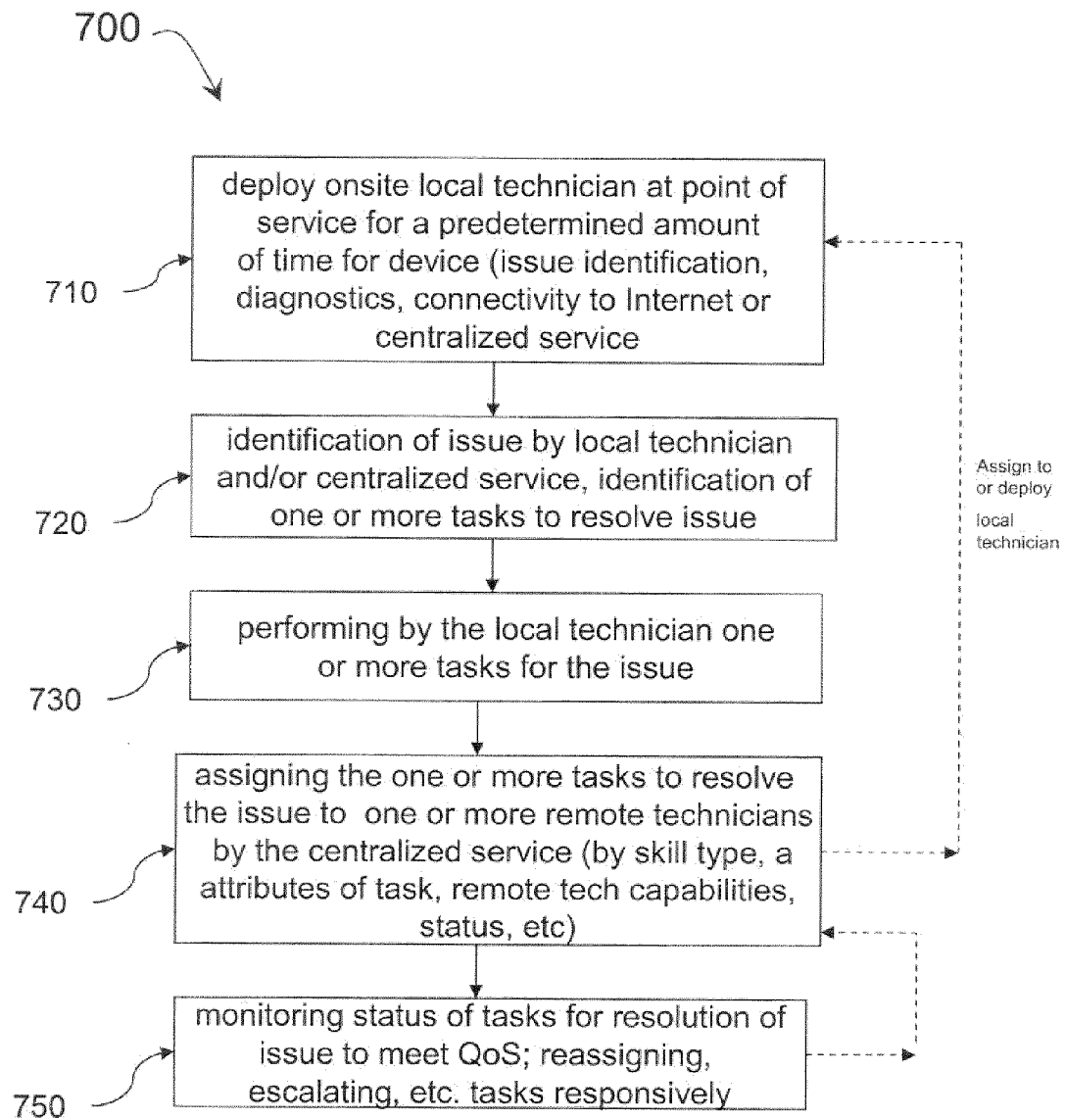
FIG. 7 is a flow diagram depicting steps of an embodiment of a method to manage hybrid delivery of remote and local technical support via a centralized service.

Referring now to FIG. 7, a flow diagram depicting steps of an embodiment of a method to provide and manage hybrid delivery of remote and local technical support via a centralized service is described. In one embodiment, the method includes deploying (step 710) a local technician at a point of service to provide onsite technical support to a device. An issue with the device and one or more tasks for resolving the issue are identified (step 720) and the local technician performs (step 730) one or more tasks for the issue. The centralized service assigns (step 740) one or more tasks to resolve the issue to one or more remote technicians and monitors (step 750) the statuses of the one or more tasks.

The local technician 601 is deployed (step 710) at the point of service 105 to perform one of a plurality of possible tasks. In one embodiment, the local technician 601 performs a diagnostic test on the device 101. In another embodiment, the technician 601 identifies one or more issues with the device 101 that are to be resolved. In still another embodiment, the technician 601 identifies one or more tasks associated with each issue. In another embodiment, the technician performs service on the device 101 to resolve one or more issues and/or tasks. In yet another embodiment, the technician 601 connects the device 101 to the centralized service 110. In one embodiment, the technician 601 checks, repairs, troubleshoots or establishes a connectivity of the device 101 to the internet and/or the centralized service. In further embodiments, the local technician 601 may perform any task or function such as the ones described with reference to FIG. 6.

In one embodiment, the technician 601 is deployed to spend a predetermined amount of time 605 at the point of service 105 in providing technical support to the device 101. The predetermined amount of time 605 is may be fixed, set or established by any person or automated service such as the centralized service 110, the customer or the local technician 601. In another embodiment, the technician 601 is deployed for the predetermined amount of time 605 as pre-set by the service provider providing the services described herein. In one embodiment, the technician 601 may be deployed at any predetermined date, time or schedule. In another embodiment, the technician 601 may be deployed on the basis of an availability of the technician 605. In still another embodiment, the technician 601 may be deployed for a predetermined amount of time 605 depending on one or more of nature of the problem, availability of the technician, demand for the technician, nature of the device and feasibility of onsite resolution. In yet another embodiment, the technician 601 may be deployed for a time extended till a problem is resolved. In other embodiments, if the problem is not resolved in the predetermined amount of time 605, the deployed technician 601 refers the problem to the centralized service 110 for resolution. In one embodiment, the technician 601 is deployed responsive to a customer contacting the centralized service 110 about the device. In another embodiment, the customer may contact the centralized service via a website, email or any other form of electronic communication. In other embodiments, the customer may contact persons associated with the centralized service via phone, postal mail or helpdesk services. In still other embodiments, the deployed technician 601 is selected based on information on the device 101 provided by the customer. The centralized service 110 may select the appropriate or desired local technician to deploy onsite based on information received from the customer. Via this customer contact, a pre-evaluation of the issue may occur to determine the nature of the issues and the technician to deploy onsite. This may be done in cases when the customer cannot first connect to the device to the Internet and/or the centralized service.

In one embodiment, one or more issues and/or tasks to resolve the one or more issues are identified (step 720). In one embodiment, the one or more issues are identified by the local technician 601. In another embodiment, the one or more issues are identified by the centralized service 110. In still another embodiment, the local technician 601 and the centralized service 110 identifies one or more tasks to resolve the issue. In yet another embodiment, the local technician 601 may work in cooperation with the centralized system 110 to identify the one or more issues and/or one or more tasks. In a further embodiment, the local technician 601 and the centralized service 110 exchange information with each other in identifying the one or more issues and/or one or more tasks. In some embodiments, the tasks are identified based on a predetermined checklist or template. In one of these embodiments, the checklist or template is parsed for each issue to determine a list of tasks related to the issue. In another of these embodiments, the checklist or template is prepopulated with known issues and the corresponding tasks. In still another of these embodiments, the checklist or template is adaptively created and/or modified.

The local technician 601 performs (step 730) one or more tasks to resolve one or more of the identified issues 650. In one embodiment, the local technician 601 performs a part of one or more tasks. In another embodiment, the technician 601 performs the one or more tasks for a predetermined amount of time 605. In still another embodiment, the technician 601 completes all parts of one or more tasks if within skill level and/or time available to the technician. In one embodiment, the technician 601 works in communication with the centralized service 110 to perform the one or more tasks. In another embodiment, the technician 601 may collaborate, consult or coordinate with one or more other local technicians 601 and/ or one or more remote technicians 115. In still another embodiment, performing the one or more tasks include installing an agent 307 or other software to connect the device 101 to the internet and/or the centralized service 110.

The centralized service 110 assigns (step 740) one or more tasks to resolve the issue 650 to one or more remote technicians 115. In one embodiment, the assignment is done responsive to receiving a communication from one of the device 101 or the local technician 601 such as a status 655 of the issue 650. In another embodiment, a task assignor 620 of the centralized service 110 manages the assigning of the one or more tasks to the one or more remote technicians. In yet another embodiment, the centralized service 110 reassigns to one or more technicians 115, one or more tasks previously assigned to one or more other remote technicians 115. In one embodiment, the assignment and/or reassignment of tasks is done on the basis of one or more of: skill type required or desired for the task, one or more attributes of the task, capabilities of the remote technicians, statuses of the tasks and/or issues and availabilities of the remote technicians. In another embodiment, the centralized service 110 assigns the one or more tasks to one or more queues 108. In still another embodiment, the queue manager 230 of the centralized service 110 manages assignments and reassignments to the queues 108.

In one embodiment, the assigning of step 740 includes deploying one or more local technicians 601 to provide onsite support at the point of service 105. In another embodiment, one or more additional local technicians 601 are deployed or assigned to provide onsite support based on communication received from the local technician 601 previously deployed. In still another embodiment, one or more local technicians 601 are deployed responsive to the centralized service receiving a request for providing technical support on a device 101 located at a point of service 105.

The centralized service 110 monitors (step 750) the issue and/or the status of one or more tasks for resolution of the issue 650. In one embodiment, the monitoring includes determining if the support provided by the one or more remote and/or local technicians satisfies a predetermined service level threshold 222. In another embodiment, the monitoring includes determining if a task assigned to a remote technician 115 is completed within a reasonable time. In still another embodiment, the centralized service 110 reassigns and/or escalates a task to a different remote or local technician responsive to determining that a task assigned to a technician is not serviced within a reasonable time and/or the service provided fails to satisfy the predetermined service level threshold 222. In yet another embodiment, the centralized service 110 may escalate a task to a high priority status on monitoring that a critical event has occurred. In a further embodiment, the monitoring may include communicating with the queue manager to determine availability of one or more remote and/or local technicians. In another embodiment, the monitoring includes determining if the issue is resolved within a predetermined amount of time.

Although the embodiments of the systems and methods of FIGS. 6 and 7 are generally described using remote and local onsite services for hybrid delivery or performing a service and tasks thereof, these systems and methods may be used for any combination of remote service personnel, local service personnel and automated systems. For example, the systems and methods of FIGS. 6 and 7 could be used to deliver services via a hybrid of remote service personnel and automated systems. In another example, the systems and methods of FIGS. 6 and 7 could be used to deliver services via a hybrid of local service personnel and automated systems. In another example, the systems and methods of FIGS. 6 and 7 could be used to deliver services via a hybrid of remote, service personnel, local service personnel and automated systems. With the systems and methods described herein, the centralized service can flexibly, intelligently, effectively and efficiently select the appropriate type of hybrid delivery model and manage, monitor and execute the same centrally on behalf of the requestor.

C. Systems and Methods for Delivering Services Via a Platform as a Service

Figure 8A:
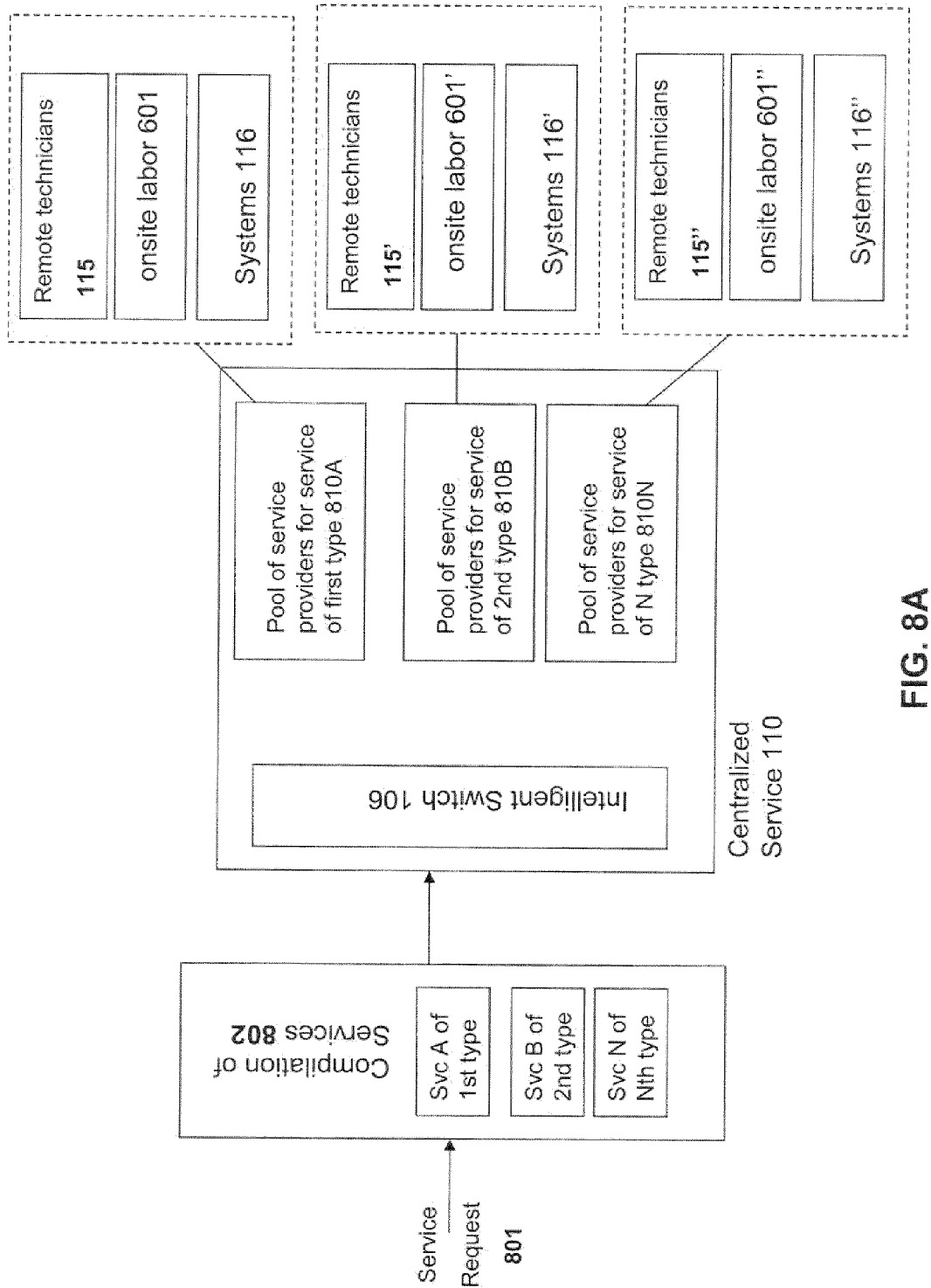
FIG. 8A is a block diagram that depicts an embodiment of an centralized service for performing a plurality of services from a request.
Figure 8B:
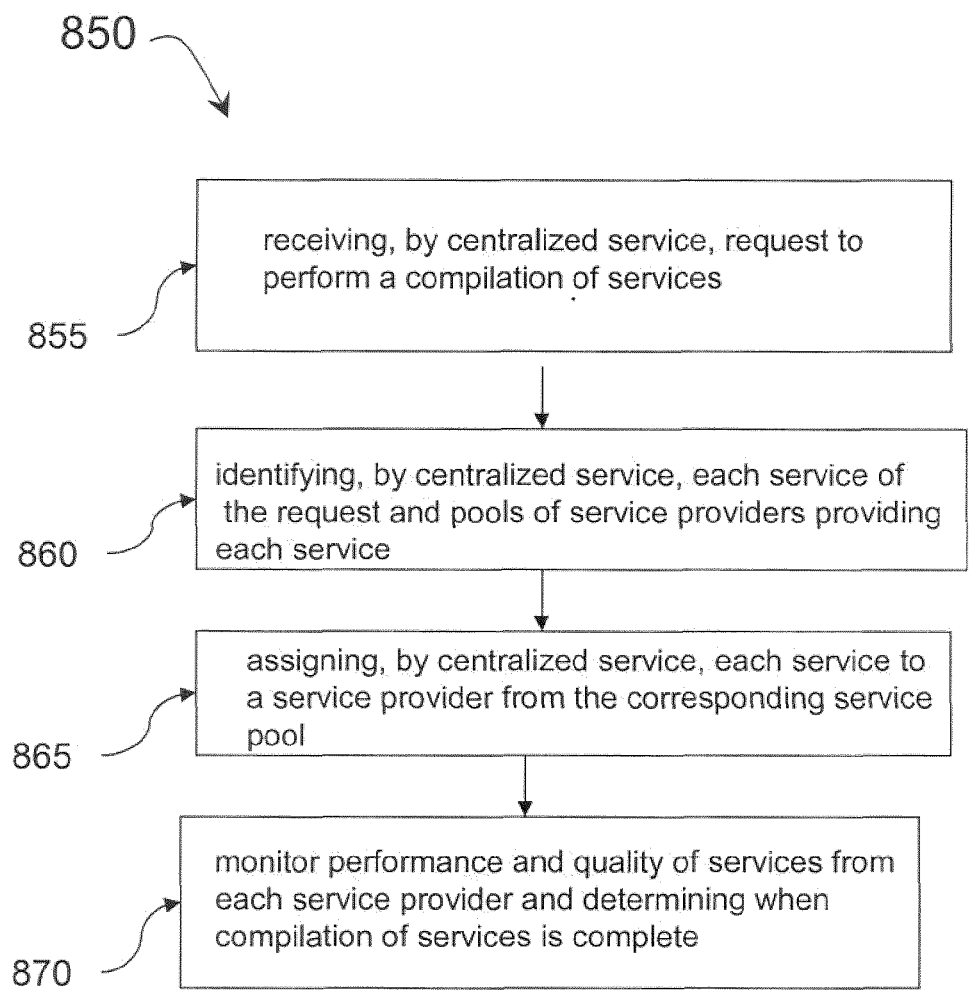
FIG. 8B is a flow diagram depicting steps of an embodiment of a method for performing a plurality of services from a request.
Figure 8C:
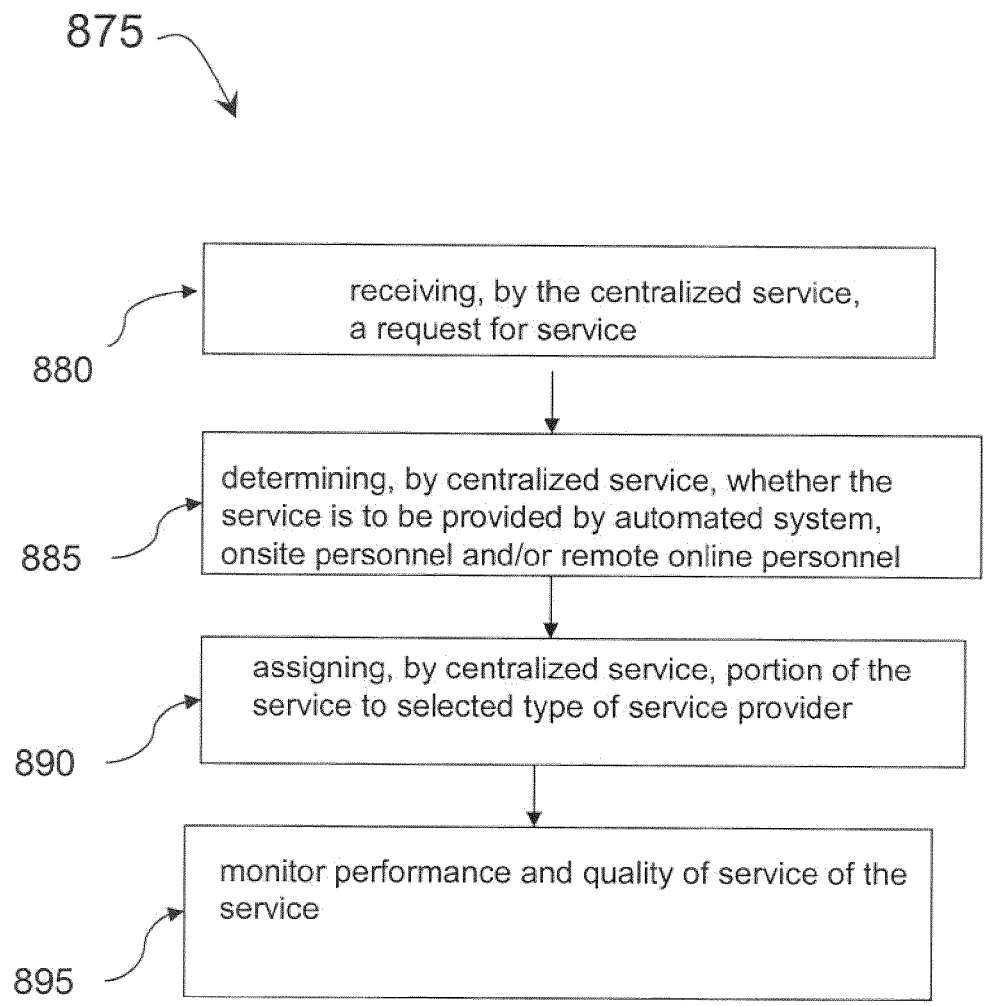
FIG. 8C is a flow diagram depicting steps of an embodiment of a method for monitoring quality of service.

Referring now to FIGS. 8A-8C, embodiments of systems and methods for delivering a combination of services via the centralized service is depicted. The centralized service may provide a platform such as via a platform as a service (PaaS) model to allow a plurality of discrete service providers to deliver a combination of services in a combined model. The centralized service may combine and delivery to a requestor a plurality of discrete services that each may be performed by a different service pool and corresponding service providers.

For example, a bundle of services may be offered via the centralized a service. A first service may be remote technical support services offered by the centralized service itself. A second service may a home device purchase and installation service offered by an entity external to the centralized service. A third service may be a mobile device service offered by another entity external to the centralized service. For example, a compilation or bundle of services may be offered, such as remote technical support service from Plumchoice, Inc, home theater purchase and/or installation services from BestBuy, Inc. and mobile device service via AT&T or Verizon. A user may subscribe or request these bundle of services via the centralized service. The centralized service may select and assign for the Plumchoice, Inc. related service a remote technician from a pool of technicians. The centralized service may select and assign for the BestBuy service an onsite labor resource from a pool of onsite providers that can provide the BestBuy service. The centralized service may select and assign for the mobile device service an onsite labor resource and/or remote service from a pool of providers that can provide the mobile device service. For each of the services, the centralized service can manage service provider pools for that service.

Referring now to FIG. 8, an embodiment of an environment for managing the delivery of bundled services by the centralized service is depicted. The centralized service may manage the assignment of each service in the bundle of services to an appropriate service provider of a pool of service providers corresponding to the service. The centralized service 110 may receive a request 901 identifying or requesting a bundle of services 801. The bundle of services may comprise services A-N each with a corresponding service type 1-N. Each of the services may be associated with different entities. The centralized service may manage pools of services providers corresponding to different services by service type. For example, the centralized service may manage a pool of services providers 810A for service A of the $1^{st}$ type, a pool of service providers 810B for service B of a $2^{nd}$ type, and a pool of service providers 810N for service N of an Nth type. Each of the pool of service providers may include a remote technician type of service provider, an onsite labor type of service provider or a system 116, or any hybrid or combination of these service provider types.

In further detail, the request 801 may comprise a request for any combination of services 801. In some embodiments, the request is a plurality of requests, each for a different service. In some embodiments, the request identifies a predetermined bundle of services 802, such as via a bundle identifier or name. In some embodiments, the request is a confirmation of a subscription to the compilation of services 802. In some embodiments, the request is a selection from a user interface, such as via a web-site, of the compilation of services. In some embodiments, the request is communicated from an agent of a device. In some embodiments, the delivery component of the agent transmit the request. In some embodiments, the sales component of the agent transmits the request. In some embodiments, the request is generated from an acknowledgement or confirmation from a user to the offer of the compilation of services via the agent. In some embodiments, a user submits the request for the compilation of services via a single user interface element selection via a mobile or wireless device. In some embodiments, the request comes from a user via a communications interface provided by the agent.

The compilation of services 802 may comprise any combination of any type and form of services. The services may be discrete and/or heterogeneous with respect to each other. In some embodiments, the services in the bundle 802 are discrete and/or heterogeneous relative to the entity offering for sale each services (e.g., Company A offers service A and Company B offers Service B). In some embodiments, the services in the bundle 802 are discrete and/or heterogeneous relative to the entity brand for each service. In some embodiments, the services in the bundle 802 are discrete and/or heterogeneous relative to source each of the services. In some embodiments, the services in the bundle 802 are discrete and/or heterogeneous relative to the type of sales channel each of the services are offered and/or sold. In some embodiments, the services in the bundle 802 are discrete and/or heterogeneous relative to where the customer or user purchases each of services.

In some embodiments, the services in the bundle 802 are discrete and/or heterogeneous relative to the type of device each service is being delivered. In some embodiments, the services in the bundle 802 are discrete and/or heterogeneous relative to the type of software each service is provisioning. In some embodiments, the services in the bundle 802 are discrete and/or heterogeneous relative to the type of skills each service requires. In some embodiments, the services in the bundle 802 are discrete and/or heterogeneous relative to the location each service is being delivered to. In some embodiments, the services in the bundle 802 are discrete and/or heterogeneous relative to the service providers capable of provides the service. In some embodiments, the services in the bundle 802 are discrete and/or heterogeneous relative to the type of service providers providing the service. In some embodiments, the services in the bundle 802 are discrete and/or heterogeneous relative to the whether the service provider is remote service personnel, onsite service personnel or an automated system.

In some embodiments, the centralized service provides or identifies the compilation of services 802, such as via service compiler. In some embodiments, a user is able to create or identify a compilation of service. For example, the user may select from a plurality of services via a web-site or other application to form a compilation of services 802. In some embodiments, an entity, such as a retailer or wholesaler, may create or identify a compilation of services. The compilation of services may be a predetermined set or bundle of discrete services. In some embodiments, the compilation of services may be dynamically generated or identified on demand.

The type for a service may be identified by a name, code or identifier. In some embodiments, the type is identified by the centralized service by the name, core of identifier of the service. The service identifier may encode the type. The service name and/or type identifiers may be created, encoded, managed and organized in any manner.

The centralized service may identify the service and/or service type from the request. In some embodiments, prior to performing any of the services in the bundle and/or assigning the service to a queue of a service provider, the centralized service may determine the work type for each service from the request as described above in connection with FIG. 4. In some embodiments, the centralized service performs any of the operations described with work request 201 in FIG. 4 for each of the services in the bundle of service 802. The centralized service may perform the operations of each service in the bundle as or like discrete work requests 201 and working with any combination of the different and/or the same service level attributes, sets of queues, 109, capabilities 210 and capabilities databases 215 for each service and corresponding service providers.

Each service may be performed or delivered by a different pool of service providers 810. The pool of service providers may be organized in any manner logical or desired or predetermined in accordance with type of service. In some embodiments, each type of service as corresponding one or more pools of service providers. In some embodiments, a plurality of different services may share a pool of services providers. In some embodiments, a plurality of different services may share one or more service providers. In some embodiments, one or more of the same service providers may be in different pool of services providers for different services. In some embodiments, a pool of service providers may include service providers of the remote online type. In some embodiments, a pool of service providers may include service providers of the system type. In some embodiments, a pool of service providers may include service providers of the online or local labor type. In some embodiments, a pool of service providers may include any combination of remote online, system, and/or onsite types. In some embodiments, any one or more pools of service providers is managed by an embodiment of a second centralized service.

Each service provider and/or pools of service providers may be under control and/or management of the same or different entity. In some embodiments, service provider and/or pools of services providers may be under the control and management of one entity. In some embodiments, service provider and/or pools of service providers may be under the control and management of an entity different that of any one or more other service providers and/or pools of service provider. Each service provide and/or pools of service providers may be located in the same or different geographic locations.

Referring now to FIG. 8B, embodiments of steps of a method 850 are depicted. In brief overview, at step 855, the centralized service receives a request to perform a compilation of services. At step 860, the centralized service identifies each service of the bundle of services requests. the type of service and any service pools corresponding to that type of service. At step 865, the centralized service assigned for each service a service provider from the corresponding service pool. At step 870, the centralized service monitor the performance and quality of the compilation of services.

In further detail of step 855, the centralized service may receive any type and form of request for a compilation of services. The request may be received via a web site. The request may be received via an agent. The request may be received via a wireless device of the requestor. The request may be received via a communications interface. The centralized service may receive a plurality of requests and identify the request from the same user and aggregate the requests. A request may be received via an interface to a system of another entity, such as a sales or ordering system. The request may identify a predetermined bundle of services. The request may identify each of a plurality of services.

At step 860, the centralized service may identify each of the services making up the bundle or compilation of services. The centralized service may identify each of the services based on a name of the compilation or bundle and querying a database identifying each of the services in the bundles. The centralized service may identify each of the services from an encoding of the bundle name or identifier. The centralized service may identify each of the services from content of the request.

For each service, the centralized service identifies or determines the service type. The centralized service may identify the service type from the service identifier. The centralized service may identify the service type from the bundle identifier. The centralized service may identify the service type from the request. The centralized service may identify the service type from a database comprising index of services, service types and/or compilation of services.

Based on the service and/or service type, the centralized service identifies or selects a pool of service providers for that service. In some embodiments, the centralized service identifies or selects one pool of services providers for that service or service type. In some embodiments, the centralized service identifies or selects one pool of service providers for that service or service type from a plurality of pools that correspond to that service or service type. The centralized service may break down each service into a plurality of work requests. For each of the plurality of work requests, the centralized service may identify a pool of service providers.

At step 865, for each service in the bundle, the centralized service assigns a service provider from the corresponding selected pool of services providers to perform the service or portion thereof. In view of FIG. 4, the centralized service may for each service determine or identify one or more work types and one or more service level attributes corresponding to each work type. Based on matching service level attributes of the work type to the capabilities database of service providers, the centralized service selects a service provider from the pool and assigns the work or service request to the queue of the selected service provider. The centralized service may break down each service into a plurality of work requests. For each of the plurality of work requests, the centralized service may select a service provider from a pool based on matching service level attributes of the work type to the capabilities database of service providers.

At step 870, the centralized service may monitor performance and/or quality of service of the compilation of services. The centralized service may monitor the performance of each of the services in the compilation of services to determine the status of the compilation of services. The centralized service may monitor the performance of each of the services in the compilation of services to determine whether the compilation of services has been completed. The centralized service may monitor the performance of each of the services in the compilation of services to determine the amount of time, estimated or otherwise, to complete the compilation of services. The centralized service may monitor the performance of each of the services in the compilation of services to determine when the compilation of services has been completed or when the compilation of services may be completed. Based on the performance status of each of the services, the centralized service may manage and report the performance status of the compilation of services.

Using any of systems and methods of FIGS. 6 and 7, in some embodiments, the centralized service may treat or consider each service as a task to manage the status of the service. For example, the centralized service may manage the compilation as an issue 650 identified in FIG. 6 with the plurality of services as tasks A-N to determine the status of the issue 655. Using any of systems and methods of FIGS. 6 and 7, in some embodiments, the centralized service may manage each service as a task and each service having sub-tasks to manage the status of the service. For example, the centralized service may manage a service from the compilation as an issue 650 identified in FIG. 6 with a plurality of tasks A-N to determine the status of the issue 655. In some embodiments in view of FIGS. 6 and 7, the centralized service may both manage the compilation of services as an issue 650 with services as tasks, and each service as an issue with tasks of the services as tasks. Any of the embodiments of FIGS. 4, 6 and 7 may be used in assigning, tracking and managing services of a compilation of services.

The centralized service may monitor the quality of service of each of the services in the compilation of services to determine the quality of service of the compilation of services. The centralized service may monitor the quality of service of each service in the compilation of services against a predetermined service threshold for that service. The centralized service may monitor an aggregation of the quality of services of each service against a predetermined service threshold for the compilation of services. The predetermined service threshold for the compilation may be any summation, aggregation or combination, weighed or otherwise, of each of the service thresholds of the services making up the compilation. Based on the monitoring of performance and/or quality of service of the compilation of services, the centralized service may identify and store any related measurements to the capabilities database for the service providers.

Referring now to FIG. 8C, embodiments of a method 875 for determining what type of service provider to perform a service is depicted. In brief overview, at step 880, the centralized service receives a request for service At step 885, the centralized service determines what type of service provider is to be used or assigned to perform the service. At step 890, the centralized service assigns the service or portion thereof to a service provider of the selected type. At step 895, the centralized service monitors the performance and quality of the service by the service provider.

In further details of step 880, the centralized service may receive a request for one service or a plurality of services. In some embodiments, the centralized service receives a request for a compilation of services. In some embodiments, the request identifies the service type. In some embodiments, the request identifies the type of service provider.

At step 885, the centralized service determines the type of service provider to service the requested service. Service providers may be identified as any of the following types: remote online service provider, onsite or local service provider, or a system based service provider (e.g., automated system). In some embodiments, the centralized service determines the type of service provider from the type of service. In some embodiments, the centralized service determines the type of service provider from the request, such as via content of the request.

In some embodiments, the centralized service via a database matches the type of service to the type of service provider for the service. In some embodiments, the centralized service via a database matches the service to the type of service provider for the service. In some embodiments, the centralized service via a database matches the service and type of service to the type of service provider for the service. In some embodiments, the centralized service via a database matches any requestor information, such as location, service environment and/or device environment, to the type of service provider for the service.

In some embodiments, the centralized service identifies via performance and/or quality of service data stored in capabilities database any statistics of performance or quality by type of service provider. In cases where multiple types of service providers may be used for the same type of service, the centralized service may select one service type over another based on statistics regarding performance and/or quality of service.

At step 890, the centralized service selects a service provider corresponding to the selected service provider type. In some embodiments, the centralized service selects a service provider from a pool of service providers corresponding to the service provider type. In some embodiments, the centralized service selects a service provider of the service provider type from a pool of service providers corresponding to the service and the pool of service providers comprising different service provider types.

The centralized service may select the service provider corresponding to the service provider type and using any of the techniques described in conjunction with FIGS. 4, 6 and 7. In some embodiments, the centralized service provider may select a plurality of service providers of the selected service provider type to perform the service. In some embodiments, one selected service provider performs one portion of the service, such as a first task, and a second selected service providers performs another portion of the service, such as a second task.

At step 895, the centralized service monitors the performance and/or quality of service of the requested service. The centralized service may the performance and/or quality of service of the selected service provider(s) of the selected service provider type. The centralized service may store any performance and/or quality of service metrics on the service and/or service provider and/or service provider type to a capabilities database.

D. Systems and Methods for Delivering Services Via a Client Agent

Figure 9A:
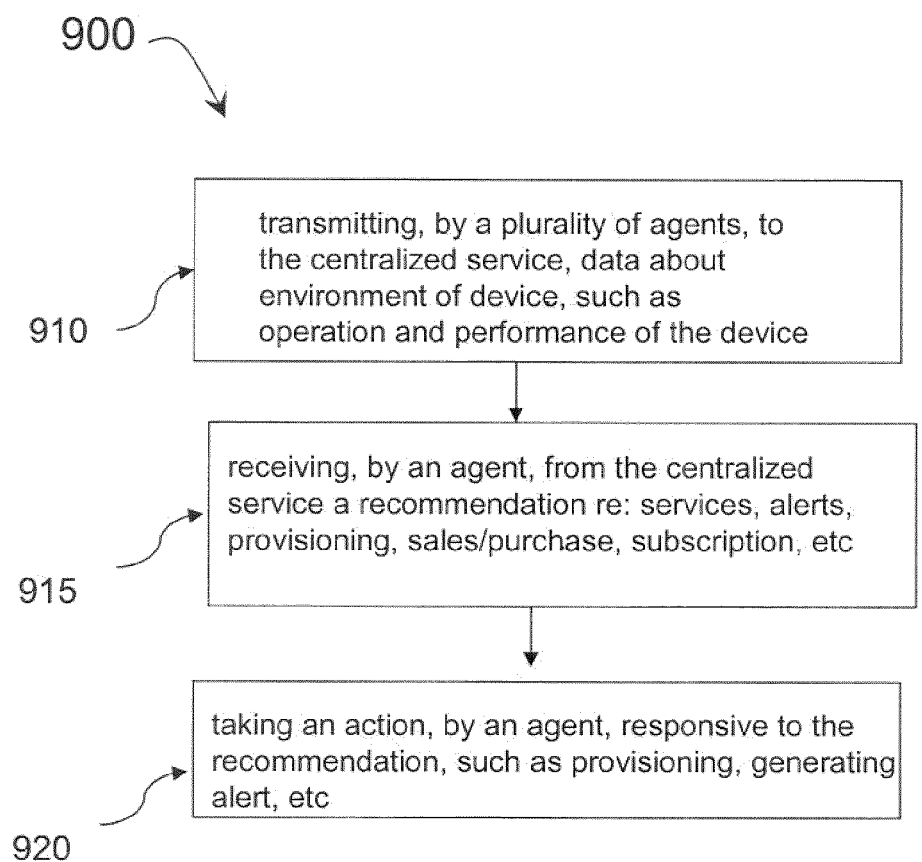
FIG. 9A is a flow diagram depicting steps of an embodiment of a method of an agent to provide services to a device from the centralized service.

Referring now to FIG. 9A, embodiments of steps of a method 900 for an agent of a device to deliver services in connection with the centralized service is depicted. In brief overview, at step 910, a plurality of agents of a plurality of device transmit data about the environment of the device to the centralized service. At step 915, any one or more agents may receive a recommendation from the centralized service. At step 920, responsive to the centralized service, the agent make take any one or more of a plurality actions related to the functionality of the agent.

In further details, at step 910, each of the plurality of agents may transmit data about the environment of the device to the centralized service. The agents may stream the data as discovered. The agents may collect the data and send one or more batches of data to the centralized service. The agents may store the data locally, permanently or temporarily, and send a copy of the data to the centralized service. The agents may store the data to a remote network accessible storage of the centralized service. In some embodiments, the agents may transmit data to a local collection point, such as an aggregator agent, such as the embodiments depicted in FIG. 5, Each agent may be deployed on heterogeneous devices in type and/or environments. In some embodiments, each agent may execute on a device that is different than a device of another agent. Some agents may be deployed on the same type of device as other agents. Each agent may be deployed on a device with the same or different operating system. Each agent may be deployed on a device with different configuration of software, including the operating system, drivers, applications. etc. Each agent may be deployed on a device with different configuration of hardware components of the device, such as memory size, storage size, display types, etc. Each agent may be deployed on a device with different types of hardware components, such as different processor, memory types and chips, storage types, display types, etc. Each agent may be deployed on a device with different types of network interfaces. Each agent may be deployed in a network environment (devices, network fabric, servers, ISPs) than network environments of other agents and devices.

Via the discovery and/or data collection components/functionality of the agent, each agent may transmit data about the number, type and configuration of each software and hardware component of the device. Each agent may transmit data about the operation of the device. Each agent may transmit data about the operation of software on the device. Each agent may transmit data about the operation of hardware components on the device. Each agent may transmit data about the usage of resources on the device. Each agent may transmit data about performance of software and/or hardware on the device. Each agent may transmit data about the performance and operation of a combination of a software and a hardware component of the device. Each agent may transmit data about the performance and operation of a combination of a plurality of software components and a hardware component of the device. Each agent may transmit data about the performance and operation of a combination of the configuration of software components and configuration of a hardware component of the device. Each agent may transmit data about the performance and operation of a combination of the configuration of a plurality of software components and configuration of a plurality of hardware components of the device. Each agent may transmit data about any operational and/or performance issues with any software component, hardware component or combination of software and hardware components. Each agent may transmit one or more events that occur in the environment of the device and detected by the agent. Each agent may transmit a sequence of events that occur in the environment of the device and detected by the agent.

The agent may transmit this data upon any changes to the environment, such as installation, de-installation, configuration changes, performance or operational changes, issues, etc. The agent may transmit this data upon startup of the agent. The agent may transmit this data upon startup of the device. The agent may transmit this data upon request by a user. The agent may transmit this data upon request by the centralized service. The agent may transmit this data upon a predetermined schedule. The agent may transmit this data according to any policies of the user, agent, centralized service or otherwise.

At step 915, an agent may receive a communication from the centralized service providing one or more recommendations or calls for action based on the environment of the device. A component of the agent may receive a recommendation. A plurality of components of the agent may each receive a recommendation. An agent may receive a plurality of communications from the centralized service providing one or more recommendations or calls for action based on the environment of the device. The agent may receive such a communication responsive to a transmission about data of the environment of the device. The agent may receive such a communication responsive to a transmission about a change or event in the environment of the device. The agent may receive such a communication upon startup or execution of the agent. The agent may receive such a communication upon startup of the device. The agent may receive such a communication according to a policy of the device, agent, user or centralized service. The agent may receive such a communication on a predetermined schedule.

As described herein, the centralized service may compare and analyze the environment data of the device to environment data in a cross-device database. The centralized service may correlate the data of the device to a cross-device database identifying performance and operational events, metrics and results from a plurality of agents across a plurality of heterogeneous devices and environments. The centralized service may correlate one or more events of the device to a sequence of events in the cross-device database. The centralized service may correlate data from one device to data from another data. The centralized service may correlate the performance and/or operation of a combination of one software component and one hardware component of one device to the performance and/or operation of a combination of one software component and one hardware component of another device At step 920, the agent may take an action responsive to the centralized service's recommendation. The agent may take an action identified by the recommendation. The agent may take an action instructed by the recommendation. The recommendation may provide commands or directives for the agent. The recommendation may provide a script, program or executable instructions for the agent to execute. A component of the agent may receive an instruction or command from the recommendation. The agent may configure or instruct a component of the agent responsive to the recommendation.

The recommendation may trigger or execute any functionality of any component of the agent. For example, the recommendation may be for the data collection component to collect additional data. The recommendation may be for the data collection component o collection a predetermined set of data. The recommendation may be for the delivery component to deliver one or more services from the centralized service. The recommendation may be for the provisioning component to provision a recommended or predetermined resource to the device. The recommendation may be for the sales component to offer and provide for sale any recommended products and/or services, such as services of the centralized service. The recommendation may be for the discovery component to discover configuration of software and hardware of the device, such as a selected software component or hardware component. The recommendation may be for the discovery component to perform diagnosis on the environment of the device, such as any particular software or hardware component. The recommendation may be for the reporting component to provide a report on operation or performance of the device, such as a particular report on operation or performance of the device or a particular software or hardware component of the device. The recommendation may be for the alerting component to generate or provide an alert having recommended or specified information, call for action or other suggestion or recommendation.

In some embodiments, an agent receives a recommendation of a provisioning action on or for the device. Responsive to this recommendation, the agent may generate an alert on the device to request a user to execute the provisioning action. In some embodiments, the agent may receive a confirmation or acknowledgement from the user to execute the provisioning action. In some embodiments, the agent may receive a request from the user to not execute the provisioning action. In some embodiments, the agent may receive a request from the user to have the agent execute the provisioning action. In some embodiments, the agent may receive a request from the user to have the centralized service execute the provisioning action. In some embodiments, the agent may perform the provisioning action on behalf of the user or the device. In some embodiments, the agent may perform the provisioning action on behalf of the user or the device and automatically upon receipt of the recommendation. In some embodiments, the agent may track, monitor and report on the status of performance of the provisioning action to the user and/or centralized service.

By way of example but not in any manner limiting, the provisioning action may include any one or more of the following: installation of recommended software, installation of recommended hardware, configuration action on installed software, configuration action on installed hardware of the device, execution of an optimization tool, execution of software, purchase of one or more remote services of the centralized service, provisioning of one or more remote services of the centralized service, de-installation of software, de-installation of hardware, a change to configuration of operating system, and a change to state of the operating system.

In some embodiments, an agent receives a recommendation of a remote service from the centralized service. The agent may receive a recommendation for a compilation of services generated from the service compiler of the centralized service. The agent may receive identification of a subscription of one or more remote services provided by the centralized service. The agent may provision the remote service upon confirmation from the user, such as via a generated alert. The agent may provision the remote service automatically upon receipt. The agent may provision the remote service responsive to a policy of the device, user, agent or centralized service.

Figure 9B:
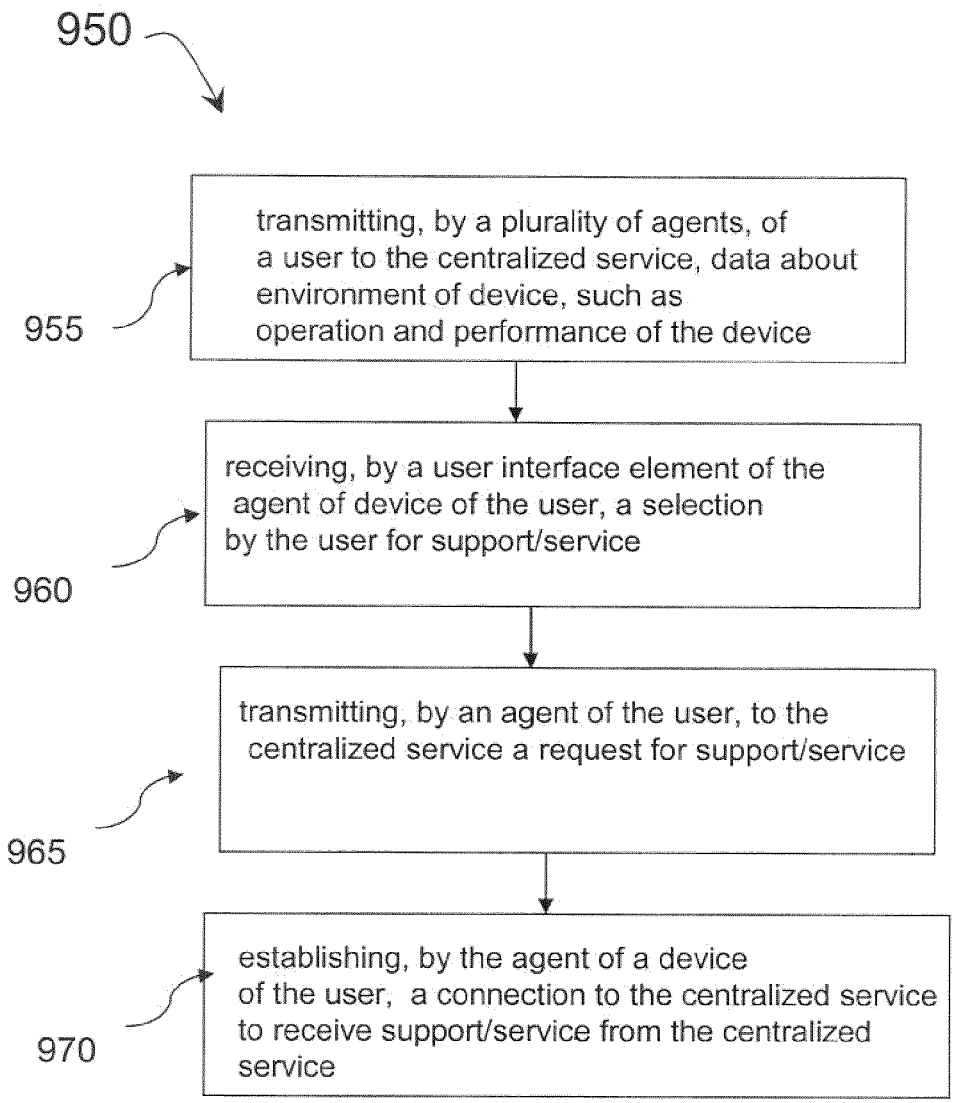
FIG. 9B is a flow diagram depicting steps of another embodiment of a method an agent to provide services to a device from the centralized service.

Referring now to FIG. 9B, embodiments of steps of a method 950 for providing a support to a plurality of devices of a user environment, including wireless devices, is depicted. In brief overview, at step 955, a plurality of agents on corresponding devices of a user transmit data about the environment of the devices. At step 960, a user on one of the wireless or mobile devices selects a single user interface element to request support or service from the centralized service. At step 965, the agent transmits a request for support or service to the centralized service. At step 970, the agent establishes a connection with the centralized service to receive the requested support or service.

In further details, at step 955, a user may have a plurality of devices. The devices may be heterogeneous and may be any combination of devices, from desktop computers, laptop computers, mobile phones, smart devices, televisions, home theater devices, etc. The devices may be in communication via one or more networks and/or operate in an environment of the user, generally referred to as the user's environment. The environment may include any type and form of fabric for operating the devices, including connectivity, networks, ISPs, power, operating conditions, locations, etc. In some embodiments, the user may be an enterprise and the enterprise environment may include any one or more data centers and any elements making up the information and computer network fabric and technology of the enterprise. These devices and the user's environment may be supported and/or serviced via the centralized service. Agents may be deployed on each of the supported devices. In some embodiments, some devices may be supported but not have an agent executing on that device.

Each of the agents in the user's environment or on the user's devices may transmit data about the user's environment, the environment of the data and the operation and performance of the user's environment, the device and any software and hardware of the device or operating in the user's environment. The agents may communicate any events or sequence of events that occur on the device or in the user's environment. Each of the agents may communicate such information to other agents in the user's environment. In some embodiments, a master agent or aggregator agent collects and aggregates such information from the other agents and provides a centralized collection point and interface to the centralized service. The centralized service may track and manage the number of devices and the environment of the devices in the user's environment.

The centralized service may correlate the data and events from each agent and device. The centralized service may correlate the data and events across the agents to provide a cross-device knowledge base for the environment of the user and performance and operation of combinations of software and hardware components in the user's environment. The centralized service may correlate the data and events across the agents with data and events from other agents outside the user's environments. The centralized service may correlate the data and events across the agents with data and events from agents in one or more other user environments. The centralized service may correlate the data and events across the agents with data and events of a plurality of user environments.

At step 960, a user may select a user interface element on a device for support and service. In some embodiments, the agent provide a user interface element selectable by the user to request or launch service from the centralized service. For example, the agent may provide an icon or shortcut on the desktop of a computer or deck of a mobile that the user can select via a single or double mouse click to launch service from the centralized service. In some embodiments, the selectable user interface element may be a menu item of a user interface of the agent. In some embodiments, the selectable user interface element may be an app(lication) on the desktop or deck of a mobile device. For example, the selectable user interface element may be an icon of the agent application on the mobile device. In some embodiments, the selectable user interface may be a user interface element of an alert or reported generated by the agent. In some embodiments, the selectable user interface element may be a URL or hyperlink in an alert. In some embodiments, the selectable user interface element may be a URL or hyperlink in any form of communications between the communications interface of the agent and the centralized service.

With the easily selectable user interface element to launch service from the centralized service, a user can obtain service from the centralized service from any device in the user's environments for that device or any other device in the user's environment. For example, a user via any wireless device, such cellphone, smartphone or PDA may one click an icon on the deck of such a device to request service from the centralized service for any device in the user's environment.

At step 965, the agent may detect the selection of the user interface element or the user's request for service from the centralized service, and automatically transmit a request for service to the centralized service on behalf of the user. The agent may transmit with the request any data or events of the environment of the requesting device. The agent may transmit with the request any data or events of the user's environment. The agent may transmit information about the request to the other agent's in the user's environment. In this manner, the other agents may be in a state or aware that the centralized service may establish connections via these other agents, to provide support and service to the user's environment.

At step 970, the agent establishes a connection with the centralized service. The agent may establish a connection from the wireless or mobile device of the user to the centralized service. The agent may establish the connection automatically responsive to the request sent to the centralized service. The agent may establish the connection automatically responsive to the centralized service's response to the request. The agent may establish the connection responsive to a remote service personnel of the centralized service's requesting to establish a connection with the device. The agent may establish the connection with the centralized service upon confirmation from the user that such a connection should be established. Over this connection, the centralized service and agent may establish any type and form of sessions or communications, such as a remote screen sharing session.

The agent may establish via communications interface a form of communications, such as email, instant messaging, etc., with the centralized service. The agent may learn more from the user about the support or service being requested for the user's environment. Responsive to this information, the centralized service may establish connections and sessions with other agents in the user's environment to provide support and service to the user's environment.

In some embodiments, responsive to the user's selection of the user interface element, the agent(s) of the user's environment in coordination with the centralized service may deliver or provide any one or more services to the user's environment, either automatically or responsive to the user's request.

E. Systems and Methods for Providing and Using a Cross-Device Database

Figure 10:
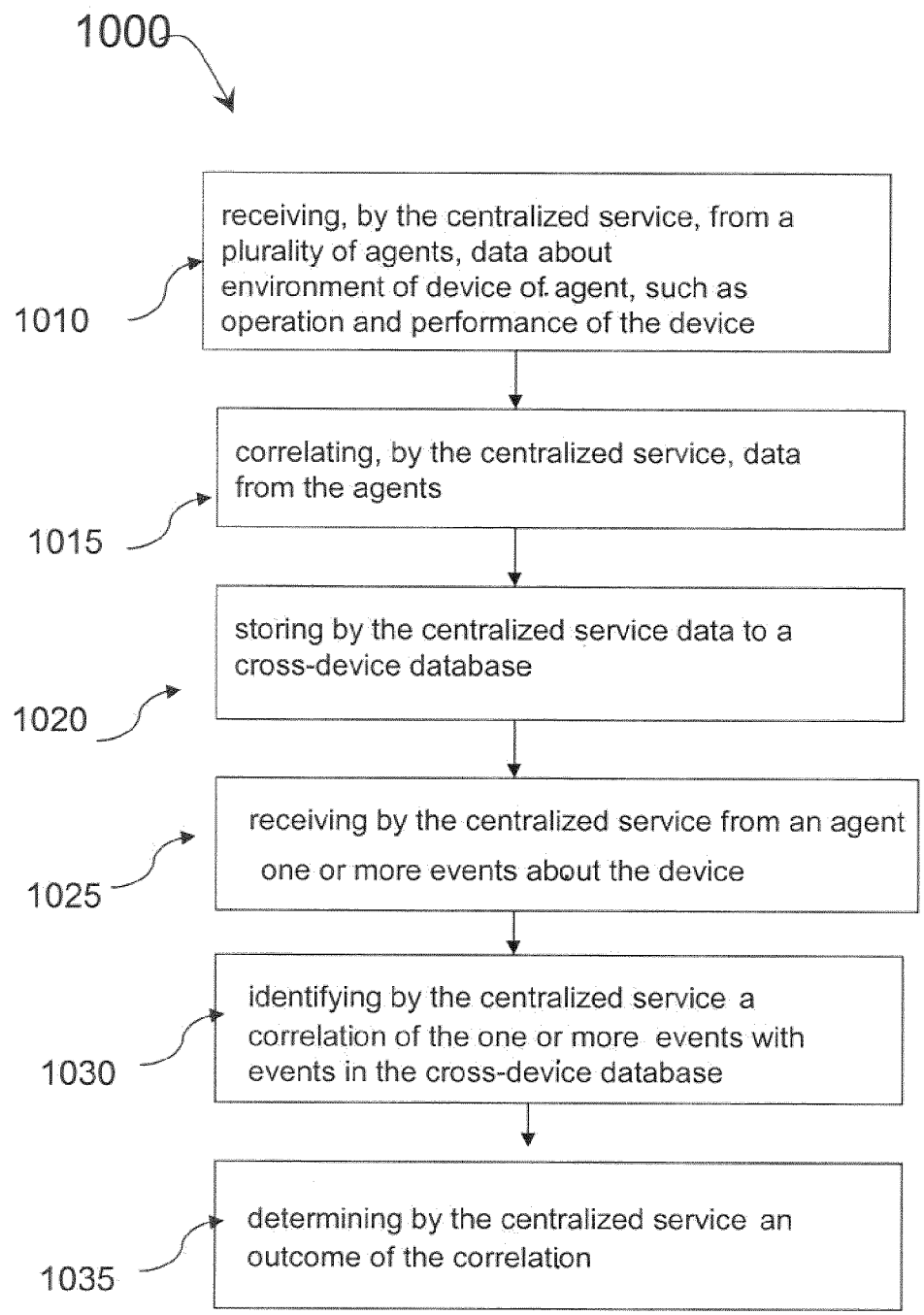
FIG. 10 is a flow diagram depicting steps of an embodiment of a method of providing and using a cross-device database by the centralized service.

Referring now to FIG. 10, embodiments of steps of a method 1000 for creating and using a cross-device database is depicted. In brief overview, at step 1010, the centralized service receives from a plurality of agents, data about the environment of the device of the agent. At step 1015, the centralized service correlates the received data and at step 1020, stores the data and correlation in a cross-device database. At step 1025, the centralized services receives one or more events about a device from an agent. At step 1030, the centralized service perform analysis of the events to the cross-device database to identify one or more correlations. At step 1035, the centralized service determines an outcome of the correlation, which may result in the centralized service communicating one or more recommendations to an agent or subscriber to such information.

At step 1010, the centralized service may receive data about a plurality of different environments, different devices and different combinations of software and hardware across a plurality of user environments. The data may identify compatibility between a combination of software and hardware. The data may identify issues between a combination of software and hardware. The data may identify performance or operation data of a combination of software and hardware on a device. The data may identify performance or operation data of a combination of software and hardware on a plurality of devices. The data may identify performance or operation data performance of a combination of software and hardware in an environment. The data may identify performance or operation data a combination of software and hardware in a plurality of environments. The data may identify performance or operation data of a combination of software and hardware in a user environment or across a plurality of user environments.

The data may identify operational effectiveness of a user environment. The data may identify operational effectiveness of a device. The data may identify operational effectiveness of a combination of software and hardware. The data may identify inter-operational compatibility of elements of a user environment. The data may identify inter-operational compatibility between devices. The data may identify operational compatibility between software and hardware. The data may identify operational compatibility between a combination of a particular software with a particular hardware or environment.

The data may identify one or more events. The one or more events may identify a sequence of events. The data may identify one or more events corresponding to performance or operation of a device. The data may identify one or more events corresponding to performance or operation of a software on the device. The data may identify one or more events corresponding to performance or operation of a hardware of the device. The data may identify one or more events corresponding to performance or operation of a combination of a software component and hardware component of the device. The data may identify one or more events corresponding to performance or operation of a plurality of devices. The data may identify one or more events corresponding to performance or operation of a user environment. The data may identify one or more events corresponding to inter-operational compatibility between devices. The data may identify one or more events corresponding to inter-operational compatibility between elements in an environment. The data may identify one or more events corresponding to inter-operational compatibility between devices.

At step 1015, the centralized service correlates the data and/or events from the data. In some embodiments, the centralized service correlates a first event of a device with a second event from the device. In some embodiments, the centralized service correlates a first sequence of events of the device with a second sequence of events of the device. In some embodiments, the centralized service correlates a first event of the device with a second event of a second device. In some embodiments, the centralized service correlates a first sequence of events of a first device with a second sequence of events with a second device. In some embodiments, the centralized service correlates an event of the device with an event or sequence of events of the user environment.

In some embodiments, the centralized service correlates an event of a device with one or more events stored in the cross-device database. In some embodiments, the centralized service correlates an event from the device with a sequence of events in the cross-device database. In some embodiments, the centralized service correlates a sequence of events of the device with a sequence of events stored in the cross-device database. In some embodiments, the centralized service correlates an event of the device with an event or sequence of events of another user environment in the cross-device database.

At step 1020, the centralized service stores the data from the agents and/or correlation of the data to one or more databases representing a repository of cross-device knowledge. The one or more databases may be organized and deployed in any manner and across one or more devices. The databases may be organized by user, user environment, device types, software and/or hardware component categories. In some embodiments, there may be a single distributed database for all data across all devices and users accessing the centralized service.

In some embodiments, the centralized service stores the data as received from the agents to one or more databases. In some embodiments, the centralized service stores any correlations to the one or more databases. In some embodiments, the centralized service stores the received data and any determined correlations to the one or more databases. In some embodiments, the centralized service stores the determined correlations in association with the received data to the one or more databases. In some embodiments, the centralized service stores events and corresponding correlations to the one or more databases. In some embodiments, the centralized service stores a sequence of events and corresponding correlations to the one or more databases. In some embodiments, the centralized service stores one or more events in association with another one or more events to the one or more databases. In some embodiments, the centralized service stores one or more events in association with another one or more events and corresponding correlations to the one or more databases. In some embodiments, the centralized service stores a first sequence of events in association with a second sequence of events to the one or more databases. In some embodiments, the centralized service stores a first sequence of events in association with a second sequence of events and corresponding correlations to the one or more databases.

The database design and storage may be designed to allow or facilitate the querying of any one or more stored elements to one or more elements. The database design and storage may be designed to allow or facilitate the querying of events to correlations. The database design and storage may be designed to allow or facilitate the querying of devices to events to correlations. The database design and storage may be designed to allow or facilitate the querying of users to events to correlations. The database design and storage may be designed to allow or facilitate the querying of data to events. The database design and storage may be designed to allow or facilitate the querying of events to events. The database design and storage may be designed to allow or facilitate the querying of devices to devices. The database design and storage may be designed to allow or facilitate the querying of combinations of software and hardware and any corresponding performance or operational, operational effectiveness or compatibility data.

At step 1025, the centralized service receive data from a device. The centralized service may receive data about an event or sequence of events. The centralized service may receive data about an event in the environment of the device. The centralized service may receive data about an event on the device. The centralized service may receive data about a change in the operation or performance of the device. The centralized service may receive data about a change in the software of the device. The centralized service may receive data about a change in the hardware of the device. The centralized service may receive data about a change to a combination of software and hardware on the device. The centralized service may receive data about a change in the user environment. The centralized service may receive data about a change in the environment of the device. The centralized service may receive data about an incompatibility with the software and/or hardware of the device. The centralized service may receive data about an incompatibility with user environment and the device.

In some embodiments, the centralized service receives a request from the agent to check the data of the device against the cross-device database. In some embodiments, the centralized service receives a request from the user to check the data of the device against the cross-device database.

At step 1030, the centralized service analyzes the data from the agent against data in the cross-device database. The centralized service may correlate the event or events received from the agent with events or events stored in the cross-device database for the same device, from other devices or from other environments. In some embodiments, the centralized service correlates a reported event for the agent by matching or corresponding to the event to other events stored in the cross-device database. In some embodiments, the centralized service correlates a sequence of events of the device to one or more events stored in the cross-device database. In some embodiments, the centralized service correlates a sequence of events of the device to a sequence of events stored in the cross-device database. In some embodiments, the centralized service correlates a sequence of events to one or more events stored in the cross-device database.

At step 1035, the centralized service, based on the analysis, comparison and correlation, determines an outcome of the correlation. The outcome may be a determination of a state or status of the device. The outcome may be a determination of a state or status of operation of the device. The outcome may be a determination of a state or status of performance of the device. The outcome may be a determination of a state or status of software of the device. The outcome may be a determination of a state or status of hardware of the device. The outcome may be a determination of a state or status of compatibility of a combination of software and hardware. The outcome may be a determination of a state or status of incompatibility of a combination of software and hardware. The outcome may be a determination of a state or status of compatibility/incompatibility of the device or an elements thereof with a user environment.

The outcome may be a prediction of one or more events to occur on the device. The outcome may be a prediction of a sequence of events to occur on the device. The outcome may be a prediction of an issue with device. The outcome may be a prediction of a performance degradation of the device. The outcome may be a prediction of an operational failure or error with the device.

The outcome may be any recommendation by the centralized service, such as a recommendation for a provisioning action or service. For example, an outcome may a recommendation as described in any embodiments of FIG. 9A. The centralized service may communicate the outcome to the agent. In some embodiments, the centralized service may communicate the outcome to a user of the device. In some embodiments, the centralized service may communicate the outcome to any users who subscribe to the centralized service or information from the centralized service. In some embodiments, the centralized service may communicate the outcome to a user of the device. In some embodiments, the centralized service may communicate the outcome to a support personnel of the centralized service. In some embodiments, the centralized service may communicate a recommendation to the agent.

F. Systems and Methods for Automated Brokering of Remote Connection to Device

Figure 11A:
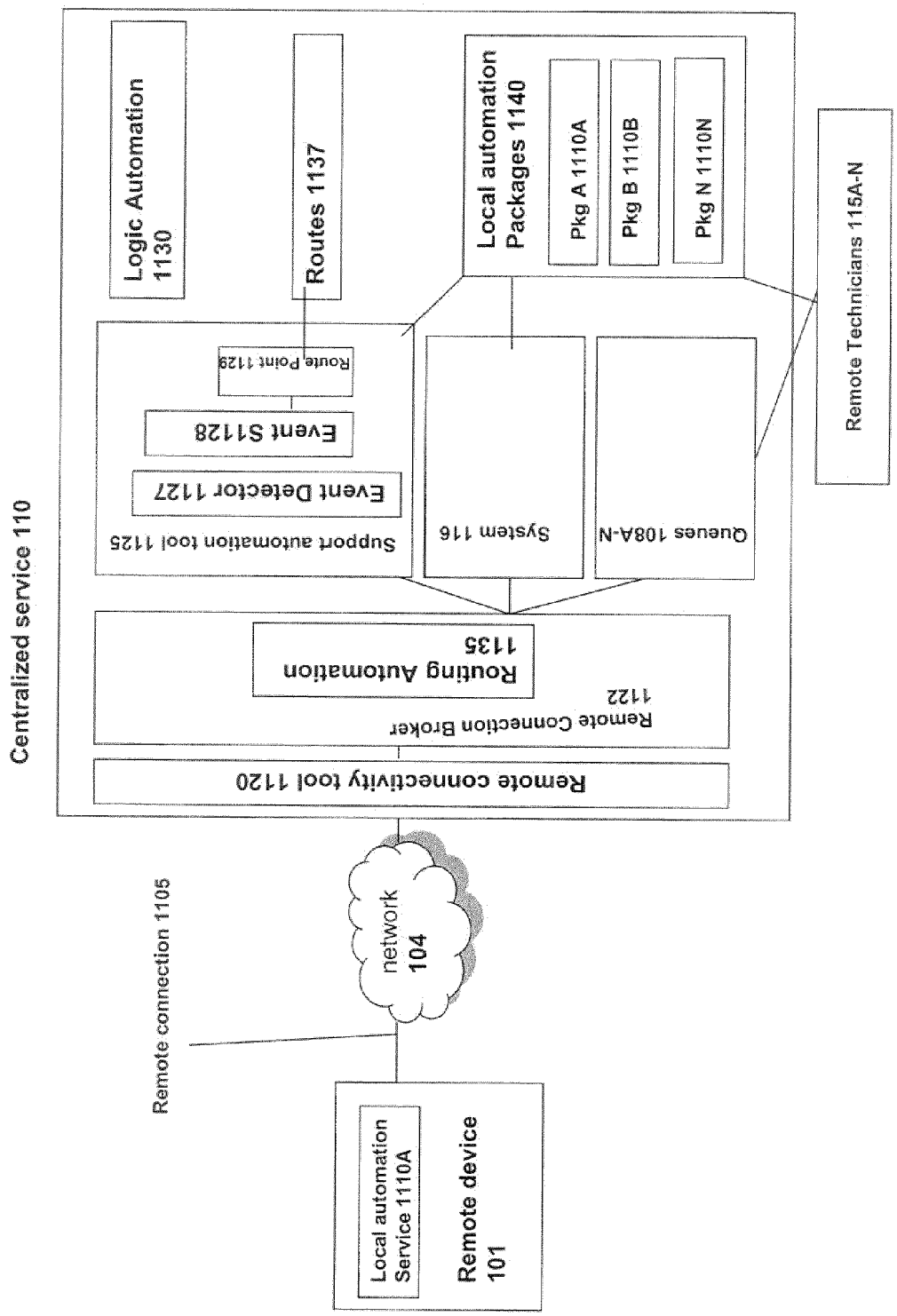
FIG. 11A is a block diagram that depicts an embodiment of a system for automated brokering of connection to a device.
Figure 11B:
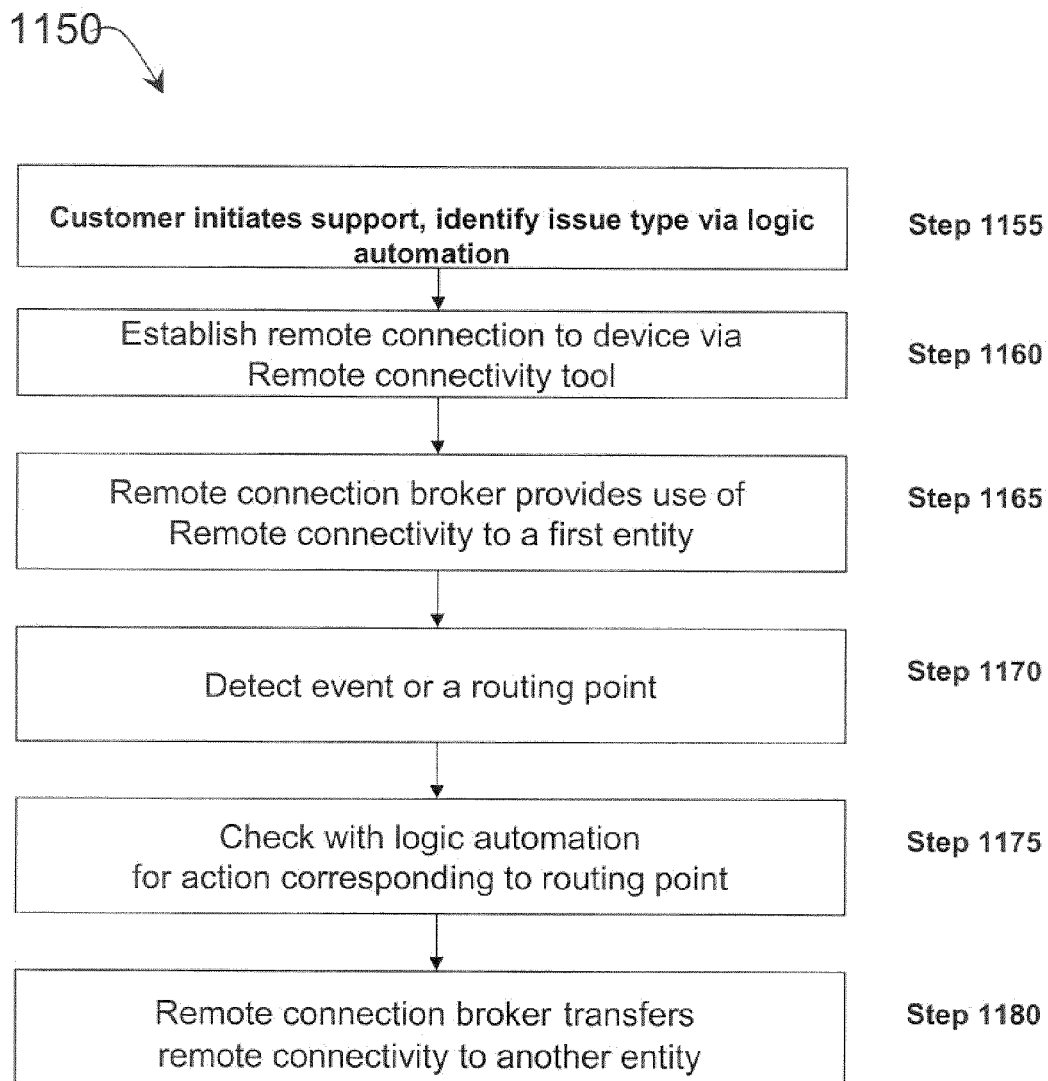
FIG. 11B is a flow diagram that depicts an embodiment of a method for automated brokering of connection to a device

Referring now generally to FIGS. 11A and 11B, systems and methods for automated brokering of a connection to a remote device (sometimes also referred to as a remote connection to a device) is depicted. Embodiments of the present solution, such as the centralized service 110, may establish, via a remote connectivity tool 1110, a remote connection 1105 to a device 101. A remote connection broker 1122 may control and manage access to the remote connection by any entity, such as, but not limited to, a support automation tool 1125, a system 116, a work queue(s) 108A-108N (generally referred to as 108) and/or remote technician 115A-115N (generally referred to as 115). The remote connection broker may transfer access between such entities. The remote connection broker may automatically broker the use of the remote connection 1105 between different entities to provide or obtain access to the remote device. The centralized service may deliver via the single remote connection to the device a plurality of different support services, which may be delivered by any one of the support automation tool, a system or a remote technician. The centralized service via may switch between these services and thus switch or transfer via the remote connection broker access to the device via the remote connection of the remote connectivity tool to the entity providing the service.

For example, the centralized service may deliver automated services to the device via one or more local automation services. The remote connection broker may provide the support automation tool access or control of the remote connection to the device. The support automation tool may transmit or deliver a local automation service to the device via the remote connection. Upon detection of an event, such as completion of the local automation service, the remote connection broker may transfer or provide the remote connection to the device to a support agent who may service the remote device in accordance with the event. As such, in some embodiments, a plurality of heterogeneous services may be delivered via the same connection to the device and the automated remote connection broker manages, controls and transfers the access and use of the connection by different entities. The remote connection broker may intelligently broker access and use of the connection responsive to any portion of the centralized service, including but not limited to the intelligent switch, logic automation 1130, routing automation 1135 and event detector 1127.

Referring now to FIG. 11A, an embodiment of a system for automated brokering of a remote connection to a device is depicted. In brief overview, the system may include a centralized service with a remote connectivity tool 1220 providing a remote connection 1105 to a plurality of remote devices such as remote device 101. The remote connection broker 1122 may broker access, use and/or control of the remote connection between a plurality of different entities or service providers. The support automation tool 1125 may use the remote connection 1105 to deliver one or more local automation packets, such as one of package A thru package N 1110A-1110N. Any one or more of the remote technicians 115 may use the remote connection to provide or deliver support to the device. In some embodiments, access to the remote connection may be provided via a support item in queue of a pool of remote technicians. One of the remote technicians may be select the item from the queue and gain access to the remote connection. Any other system 116 may gain access to the device via the remote connection. Accordingly, the remote connection broker may transfer the access, use and control of the same connection to the same device among any of the support automation tool, system, work queues and/or remote technicians to provide one or more services to the device.

In further overview, the centralized service may deliver via the remote connectivity tool one or more of local automation packages 1140 for execution as a local automation service 1110A-1110N (generally referred to a local automation service (1110) on a corresponding remote device. The support automation tool 1125 may monitor the execution of the local automation services, such as via display output received from the local automation services. The support automation tool may communicate with logic automation engine 1130 to determine what actions to take upon detecting via an event detector 1127 events in the display output or from the local automation service that t correspond to one of a plurality of predetermined events 1128. The logic automation engine 1130 may provide a determination on workflow or routing to take upon detection of each event. The support automation tool and/or remote connection broker may communicate with routing automation engine 1135 to route or transfer the remote connectivity to a routing point 1137 determined by the logic automation engine.

The system 116 may comprise any type and form of applications, services, scripts programs, process, tasks or executable instructions to perform or provide a function, resource or service. In some embodiments, the systems may automatically perform or provide the function, resource or service. In some embodiments, the system may perform or provide the function, resource or service remotely via a network. In some embodiments, the system may perform or provide the function, resource or service on a device of the user. In some embodiments, the system may perform or provide the function, resource or service via combination of executing on the device of the user and remotely executing on a device of the system.

The system may automatically perform any of the functions, operations and/or services of the centralized service or any portions thereof. The system may perform any administrative functionality, such as account setup, user administration, subscription management, etc. The system may perform any billing management related functionality and operations. The system may perform any IT management related functionality and operations, such as system administration functions. The system may perform any device support and services, such as antivirus detection and resolution, device diagnostics, device performance or optimization tuning, software installation, system configuration, etc. The system may perform any type and form of entitlement services regarding the user's entitlement to software and software licenses for the device. The system may perform any type and form of license granting and management such any licenses for software and services. The system may perform any type and form of warranty service and management, including automating device or component repair, return and/or replacement services.

The remote connectivity tool 1120 may comprise any type and form of remote connectivity technology to connect to, communicate with, control and/or interact with a remote device via one or more networks 104. The remote connectivity tool 1120 may enable and allow a remote person, system, application or device to connect and control a desktop or portion of a desktop of the remote device via a network. The remote connectivity tool 1120 may enable and allow a remote person, system, application or device to connect and control an application or portion of an application of the remote device via a network. The remote connectivity tool 1120 may enable and allow a remote person, system, application or device to connect and control the operation system or portions of the operating system of the remote device via a network. The remote connectivity tool 1120 may enable and allow a remote person, system, application or device to connect and control input to the remote device via a network, such as keyboard input, and pointer or mouse control or connecting a peripheral. The remote connectivity tool 1120 may enable and allow a remote person, system, application or device to connect and control output to the remote device via a network, such as directing display output or controlling output to an attached peripheral.

In some embodiments, the remote connectivity tool comprises any type and form of remote desktop connectivity and control tool. In some embodiments, the remote connectivity tool includes remote connectivity technology and/or product embodiments from Citrix Online, LLC, such as GoToMyPC or GoToAssist technology manufactured by Citrix Online, LLC of Santa Barbara, Calif., part of Citrix Systems, Inc. of Ft. Lauderdale, Fla., In some embodiments, the remote connectivity tool Bamboo includes technology and/or product embodiments manufactured by Bomgar Corporation. of Ridgeland, Miss., USA. In some embodiments, the remote connectivity tool comprises any embodiments of the agent 307. In some embodiments, the remote connectivity tool comprises any embodiments of the centralized service described in FIG. 1-6. The remote connectivity tool may comprise the intelligent switch 106. The remote connectivity tool may comprise the queue manager and queue, such as those described in FIG. 4. The remote connectivity tool may comprise the remote connection broker. The support automation tool may comprise the remote connectivity tool and/or the remote connection broker.

The centralized service, such as via the remote connectivity tool 1120 may establish a connection 1105 between a server of the centralized service and the remote device 101. The connection 1105 may comprise any type and form of transport layer connection, such as a TCP or UDP connection. The connection may comprise any type and form of a secure connection, such as via Secure Socket Layer (SSL), IPsec or other secure technology. The connection 1105 may comprise a secure tunnel. The connection 1105 may comprise a plurality of connections between the centralized service and the device. For example, the connection may comprise a first connection between the centralized service and an intermediary network device (intermediary to the remote device and the centralized service) and a second connection between the intermediary network device and the remote device 101. In some embodiments, the connection 1105 comprises two types of connection: a control connection for communicating control commands between the devices and a data connection for communicating data between the devices. In some embodiments, the connection comprises a plurality of changes, such as a control channel and a data channel. In some embodiments, the connection is between a server of the centralized service and an agent on the device 101, such an any embodiments of the agent 307 described herein.

The remote connectivity tool 1120 and the connection 1105 may provide, enable or allow for the communication, transmission or otherwise the delivery of one or more packages, applications, scripts, tools and/or other types and forms of executables instructions via the connection. The packages and/or executable instructions delivered via the connection of the remote connectivity tool may be: i) stored in storage or memory of the remote device, ii) unpackaged on the remote device, iii) installed on the remote device and/or iv) executed on the remote device. Any of the above actions may be performed seamlessly and/or transparently to a user of the remote device. Any of the above actions may be performed with prompting, confirmation or otherwise interacting with a user of the remote device. Any of the above actions may be performed with prompting, confirmation or otherwise interacting with a remote user, such as a remote support personnel, via the remote connectivity tool.

The remote connection broker 1122 may provide for the transfer or change of control of the connection to the remote device and/or control of the interactions with the remote device between different entities, such as between different support personnel, different applications or systems. In some embodiments, the remote connection broker provides for the transfer or change of control from an automated application, such as the support automation tool 1125 to be discussed in more detail below, to a user of the centralized service, such as any support personnel that may connect, access or otherwise use the centralized service and the remote connectivity tool. In some embodiments, the remote connection broker provides for the transfer or change of control from support personnel to the support automation tool 1125. In some embodiments, the remote connection broker provides for the transfer or change of control between support personnel. In some embodiments, the remote connection broker provides for the transfer or change of control from an application to a user, between applications and/or between users. In some embodiments, the remote connection broker provides for the transfer or change of control from a remote support person to a local user of the remote device. In some embodiments, the remote connectivity tool provides for the transfer or change of control from the support automation tool to the local user of the remote device. In some embodiments, the remote connectivity tool provides for the transfer or change of control from the centralized service to a third party service provider. In some embodiments, the remote connectivity tool provides for the transfer or change of control to a work queue or system of a pool of service providers external to the centralized service.

The remote connection broker may negotiate the transfer of access, use or control of the connection between entities. The remote connection broker may use any type and form of protocol, handshake or process to transfer the access, use or control of the connection. The remote connection broker may communicate a request to the entity currently using, accessing or controlling the connection to release the connection to the remote connection broker. The remote connection broker may communicate a command to the entity currently using, accessing or controlling the connection that upon execution of the command to return use, access or control of the connection to the remote connection broker. The remote connection broker may communicate a request to an entity to have, take over or otherwise obtain use, access or control of the connection. The remote connection broker may communicate a command an entity to have, take over or otherwise obtain use, access or control of the connection that upon execution of the command use, access or control of the connection is given to the entity. The remote connection broker may communicate a request or command to a current entity to give or transfer access or use of the connection to an identified entity.

In some embodiments, the remote connection broker maintains control of the connection and grants access or use of the connection among entities. In some embodiments, the remote connection broker gives control of the connection to another entity. In some embodiments, the remote connection broker gives temporary control of the connection to another entity. In some embodiments, the remote connection broker grants access or use of the connection to one entity at a time. In some embodiments, the remote connection broker grants access or use of the connection for a predetermined time period. In some embodiments, the remote connection broker grants access or use of the connection to a plurality of entities. Each of the plurality of entities may access or use the connection one at a time. Each of the plurality of entities may take turns accessing or using the connection. Each of the plurality of entities may share accessing or using the connection.

In some embodiments, the remote connection broker may grant access or use of the connection based on permissions or certifications assigned to an entity. For example, a remote technician may not have permission or certification to perform a type of work or service on the remote device and therefore, the remote connection broker does not provide access or use to such a technician. In some embodiments, the remote connection broker may grant access or use of the connection based on a profile of the entity. For example, a system or remote technician may not have a predetermined set of one or more capabilities to perform a type of work or service on the remote device and therefore, the remote connection broker does not provide access or use to such a system or technician. In some embodiments, the remote connection broker may grant access or use of the connection based on a level of service subscribed to by the user of the device. For example, the user may only be subscribed to remote technician support and therefore the remote connection broker does not provide access or use of the connection to a system or support automation tool.

The remote connection broker may identify or determine an entity to grant control, access or use of the connection. The remote connection broker may identify or determine an entity to grant control, access or use of the connection responsive to the intelligent switch. The remote connection broker may identify or determine an entity to grant control, access or use of the connection responsive to the logic automation engine 1130. The remote connection broker may identify or determine an entity to grant control, access or use of the connection responsive to the routing automation engine 1135. The remote connection broker may identify or determine an entity to grant control, access or use of the connection responsive to the event detector 1127 and any events 1128. The remote connection broker may identify or determine an entity to grant control, access or use of the connection responsive to the support automation tool. The remote connection broker may identify or determine an entity to grant control, access or use of the connection responsive to a user request from the device. The remote connection broker may identify or determine an entity to grant control, access or use of the connection responsive to a result or feedback from execution of a local automation service. The remote connection broker may identify or determine an entity to grant control, access or use of the connection responsive to configuration of the remote connection broker. The remote connection broker may identify or determine an entity to grant control, access or use of the connection responsive a request of the user of the centralized service, such as via a user interface to manage the remote connection broker.

In some embodiments, the remote connection broker users a routing automation engine sometimes generally referred to as routing automation 1135. The routing automation may comprise an application, program, library, script, process, service, task or other type and form of executable instructions executing on a device, such as a server of the centralized service. The routing automation may automatically handle, manage, process or control a transfer of or change in access, use or control of the remote connection responsive to the logic automation and routes 1137. The routing automation may automatically, manage, process or control a transfer of or change in access, use or control of the remote connection between entities or services in a workflow or route. The routing automation may automatically handle, manage, process or control a transfer of or change in access, use or control of the remote connectivity tool between the support automation tool and a support agent. The routing automation may automatically handle, manage, process or control a transfer of or change in access, use or control of the remote connectivity tool between the support automation tool and a user of the centralized service. The routing automation may automatically handle, manage, process or control a transfer of or change in access, use or control of the remote connectivity tool between the support automation tool and a user of the remote device. The routing automation may automatically handle, manage, process or control a transfer of or change in access, use or control of the remote connectivity tool between the support automation tool and another application of the centralized service. The routing automation may automatically handle, manage, process or control a transfer of or change in access, use or control of the remote connectivity tool between a plurality of support agents. The routing automation may automatically handle, manage, process or control a transfer of or change in access, use or control of the remote connectivity tool from a support agent to the support automation tool.

The routing automation may automatically handle, manage, process or control a transfer of or change in access, use or control of the remote connectivity tool to a next step or entity as identified by a route. The routing automation may automatically handle, manage, process or control movement, sequence or flow between steps or points in a route. The routing automation may automatically handle, manage, process or control a transfer of or change in access to the remote machine, such as via the mote connectivity tool. The routing automation may automatically handle, manage, process or control a transfer of or change in access or control of the desktop of the remote machine. The routing automation may automatically handle, manage, process or control a transfer of or change in access or control of the local automation service of the remote machine. The routing automation may automatically handle, manage, process or control a transfer of or change in access or control of the agent 307 of the remote machine.

The support automation tool may communicate to the routing automation or the remote connection broker the route provided by the logic automation for the route point. In some embodiments, the support automation tool comprises the routing automation. In some embodiments, the logic automation communicates the route to the routing automation. In some embodiments, the route automation obtains the route from the support automation tool or the logic automation. In some embodiments, the remote connection broker obtains the route from the support automation tool or the logic automation.

In some embodiments, the routing automation manages the remote connectivity tool. The routing automation may communicate or send communications to the entity to transfer control or access to the connection via the remote connectivity tool. For example, the routing automation may send a communication to a support agent to prompt the support agent to accept a task and/or take control of the connection via the remote connectivity to the remote device. In some embodiments, the routing automation may put into a work queue a service or task request to be picked up a support agent. The support agent may be assigned to the item in the work queue and communicate with the remote connectivity tool to service the remote device. In some embodiments, the routing automation may make an API, function or programmatic call to an application or program to accept and/or take control of the remote connection via the remote connectivity tool. The routing automation may interface or communicate with the support automation tool for the support automation tool to accept or take control of the remote connectivity via the remote connectivity tool. In some embodiments, the work queue management functions of the centralized service previously described herein may facilitate the transfer of control of the remote connectivity between entities. For example, an agent may interface to the work queue to initiate the transfer of the remote connectivity to another agent or a tool, such as the support automation tool.

The centralized service 110 via the remote connectivity tool may deliver, install and/or execute one or more local automation packages 1140 via the connection. A local automation package may comprise any set of files, data, configuration, scripts and/or executable instructions to perform a predetermined task(s) or service(s) on a device. Using any of the techniques, systems and methods previously described herein, the centralized service may identify an issue with a remote device. Based on the identifies issue or issues, the centralized service may select or determine one of the local automation packages 1140 to deliver to the device to address the issue. In some embodiments, based on a subscription, account or otherwise configuration of the device, the centralized service may deliver a local automation package on a predetermined frequency, basis or otherwise based on a predetermined event. In some embodiments, the agent 307 on the device may request or otherwise communicate with the centralized service to deliver one or more local automation packages 1140.

The local automation packages may comprise a plurality of different packages 1110A-1110B, generally referred to as package 1110 or local automation service 1110. The local automation packages comprise packages on a per issue basis. The local automation packages may comprise packages on a per service basis. The local automation packages may comprise packages on a per account or user basis. The local automation packages may comprise packages based on a type of device. The local automation packages may comprise packages based on a type of operating system. The local automation packages may comprise packages based on a type of application. The local automation packages may comprise packages based on a type of service. The local automation service may comprise a packet for a predetermined service or set of services, such as a device tune up service. In some embodiments, the local automation service may comprise a virus detection and removal service. In some embodiments, the local automation service may comprise an operating system repair service. In some embodiments, the local automation service may comprise an application repair service. In some embodiments, the local automation service may comprise a backup and/or restore service. In some embodiments, the local automation service may comprise a device install service. In some embodiments, the local automation service may comprise a configuration backup and/or configuration restore service.

The local automation service may be designed and constructed to be communicated via the remote connectivity tool. The local automation service may be designed and constructed to be automatically unpackaged, installed and/or executed upon delivery to the remote device. The local automation service may be designed and constructed to be automatically unpackaged, installed and/or executed upon an event in connection with the remote device, such as prompt by a user or input by an agent 307. The local automation service may be designed and constructed to execute automatically through a series of activities while operating on the remote device. The local automation service may be designed and constructed to receive input from a user or system (such as the centralized service) and continue executing automatically on the remote device.

A local automation service or package 1110 may comprise any combination of data, information, data files, install files, scripts, executables and other types and forms of executable instructions. In some embodiments, the local automation service is designed and configured to operate in a virtualized environment, such as virtualized environment provide by any virtualization technology including XenServer or XenDestop manufactured by Citrix Systems, Inc. of Ft. Lauderdale, Fla., such any of the VMware virtualize software manufactured by VMware, Inc. of Palo Alto, Calif. and Windows Virtual PC, Server or Desktop manufactured by Microsoft Corporation. In some embodiments, the local automation services and/or virtualized environment comprise a virtual machine. A virtual machine may be an isolated guest operating system installation with the host operating system of the device. The virtual machine comprise any one or more portions or layers of an application or software stack. The virtual machine may comprise the hypervisor. In some embodiments, the local automation service and/or virtualized environment comprises a virtual desktop. A virtual desktop may be a guest operating system presented alongside or on tope of the host operating system. A virtual desktop may provide a predetermined user interface into a virtualized environment. A virtual machine or desktop can be accessed locally from the same physical machine or accessed remotely from another device, such as a server.

The local automation service may be designed and constructed to remotely display output from executing on the remote device via a network to another device. In some embodiments, the virtual machine and/or virtual desktop of the local automation service is designed and configured to remotely display output. The local automation service may use any type and form of remote display protocol to transmit remotely display output from execution or operation of the local automation service on the remote device. In some embodiments, the local automation service may use any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash.

One or more servers of the centralized service and/or the support automation tool may receive the remote display output from a local automation service. The remote display output may comprise any visual or graphical output from the local automation service, such as from any activity on the device or as send or would be seen on the device. The remote display output may comprise any visual or graphical output from the local automation service. The remote display output may comprise a representation of any user interfaces or screen output from the local automation service. The remote display output may comprise data from any video or graphics buffer for the display of the remote device. Via the remote display protocol, a server or other device may transmit input to the remote device and corresponding local automation service. The remote display protocol may carry any input or activity from the server receiving the output to provide any input, user activity or manipulation or changes to the user interface.

The support automation tool 1125 may comprise an application, program, service, process, task or other type and form of executable instructions executing on one or more device, such as servers via the centralized service. In some embodiments, the support automation tool may be designed and constructed to operate, execute or run in a virtualized environment. The support automation tool may comprise a virtual machine. The support automation tool may comprise a virtual desktop. The support automation tool may comprise any the virtualized embodiments of the local automation service described above. The support automation tool may be designed and constructed to operate on one or more servers of the centralized service and receive remote display output from one or more local automation services 1110A-N running on a remote device 101. In some embodiments, the support automation tool comprises the remote connection broker.

The support automation tool may be designed and constructed to monitor and/or receive remote display output from the remote device. In some embodiments, the support automation tool may be designed and constructed to monitor and/or receive remote display output of the desktop of the remote device, such as the entire desktop or portion thereof. In some embodiments, the support automation tool may be designed and constructed to monitor and/or receive remote display output from one or more selected applications. In some embodiments, the support automation tool may be designed and constructed to monitor and/or receive remote display output from the local automation service. The support automation tool may be designed and constructed to monitor and/or receive remote display output from the local automation service and any activity from any application, program, service, task, process or other executable instructions operating on the remote device.

The support automation tool may be designed and constructed to monitor activity, output, errors or issues on the device. The support automation tool may be designed and constructed to receive a status, data or information from a local automation service executing on the device. The support automation tool may be designed and constructed to monitor user activity on the device. The support automation tool may be designed and constructed to monitor user actions on the device, such as any communications with the centralized service. For example, the support automation tool may be designed and constructed to detect an IM session with the centralized service. The support automation tool may be designed and constructed to communicate with the agent 307 on the device to obtain status, information and data about the device and any activity, error or issues with the device.

The support automation tool may identify one or more items for service in any work queue, such as those work queues described in connection with FIG. 4. The support automation tool may automatically identify and assign the support automation tool to work on items in a work queue, such as if the support automation tool was a remote technical personnel working on items in a work queue. The support automation tool may change status of items in a work queue as the support automation tool identifies and works on such items.

In some embodiments, each of the local automation services may remotely display to or within a virtual desktop/machine of the support automation tool. In some embodiments, the virtual desktop/machine of the support automation tool on the centralized server may receive the display outputs from execution of the local automation services on each of the remote devices. In some embodiments, the virtual desktop/machine of the support automation tool on the centralized server may display or provide the display outputs from execution of the local automation services on each of the remote devices.

An event detector 1127 may detect any events associated with delivering or providing service or support to the device. The event detector may comprise any application, program, scripts, process, service, task or other types and forms of executable instructions executing on a device, such as a server of the centralized service. The remote connection broker may comprise the event detector. The remote connectivity tool may comprise the event detector. The support automation tool may comprise the event detector. The event detector may receive or identify events via or from the remote connectivity tool, the local automation service, the agent on the device, a user of the device, the support automation tool, a work queue, a system and/or a remote technician. The event detector may receive or identify events via reviewing of a log file. The event detector may receive or identify events via API calls.

In some embodiments, the event detector may comprise any type and form of screen scraper or screen scraping technology or tool. The event detector may be designed and constructed to programmatically obtain, collect, identify, interpret and/or process visual data from a source, such as the display on a screen. The event detector may be designed and constructed to obtain, collect, identify, interpret and/or process visual data from the remote display outputs. The event detector may be designed and constructed to obtain, collect, identify, interpret and/or process graphical data transmitted via a remote display protocol. The event detector may be designed and constructed to obtain, collect, identify, interpret and/or process graphical data displayed by each local automation service within the virtual desktop/machine of the support automation tool.

The event detector may be designed and constructed to identify and detect a set of predetermined graphical outputs or patterns corresponding to one or more events 1128. The event detector may be designed and constructed to identify and detect a predetermined set of graphical user interface elements, such as a window, popup box, message, etc. The event detector may be designed and constructed to identify and detect a predetermined set of graphical changes in the remote output display of the local automation service, such as an error message. The event detector may be designed and constructed to identify and detect an unexpected change in the remote output display of the local automation service, such as an error message. The event detector may be designed and constructed to identify and detect a new window, message, icon, or other graphical representation of a newly launched application, program, service, process or task.

The event detector may be designed and constructed to identify and detect that the local automation service, an application, program, service, process or task is executing longer than expected, such as greater than a predetermined or configured time threshold. The event detector may be designed and constructed to identify and detect that the local automation service, an application, program, service, process or task has times out, such as not generating new graphical output within a predetermined time period. The event detector may be designed and constructed to identify and detect that the changes in the remote display output from the remote device is not occurring within a predetermined time period. The event detector may be designed and constructed to identify and detect that the time between changes in the remote display output from the remote has not occurred within a predetermined time period. The event detector may be designed and constructed to identify and detect that the time to a next change in the remote display output from the remote device has not occurred within a predetermined time period. In some embodiments, the event is expiration of timer, a time measurement exceeding a predetermined threshold or any other temporal measurement determined via monitoring of the remote display out, the remote device or the remote connectivity tool.

The event detector may be designed and constructed to match identified/detected graphical events in the remote display output to one or more events from a plurality of predetermined events 1128. In some embodiments, the event detector determines that a detected graphical event in the remote display output corresponds to an event of a user on the remote device initiating, starting or otherwise engaging in a form of electronic communication, such an email, Instant Messaging or Chat session. In some embodiments, the event detector determines that a detected graphical event in the remote display output corresponds to an event of a user on the remote device initiating, starting or otherwise engaging in a form of electronic communication with the centralized service, such as starting a chat or IM session with a support agent of the centralized service.

In some embodiments, the event detector determines that a detected graphical event in the remote display output corresponds to an event of a completion of execution of or service from a local automation service on the remote device. In some embodiments, the event detector determines that a detected graphical event in the remote display output corresponds to an event comprising a predetermined indicator designed and constructed into the local automation service to indicate that the local automation service has successfully completed its operation, functionality or service. In some embodiments, the event detector determines that a detected graphical event in the remote display output corresponds to an event comprising an indicator that a remote support agent has completed a service, task, process or a portion of workflow, such as via the remote connectivity tool, on the remote device. In some embodiments, the event detector determines that a detected graphical event in the remote display output corresponds to an event comprising an indicator that a step of a plurality of steps in multi-step service to the remote device has been completed. In some embodiments, the event detector determines that a detected graphical event in the remote display output corresponds to an event comprising an indicator that a step of a plurality of steps in a workflow of service has been completed. In some embodiments, the event detector determines that a detected graphical event in the remote display output corresponds to an event comprising an indicator that a last of a plurality of steps in a workflow or multi-step service has been completed.

In some embodiments, the event detector determines that a detected graphical event in the remote display output corresponds to an event comprising an error or issue with an installation of software, application, or other type and form of executable instructions on the remote device. In some embodiments, the event detector determines that a detected graphical event in the remote display output corresponds to an event comprising an error or issue with an installation of hardware or a peripheral device of the remote device. In some embodiments, the event detector determines that a detected graphical event in the remote display output corresponds to an event comprising an error or issue with establishing, applying or changing a configuration or setting of software or hardware of the remote device. In some embodiments, the event detector determines that a detected graphical event in the remote display output corresponds to an event comprising an error or issue with performing or completing a step of a plurality of steps in a workflow or multi-step service.

In some embodiments, the event detector determines that a detected graphical event in the remote display output corresponds to an event comprising an error or issue with the remote connectivity tool or otherwise to remote control of the remote device. In some embodiments, the event detector determines that a detected graphical event in the remote display output corresponds to an event comprising an error or issue with the virtualized environment of the local automation service. In some embodiments, the event detector determines that a detected graphical event in the remote display output corresponds to an event comprising an error or issue with network connectivity of the remote device. In some embodiments, the event detector determines that a detected graphical event in the remote display output corresponds to an event comprising an error or issue with an operating system of the remote device. In some embodiments, the event detector determines that a detected graphical event in the remote display output corresponds to an event comprising an error or issue with an application, program, service, process or task executing on the remote device.

In some embodiments, the event detector determines that a detected graphical event in the remote display output corresponds to an event comprising a notification from an agent 307 executing on the remote device. In some embodiments, the event detector determines that a detected graphical event in the remote display output corresponds to an event of a completion of an installation of software, application, or other type and form of executable instructions on the remote device. In some embodiments, the event detector determines that a detected graphical event in the remote display output corresponds to an event of a completion of installation of hardware or a peripheral device of the remote device. In some embodiments, the event detector determines that a detected graphical event in the remote display output corresponds to an event of a completion of establishing, applying or changing a configuration or setting of software or hardware of the remote device.

In some embodiments, the event detector determines that a detected graphical event is occurring longer than a predetermined time period or threshold. For example, the local automation service may be hung or stopped for a period of time longer than expected and the event detector may detect such an event.

The remote connection broker or support automation tool may determine that a detected graphical event identified as corresponding to or otherwise matching a predetermined event may correspond to a routing point, such as a predetermined or predefined routing or route point 1129. A route or routing point may comprise a point in a process, workflow, performance of service or execution of a local automation service that may, should or is to be routed to another entity, such as a program, person, application or tool. A routing point may comprise a point in a process, workflow, performance of service or execution of a local automation service for which control is to be transferred from one entity to another entity, such as between a program, person, application or tool and another program, person, application or tool. A routing point may comprise a point in a process, workflow, performance of service or execution of a local automation service for which use, control or access via the remote connectivity tool to the remote device is to be transferred from one entity to another entity, such as between a program, person, application or tool and another program, person, application or tool. In some embodiments, each of the events 1128 corresponding to a detected graphical event may be associated with, correspond to or otherwise be a route point. In some embodiments, a selected one or more events from the plurality of predetermined events 1128 may be associated with, correspond to or otherwise be a route point.

A route point may be associated with, correspond to or otherwise identify one or more routes 1137. A route may comprise a sequence of steps in a sequence or workflow, or identification thereof. A route may comprise or identify a sequence of events. A route may comprise or identify a next step or event from a current step or event. A route may comprise or identify a next routing point from a current event or routing point. A route may comprise or identify a next service or task to perform from a routing point. A route may comprise or identify a next service or task to perform based on an event. A route may comprise or identify a next service or task to perform based on a local automation service. A route may comprise or identify a next local automation service to execute upon completion of a current local automation service. A route may comprise or identify the transfer from a routing point to an entity, such as an application, program, person or tool. A route may comprise or identify the transfer between one entity such as an application, program, person or tool to another entity, such as another application, program, person or tool. A route may comprise or identify a next entity to have control, access or use of the remote connectivity tool.

The remote connection broker or support automation tool may communicate with or interface to a logic automation engine 1130 to query, indentify or otherwise determine a route 1137 to be used for a route point 1129 and/or an event 1128. The logic automation engine, sometimes generally referred to as logic automation may comprise an application, program, library, script, process, service, task or other type and form of executable instructions executing on a device, such as a server of the centralized service. The support automation tool may comprise the logic automation. The remote connection broker may comprise the logic automation. The logic automation engine may comprise logic, function or operations to determine an appropriate action to take in view of a event 1128 and/or route 1129. The logic automation engine may comprise rules or policies to determine an appropriate action to take in view of a event 1128 and/or route 1129. The logic automation engine may identify, select or determine a predetermined route of a plurality of routes. The logic automation engine may identify, select or determine a predetermined route corresponding to an event and/or route point.

The logic automation engine may use any criteria, attributes, property, condition or other characteristics of an event, routing point, remote device, local automation service, customer, account, etc. to identify, select or determine a route 1137 at a routing point. In some embodiments, the route may be predetermined, mapped to or identified by the event. In some embodiments, the route may be predetermined, mapped to or identified by the routing point. In some embodiments, the route may be predetermined, mapped to or identified by the routing point or event in conjunction with the type of local automation service. In some embodiments, the logic automation engine may select a route via a policy that selects from a plurality of routes based on any desired criteria or condition. Such routing policies may be configurable by a user. In some embodiments, the logic automation engine may query a database, such as the cross-device database previously described herein, to identify, select or determine a route.

The logic automation may comprise logic, operations, functions, rules or policies to identify, select or determine one or more local automation services to deploy from the local automation packages. The logic automation may identify, select or determine the local automation service responsive to identifying the issue or work type via the centralized service, such as identification of the issue via any of the systems and methods described in connection with FIGS. 1-10. The support automation tool may verify the issue type with the logic automation engine. The logic automation may confirm the issue type. The logic automation may identify a different issue type for the issue. The logic automation may identify a second issue type for the issue. The logic automation may identify a secondary issue type for the issue. The logic automation may provide a suggestion, recommendation or identification of a support plan, next course of action, escalation route, route, compilation of services or local automation services responsive to and based on the issue and/or issue type.

Referring now to FIG. 11B, an embodiment of steps of a method 1150 for automated brokering of a connection to a device is depicted. In brief overview, at step 1155, a customer or user initiates a support request via the centralized service and the centralized service identifies the issue type. At step 1160, the centralized service establishes a connection to the device. At step 1165, the remote connection broker provides uses of the connection to a first entity. At step 1170, the centralized service detects an event or a routing point. At step 1175, the logic automation provides an action, such a route, corresponding to routing point. At step 1180, the remote connection broker transfers remote connectivity to another entity.

In further details, at step 1155, a customer may initiate a request to the centralized service via any one of a plurality of means, including but not limited to telephone request, fax, instant messaging, agent 307, email, web based submission, etc. The customer may be a new user to the centralized service or an existing user. The customer may be an entity or corporate account. The customer may contact the centralized service, or personnel associated with the centralized service, with a problem. The request may be for an issue with one or more devices of the user. The request may be for an a known issue with one or more devices of the user. The request may be for an unknown issue with one or more devices of the user. The request may be a request for service of one or more devices.

Upon agreeing to, accepting or otherwise initiating service for the customer, the centralized service or personnel thereof places the customer into a work queue, such as a work queue for support by the centralized service, such as via an agent or support automation tool. The centralized service or personnel may submit a work order/item in a work queue, such as in accordance with any of the systems and methods previously described herein.

At step 1160, the centralized service establishes a remote connection to the device. In some embodiments, the remote connectivity tool establishes the remote connection responsive to the request of step 1155. In some embodiments, the remote connectivity tool establishes the remote connection responsive to a remote technician initiating a request to establish the connection. In some embodiments, the remote connectivity tool establishes the remote connection responsive to support personnel or customer service representative initiating a request to establish the connection. In some embodiments, the remote connectivity tool establishes the remote connection responsive to a user of the device requesting or accepting the connection. In some embodiments, the remote connectivity tool establishes the remote connection responsive to the intelligent switch of the centralized service. In some embodiments, the remote connectivity tool establishes the remote connection responsive to an agent on the device requesting the connection.

At step 1165, the remote connection broker provides access or use of the connection to an entity, such as any one of the support automation tool, system, work queue or remote technician. In some embodiments, the remote connectivity tool provides access or use of the connection to the entity requesting to establish the remote connection. In some of these embodiments, the remote connection broker maintains the access or use of the remote connection with this entity. In some embodiments, the remote connection broker provides access or use of the connection to the support automation tool. In some embodiments, the remote connection broker provides access or use of the connection to a remote technician. In some embodiments, the remote connection broker provides access or use of the connection to a system 116. In some embodiments, the centralized service places an item in work queue. Upon an entity accepting to perform service on the item, the remote connection broker provides access or use of the connection to that entity.

The remote connection broker provides access or use of the connection to an entity identified via a route. The routing automation of the remote connection broker may automatically identify a first step in a route and automatically assign the remote connection to an entity associated with or designated for the first step. The routing automation of the remote connection broker may automatically identify a next step in a route and automatically assign the remote connection to an entity associated with or designated for the next step.

The routing automation of the remote connection broker may automatically identify an entity to perform service on the device based on an event and automatically assign access or use of the connection to the identified entity. In some embodiments, the routing automation automatically assigns the remote connection to a default entity, such as the support automation tool, work queue or a remote technician. In some embodiments, the routing automation automatically assigns the remote connection to an entity corresponding to the type of work to perform for the request as identified by the intelligent switch.

In some embodiments, the support automation tool is the entity given access or use of the remote connection. The centralized service via support automation tool and/or logic automation engine may identify, determine or select one or more local automation services to deploy to the remote device via the remote connection. The logic automation engine may identify, determine or select a local automation service based on or corresponding to the type of issue, such as the type of issue confirmed by the logic automation engine. The logic automation engine may identify, determine or select a local automation service based on the remote device. The logic automation engine may identify, determine or select a local automation service based on the customer.

The support automation tool may communicate, transmit or transfer one or more local automation services to the remote device via the remote connection. The support automation tool may communicate, transmit or transfer one or more local automation services via the remote connectivity tool. The support automation tool may communicate, transmit or transfer one or more local automation services via the remote connection to an agent on the client. The support automation tool may communicate, transmit or transfer one or more local automation services via a combination of the remote connectivity tool and the agent. The support automation tool may communicate the one or more local automation services as a package for installation and/or execution on the remote device. Upon receipt by the remote device, the one or more local automation services may be automatically installed and/or executed.

The one or more local automation services may be automatically installed and/or executed via a virtualized machine, such as for local automation services comprising a virtual desktop or machine. Upon and during execution of the local automation service, the local automation service transmits or communicates remote display output via the network to the centralized service, such as to one or more servers executing the support automation tool. Upon and during execution of the local automation service, the local automation service transmits or communicates status, data and information via the network to the centralized service, such as to one or more servers. The centralized service, via the agent, support automation tool and/or event detector may monitor the status of execution or performance of services by a local automation service, remote technician or system.

At step 1170, the centralized service detects an event and/or route point. From monitoring the performance or executing of services via the remote connection to the device, the centralized service may identify or detect a predetermined event that may trigger a change of an entity's access or use of the connection. The centralized service, such as via the agent, support automation tool and/or event detector may detect an error or issue with the performance or execution of a service by the entity accessing or using the connection. The centralized service, such as via the agent, support automation tool and/or event detector may detect a completion of the performance or execution of a service by the entity accessing or using the connection. The centralized service, such as via the agent, support automation tool and/or event detector may detect a communication from a user of the device to the centralized service, such as Instant Message, email, chat, etc. The centralized service, such as via routing automation and logic automation, may identify or detect a completion of a step in work flow or route for providing service via the connection to the device. The centralized service, such as via routing automation and logic automation, may identify or detect that service on the device is to transition to a next step in work flow or route for providing service via the connection to the device. The centralized service, such as via routing automation and logic automation, may identify or detect that an event corresponds to a routing point.

The support automation tool, agent or event detector may detect an event corresponding to a customer interaction on the remote device. The support automation tool, agent or event detector may detect an event corresponding to an error or issue with service being provided on the remote device. The support automation tool, agent or event detector may detect an event corresponding to an error or issue with the local automation service on the remote device. The support automation tool, agent or event detector may detect an event corresponding to completion or end of service on the remote device. The support automation tool, agent or event detector may detect an event corresponding to completion or end of execution of the local automation service on the remote device. Any of these events may comprise or correspond to a predefined routing point, such as to route the remote connectivity to the remote device to another entity, such as a support agent/personnel.

At step 1175, the centralized service determines the entity to which the remote connection is to be assigned. Responsive to the detection or identification of an event or routing point, the centralized service may determine another or next entity to be assigned access or use of the remote connection. In some embodiments, the current entity accessing or using the connection may determine the next entity to access or use the connection. In some embodiments, the remote connection broker may determine the next entity to access or use the connection. In some embodiments, the support automation tool may determine the next entity to access or use the connection. In some embodiments, the remote automation may determine the next entity to access or use the connection.

The remote connection broker may communicate with logic automation engine to identify or determine an action corresponding to an event, such as an event that corresponding to or comprising a route point. The logic automation engine may identify an action to be taken by the remote connection broker, the remote connectivity tool or centralized service to handle, process or respond to the event. In some embodiments, the logic automation engine may identify an action to the event as or via a route. The logic automation engine may identify, select or determine a route from a plurality of routes for the event and/or routing point. The logic automation engine may identify a step, point or location of or in the route. The logic automation engine may identify, select or determine an entity (e.g., application, program, person, agent, etc.) for which to provide or transfer the access/control of the remote device via the connection provided by the remote connectivity tool.

The remote connection broker may identify to transfer access or use of the connection from the support automation tool to a system or remote technician. The remote connection broker may identify to transfer access or use of the connection from a system to the support automation tool or remote technician. The remote connection broker may identify to transfer access or use of the connection from a remote technician to the support automation tool or a system. The remote connection broker may identify to transfer access or use of the connection from one remote technician to another remote technician. The remote connection broker may identify to transfer access or use of the connection from one support automation tool to another support automation tool. The remote connection broker may identify to transfer access or use of the connection from one system to another system. The remote connection broker may identify to transfer access or use of the connection from the support automation tool, remote technician or system to a work queue of a pool of service providers. The remote connection broker may identify to transfer access or use of the connection from the centralized service to a third party service provider. The remote connection broker may identify to transfer access or use of the connection from the centralized service to a work queue or system of third party service provider external to the centralized service.

At step 1180, the remote connection broker transfers the use or access of the remote connection from the current entity to another entity. Responsive to identifying the entity to which to transfer access or use of the connection, the remote connection broker may automatically broker the transfer to the identified entity. The remote connection broker may communicate a request to the current entity to release access or use of the connection to the remote connection broker. The remote connection broker may communicate a command to the current entity to return access or use of the connection to the remote connection broker. The remote connection broker may communicate a request or command to the current entity to give or transfer access or use of the connection to an identified entity.

In some embodiments, the routing automation engine takes appropriate action according to route. In some embodiments and in accordance with the route, the routing automation engine provides access or use of the remote connection via the remote connectivity tool to a support agent or user of the centralized service. In some embodiments and in accordance with the route, the routing automation engine provides access or use of the remote connection via the remote connectivity tool to a support automation tool. In some embodiments and in accordance with the route, the routing automation engine provides access or use of the remote connection via the remote connectivity tool to a system. In some embodiments and in accordance with the route, the routing automation engine provides access or use of the remote connection via the remote connectivity tool to an item in work queue. The item in the work queue may be selected by a support automation tool, system or remote technician who gains access or use of the remote connection via acceptance or selection of the item from the work queue.

The remote automation engine may transfer the remote connectivity among a plurality of entities, such as in accordance with the route. The remote automation engine may transfer the remote connectivity to a first entity, which performs some actions, and returns the remote connectivity the remote automation engine. The remote automation engine may transfer the remote connectivity to a second entity, which performs some actions, and returns the remote connectivity to the remote automation engine. The remote automation engine may transfer the remote connectivity to a next entity, which performs some actions, and returns the remote connectivity to the remote automation engine. The remote automation engine may transfer, coordinate and move the remote connectivity among steps, points or entities in accordance with the routing information of the route. The remote automation engine may transfer, coordinate and move the remote connectivity among entities for a route that encompasses a multi-task resolution to an issue or multi-task set of one or more services, such as those depicted and described in connection with FIG. 6.

The entity to which the remote automation engine provided the remote connectivity or the remote connectivity tool may transfer or return the remote connectivity or remote connectivity tool to the remote automation engine. The remote automation engine may transfer the remote connectivity to a first entity. The first entity may transfer back the remote connectivity to the remote automation engine. For example, the remote automation engine may transfer the remote connectivity to a support agent. The support agent performs some actions on the remote device and returns the remote connectivity to the remote automation engine. The remote automation engine may transfer the remote connectivity to a first entity, which in turn transfers the remote connectivity to a second entity and so on. The second entity or any subsequent entity may transfer the connectivity to the remote automation engine. In some embodiments, the remote automation engine provides or transfers to the support automation tool the remote connectivity. The support automation tool may deliver and execute one or more local automation services responsive to receiving the remote connectivity.

The method may continue back to step 1170 to detect another event or routing point, and at step 1175, determine a next entity to transfer access or use of the connection and at step 1180 transferring the access or use of the connection to the next identity. These steps may be performed multiples times. The method may continue performing steps 1170, 1175 and 1180 until a completion of service is detected. Upon completion of service, the remote connection broker may assign or transfer access or use of the connection to a support agent, remote technician or customer representative to perform a check or validation of completion of service. Upon determining to disestablish or close the connection to the device, the remote connection broker may unassign, stop or make unavailable the access or use of the connection to the current entity or any entity. The remote connection broker may inform, request or communicate the remote connectivity to tool to disestablish or disconnect the remote connection from the device. In some embodiments, a user of the centralized service, such as a remote technician, requests or commands the remote connectivity to tool to disestablish or disconnect the remote connection from the device.

Figure 11C:
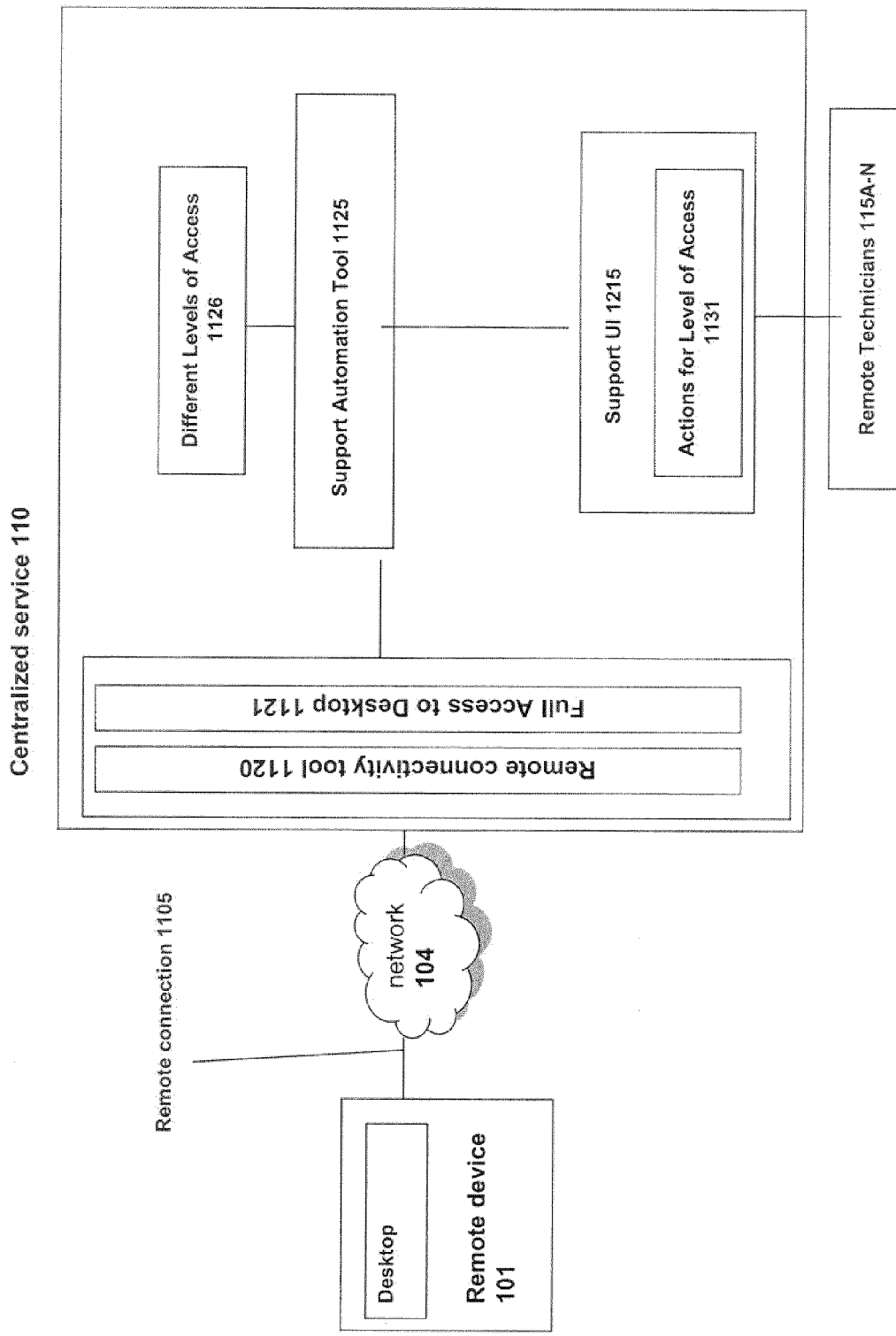
FIG. 11C is a block diagram that depicts an embodiment of a system for automated brokering of connection to a device.
Figure 11D:
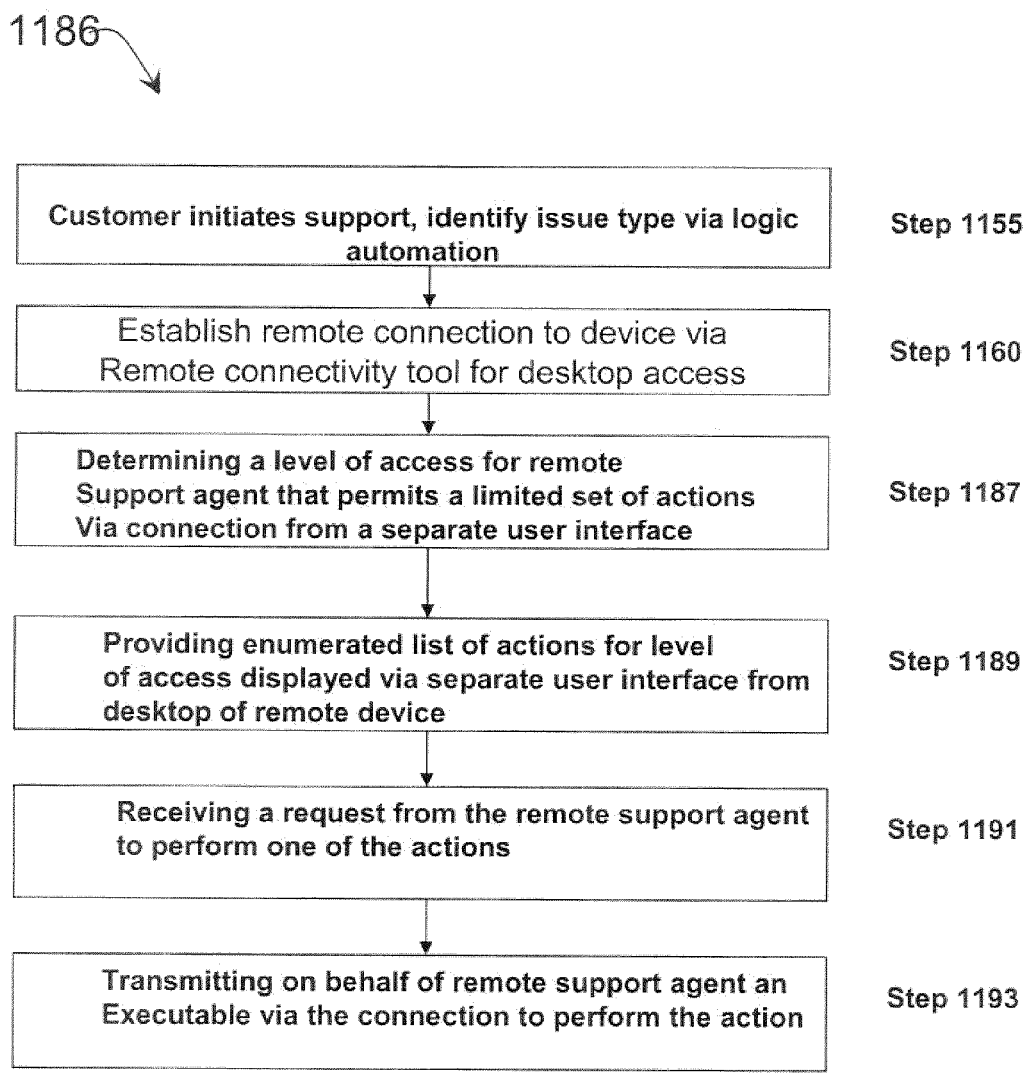
FIG. 11D is a flow diagram that depicts an embodiment of a method for providing different levels of access via the same connection to a device.

Referring now generally to FIGS. 11C and 11D, systems and methods of providing different levels of access to a remote device via the same connection to the remote device is depicted. The remote connectivity tool establishes a connection to a remote device. Via the connection, the remote connectivity tool has access to the desktop of the remote device as such that the user has access to the desktop remotely as if the user was on the device locally. If any user gains control of or use of the remote connectivity tool they will have the same access to the desktop. It may be desired to provide different levels of access for different users via the same connection as well as not allowing certain support agents access via the connection to the desktop of the remote device. The systems and methods described herein provide different levels of access via the same connection to different support agents and may provides such access via a user interface separate from the desktop view provided by the connection to the device. In this manner, a single connection may be used but the type and kind of access to the desktop is secured, controlled and managed.

Referring now to FIG. 11C, an embodiment of a system for controlling and managing different levels of access via the same connection to a remote device is depicted. In brief overview, a centralized service 110 via remote connectivity tool 1120 may establish via network 104 a remote connection 1105 to a remote device 101. The remote connection established by remote connectivity tool may provide or give full access 1121 to the desktop of the remote device, for example, such as a user may view and perform actions remotely on the desktop of the remote device as if the user was locally logged in and accessing the desktop. Instead of providing some agents, applications or systems full access 1121 to the desktop, the centralized service, such as via the support automation tool 1125, may provide different levels of access 1126 to different agents, different applications and/or different systems. For example, the support automation tool 1125 may provide via a support user interface 1215, separate from a desktop view provided by the remote connectivity tool, may display only the actions 1131 for the level of access granted to the particular support agent. When such a support agent selects or initiation one of these actions on the remote device, the support automation tool on behalf of the support agent executes that action via the remote connection without giving the support agent access to the desktop of the remote device.

In further details, the remote connectivity tool may establish a remote connection to the remote device that provides a predetermined level of access 1121 to the remote device, which may generally referred to as full access or desktop access. The level of access via the remote connection provided by the remote connectivity tool may include full access to the desktop of the remote device. The level of access may include unlimited access to the desktop of the remote device. The level of access may include the same access to the desktop of the remote device as any user with credentials to access the desktop. For example, the level of access via the remote connection provided by the remote connectivity tool may include the same views and actions that an administrative user has locally on the remote device. With this level of access, a remote user via the remote connectivity tool may view the entire desktop of the remote device as if the user was a local user of the remote device. The predetermined level of access provided via the connection 1105 by the remote connectivity tool may be considered the highest or fullest or an unlimited level of access in view of the different levels of access 1126 that may be granted and/or provided.

The centralized service 110 via any of its components described herein may maintain and manage different levels of access 1126 for users, such as remote technicians 115A-N, applications, such as support automation tool 1125, and/or systems, such as third party systems for use and access of the connection to the remote device. Each of the different levels of access 1126 may comprises access that includes a subset of actions that a user may have via the predetermined level of access 1121 provided by the remote connectivity tool via the connection. Each or some of the different levels of access may include access only via a separate user interface, such as the support user interface 1215 described elsewhere herein. Each or some of the different levels of access may exclude access via the remote connectivity tool to the desktop of the remote device. That is, in some embodiments, a user assigned a certain level of access may not have access to the desktop of the remote device. The user may not view or control the desktop of the remote device provided by the predetermined level of access 1121. In such cases, the user may have indirect access via other means, including the support UI, the support automation tool, or the centralized service acting on behalf of the user. In some cases for a certain level of access, a user may only have the support automation tool, on behalf of the user, transmit and execute executables, such as local automation services, via the remote connection 1105.

Each level of access in the plurality of different levels of access may correspond to permitted set of actions, services or support that a remote technician may perform on a remote device. Each level of access may have a different set of actions, services or support that a remote technician may perform on the remote device. In some embodiments, one level of access may comprise the permitted actions, services or support of another level of access plus additional permitted actions. In some embodiments, one or more levels of access may have actions, services or support not overlapping with another level of access. In some embodiments, one or more levels of access may have actions, services or support that overlap with another layer of access.

In some embodiments, the remote connectivity tool may provide different levels of access via the remote connection. In view of the predetermined level of access to the desktop 1121, the remote connectivity tool may provide various limited levels of access to the desktop via the remote connection. For example, the remote connectivity tool may provide different levels of access that limits a user's access to certain menu items, functions or other operations via the desktop. So although the user may see all or a portion of the desktop of the remote device, the remote connectivity tool prevents or disables a predetermined set of tasks, functions or operations on the remote device via the connection and/or view of the desktop. In some embodiments for certain levels of access, the remote connectivity tool limits the remote view of the user to the desktop via the remote connection to certain portions of the desktop.

The centralized service may identify and/or determine a level of access from the plurality of different levels of access 1126 to assign and/or grant a remote technician 115 based on any one or more of the following: issues with the remote device, type of service to be performed on the remote device, capabilities of the remote technician and the level of service and/or services entitled to be provided to the remote device. For identifying and/or determining a level of access from the different levels of access to assign and/or grant to a remote technician, the centralized service may use any of the embodiments of the systems and methods described herein for assigning a task or request for service to a work queue for identifying and/or determining a level of access from the different levels of access to assign and/or grant to a remote technician. For identifying and/or determining a level of access from the different levels of access to assign and/or grant to a remote technician, the centralized service may use any of the same embodiments of the systems and methods described herein for assigning a task or request for service to a remote technique and/or a remote technician to a work for queue. For example, when assigning a remote technique to a task, request or work queue, the centralized service may also assign a level of access based on the same decision. In another example, the centralized service may identify and/or determine a level of access from the different levels of access to assign and/or grant to a remote technician based a level of access from the different levels of access to assign and/or grant to a remote technician, such as based on the skill sets, capabilities 210 and/or knowledge that they have and type of work or service they may perform. For example, the centralized service may identify and/or determine a level of access from the different levels of access to assign and/or grant to a remote technician based on profiles for each of the remote technicians 115, which may identify the technical capabilities, certifications, types of service or work authorized or assigned to perform, and/or performance information and statistics for past service work.

Based on the level of access assigned to or determined for a remote technician, the support automation tool 125 may present and/or display via a user interface separate from the view of the desktop, such as the support UI 1215, a predetermined set of actions permitted, granted or allowed for that level of access. For example, if a remote technician is assigned to a level of access that limits the actions the remote technician may take via the connection to collecting data, such as telemetry data, the support automation tool via the support UI may present to the remote technician a limited set of actions corresponding to collecting data. The user, such as a remote technician, may select or initiate the set of actions corresponding to the level of access. The centralized service may execute on behalf of the remote technician such actions via the remote connection. As such, the remote technician in such embodiments may not access the remote device via the desktop provided by the remote connection but only indirectly via the control and management of the centralized service.

The support automation tool and separate UI of the support automation tool provide a level of abstraction and/or a layer of security and control from the predetermined level of access, such as the full access 1121, provided via the remote connectivity tool. This may referred to as a "\walled garden" approach to providing access via the remote connection. A walled garden refers to the centralized service's control over access and use of the remote connection and/or access and use of the desktop of the remote device while restricting access to non-approved uses. The centralized service determines which remote technicians, services and executables gain access via the remote connection to the remote device and in which manner, such as via a separate UI and controlled execution by the support automation tool.

Referring now to FIG. 11D, an embodiment of a method for controlling and managing different levels of access via the same connection to a remote device is depicted is depicted. In brief overview, at step 1155, a support request is initiated on remote device. At step 1160, the remote connectivity tool established a remote connection to the remote device. At step 1187, the centralized service determines a level of access for remote technician. At step 1189, the centralized service provides an enumerated list of actions via user interface separate from the desktop and that correspond to level of access. At step 1191, the centralized service receives a request from the remote support agent via the separate user interface to perform of the actions. At step 1193, the centralized services performs the action on behalf of the remote support agent, such as by transmitting an executable via the remote connection to perform the action on the remote device.

In further detail, steps 1155 and step 1160 may include any embodiments of these steps as described in connection with FIG. 11C. Upon establishing the remote connection, the remote connectivity tool establishes or provides a predetermined level of access to the desktop of the remote device, such as full access to the desktop. The remote connectivity tool may provide a predetermined level of access to the desktop corresponding to the same access as a user of the remote device, such as an administrative user. In some cases, only a user of the centralized service granted a level of access to the remote connectivity tool can access and view the desktop of the remote device via the remote connection.

At step 1187, the centralized service determines from the plurality of different levels of access a level of access for a remote technician to work on the remote device. Based on any combination of the type of service or issue of the remote device and capabilities of the remote technician, the centralized service may determine the appropriate level of access to grant the remote technician in using the same connection of the remote connectivity tool. For each of the different remote technicians who may perform service or work on the remote device, the centralized service may determine and grant different levels of access.

At step 1189, the centralized service provides a list of actions to the remote technician corresponding to or permitted by the level of access assigned or granted to the remote technician. The centralized service enumerates a list of actions permitted by the level of access via a user interface separate from any user interface or view, such as the desktop view, provided by the remote connectivity tool and a predetermined level of access 1121. The centralized service, such as via the support automation tool, may display the list of actions for the level of access to the remote technician via the device and display of the device of the remote technician. Instead of seeing or viewing the desktop of the remote device, the remote technician sees or views a separate user interface without any direct access to the desktop of the remote device.

At step 1191, the centralized service receives a request from the remote technician to perform one of the actions the remote technician is permitted, in accordance with the level of access, to execute on the remote device. Via the separate user interface displayed on the device of the remote technician, the remote technician may select a user interface element corresponding to the action to execute. The centralized service, such as via the support automation tool, may receive this selection. Via the separate user interface displayed on the device of the remote technician, the remote technician may select or request the execution of the selected action. The centralized service, such as via the support automation tool, may receive this request to execution the selected action.

At step 1193, the centralized service performs the action on behalf of the remote technician via the remote connection. The support automation tool may select and transmit an executable, such as a local automation service described herein, via the remote connection. The support automation tool may transmit the executable to the remote device and have the executable executed on the remote device to perform the desired action.

Instead of the remote technician performing the action on the remote device via the desktop view provided by the remote connectivity tool, the centralized service may via the support automation tool may perform the action via the remote connection on behalf of the remote technician. As such, in some embodiments, only the action requested can be and is performed via the remote connection without the opportunity for the remote technician to perform an unauthorized or inadvertent action not corresponding to the remote technician's level of access.

The systems and methods for providing "walled garden" access to the remote device via the remote connection may be further illustrated by the embodiments of FIGS. 12A and 12B below for the delivery of automated services via configurable based on entitlement of the user to the services and/or capabilities of the support agent.

G. Systems and Methods for Configuring and Launching Automated Services to a Device Referring now to FIGS. 12A and 12B, systems and methods of present solution provide for the delivery of automated services via configurable packages that are selectable on a user interface by a support agent based on entitlement of the user to the services and/or capabilities of the support agent. For example, a centralized service may package a complex set of actions into configurable executable scripts or packages. The centralized service may deliver and execute the packages on the remote device to resolve a customer's issue. The centralized service may provide a user interface for a support agent to select and deliver the package to the remote device. The centralized service may determine whether or not the user is entitled to receive the service represented by the package. If the user is so entitled, the centralized service may enable a single button on the user interface selectable by the support agent to deliver the package to the remote device. If the user is not entitled, the centralized service may disable or not provide this button on the user interface. The centralized service may determine whether or not the support agent is qualified to deliver or provide the service represented by the package. If the support agent is qualified, the centralized service may enable a single button on the user interface selectable by the support agent to deliver the package to the remote device. If the support agent is not entitled, the centralized service may disable or not provide this button on the user interface. Based on a combination of user entitled and support agent capabilities, the centralized service may display and/or enable single user interface elements to deliver a complex set of actions in a single package to a remote device.

Figure 12A:
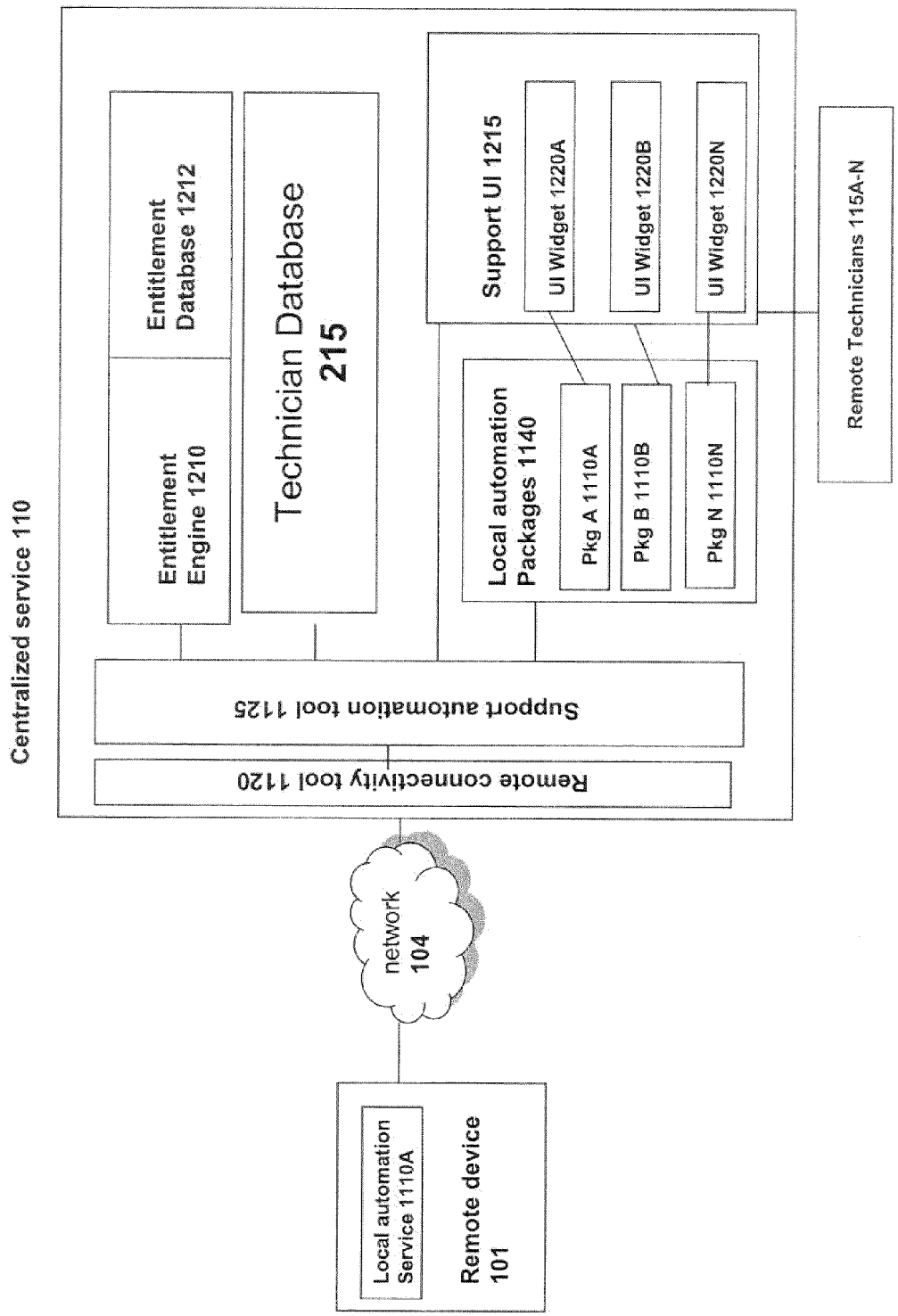
FIG. 12A is a block diagram that depicts an embodiment of a system for configuring and launching automated services.

Referring now to FIG. 12A, an embodiment of a system for configuring and automating the delivery of local automation services to a device is depicted. In brief overview, the system includes a centralized service 110 that provides support via remote technicians 115A-N (generally referred to as 115), a support automation tool 1125 or a system 116 (not shown in FIG. 12A). The centralized service may receive over a network 104 a request to provide support to a remote device 101. The remote connectivity tool 1120 may establish or provide remote connectivity via a connection to the device 101. A support automation tool, remote technician or system may deliver or provide support or perform services via the connection provided by the remote connectivity tool to the device. The centralized service may provide a set of local automation packages 1140 that configure a set of actions or services into a service package to be delivered and executed on the device 101. Each local automation package 1110A-110N may perform a set of actions directed to providing a predetermined set of one or more services. The system may include an entitle engine 120 that manages or provides an interface to an entitlement database 1212 that stores information on whether or not a user is entitled to certain services via the centralized service. The system may include a technician database which stores the capabilities and certifications of the remote technicians 115. A support user interface 1215 may display or provide a plurality of user interface widgets 1220A-1120N which when displayed and enabled are selectable by a remote technician to launch the delivery and execution of one or more local automation packages to the device. Based on determining whether a user is entitled to service and/or remote technician is qualified to deliver such services, the support user interface may display and/or enable a UI widget corresponding to the service the user is entitled to and the support agent may deliver.

The centralized service may include any of the embodiments previously described herein, including but not limited to any of the embodiments described above in connection with FIG. 11A. The technician database 215 may include any of the embodiments of the technician database described above in connection with FIG. 4. The support automation tool 1125 may include any embodiments described above in connection with FIGS. 11A and 11B. The local automation packages 1140, such as local automation services 1110A-1110N may include any embodiments described above in connection with FIGS. 11A and 11B.

The entitlement database 1212 may store data and information on entitlement or a right of a user, entity or device to obtain, access or receive one or more services or products offered, provided or delivered via the centralized service. The entitlement database 1212 may store such data and information responsive to a user or entity purchasing one or more products or services from or via the centralized service. The entitlement database 1212 may store such data and information responsive to a user or entity purchasing a subscription to a predetermined level of products and/or service from or via the centralized service. The entitlement database may store information on control or permission of a user, entity or device to access one or more resources, such as services and/or products provided via the centralized service.

For each user, entity or device, the entitlement database may enumerate a list of products and/or services to which the user, entity or device is entitled or has a right to access, obtain or receive. The entitlement database may store with each product and/or service a time period for which the product and/or service may be accessed, obtained or received. The entitlement database may store with each product and/or service an expiration period upon which access to the product and/or service is expired. The entitlement database may store with each product and/or service a renewal period for which access, purchase or subscription to the product and/or service needs to be renewed. The entitlement database may store with each product and/or service a prerequisite, condition or criteria of the user, entity or device to access, obtain or receive the product and/or service.

The entitlement engine 1210 may manage and provide an interface to the entitlement database 1212. The entitlement engine may comprise an application, program, library, service, process, script, task or any type and form of executable instructions executable on a device. The entitlement engine may comprise any type and form of interface to store or configure data or information into the entitlement database. The entitlement engine may provide an interface to allow a user to configure the entitlement or access control of a user, entity or device to one or more products and/or services. For example, a support agent or customer representative may update the entitlement database with products and/or services purchases by a customer. The entitlement engine may provide a programmatic interface or API to allow a system or application to configure the entitlement or access control of a user, entity or device to one or more products and/or services. For example, any component of the centralized service may make an API call to store entitlement information in the entitlement database based on a customer purchasing products and/or services, such as via an online transaction. The entitlement engine may provide an interface to allow a user or a system to change the entitlement or rights to access, user or obtain a product or service.

The entitlement engine may communicate to a requestor information about entitlement or right of a user, entity or devices to access, obtain or receive a predetermined product or service. The entitlement engine may comprise an application programming interface (API) to query the entitlement database and return results from the query. The entitlement engine may comprise an query language interface, such as Structured Query Language (SQL) to query the entitlement database and return results from the query. The entitlement engine may provide an interface to receive an identifier of a user, entity or device and return an enumerated list of one or more products and/or services associated with the identifier and/or to which the user, entity or device is entitled. The entitlement engine may provide an interface to receive an identifier of a user, entity or device and an identifier of a product and/or service and return an indicator of whether or not the identified user, entity or device is entitled to the identified product or service.

The support user interface (UI) 1215 may comprise any type and form of user interface for accessing the functionality and operations of the centralized service. The support UI may comprise an application, program, library, service, process, script, task or any type and form of executable instructions executable on a device. The centralized service may provide the support UI to remote technicians to access any one or more queues 108, such as queues having a customer service request or incident report. The support UI may display or provide access to diagnostic information on the device. The support UI may display or provide access to information on hardware components of the device. The support UI may display or provide access to information operating system version and configuration. The support UI may display or provide access to information on the applications installed on the device and the version and configuration of such applications on the device. The support UI may display or provide access to information about solutions to common problems. The support UI may display or provide access to information on how to diagnose, debug or address problems or issues.

The support UI may comprise a plurality of UI widgets 1220A-1120N that provide access to automated services, such as local automation packages 1140. A UI widget may comprise any type and form of user interface element selectable by a user, such as a button or choose list menu item. Each of the UI widgets may be the same kind or type of widget. In some embodiments, each of the UI widgets may be of a different kind or type. The UI widgets may be designed and constructed to be programmatically enabled and disabled. The UI widgets may be designed and constructed to be programmatically shown and hidden. The UI widgets may be designed and constructed or configured to call, execute, launch or deliver one or more local automation packages 1140 responsive to user input, such as selection (e.g. clicking) of the UI widget. The UI widgets may be designed and constructed to programmatically change the one or more local automation packages that is called, executed, launched or delivered responsive to user input, such as selection (e.g. clicking) of the UI widget by the user.

Each UI Widget may correspond to or represent a predetermined set of services and/or products which may be delivered, provided or performed by one or more location automation services 1110A-N. Each UI Widget may be configured, designed or constructed to present an identifier, description or information on the predetermined set of services. Each UI Widget may correspond to or represent any one or more of the following services (including but not limited to): virus removal, spyware removal, operating system installation, computer tune up, e-mail setup, peripheral configuration, software or application installation, network setup, wireless setup, browser support, new computer setup, file transfer, database backup service, antivirus installation, computer accessories setup, troubleshooting, diagnostics and printer setup. Any one or more of the local automation services may be designed, constructed or configured to perform any of the above services.

The local automation services may be in the form of scripts which are configurable to perform a set of actions to perform the one or more services or deliver one or more products. In some embodiments, instead of local automation services, there are such scripts that are called, launched, executed or delivered by selection of a UI widget.

The local automation services or scripts may automatically perform user input and actions that a remote technician would perform if the remote technician was manually performing or providing the service. For example, the local automation service or script may mimic, play or repeat a set of remote technician actions, such as mouse movement, mouse clicks, user interface selections, etc. As such, in some embodiments, the user of the device sees the services being performed on the device as if a remote technician was performing the service although the script or local automation service is automatically performing such service.

The support UI may be designed and constructed to display and/or enable a UI widget responsive to a user's entitlement to one or more services or products corresponding to or represented by the UI Widget. The support UI may be part of the support automation tool, the remote connectivity tool or the intelligent switch. The support UI may interface to or communicate with the entitlement engine to determine whether or not a user has the right to obtain, access or receive a service or product. Based on the user's entitlement, the support UI may determine which UI widgets to display and enable a remote technician to select. If the user is not entitled to any of the services, the support UI may not display any UI widgets. If the user is not entitled to any of the services, the support UI may disable the UI widgets. If the user is entitled to a subset of services, the support UI may display and/or enable the UI widgets corresponding to or representing the subset of services and the support UI may hide and/or disable the UI widgets corresponding to or represent those other services to which the user is not entitled. The support UI may be designed and constructed to display/hide and enable/disable UI widgets based on the context of a selected item, incident or user for which the remote technician is working on. For example, if the remote technician selects another work item from a queue, the support UI may automatically display/hide and enable/disable UI widgets based on the entitlements of the user for that selected work item.

The support UI may be designed and constructed to display and/or enable a UI widget responsive to an agent's capabilities and/or certifications to access, deliver or provide one or more services or products corresponding to or represented by a UI Widget. The support UI may interface to or communicate with the technician database to determine whether or not a remote technician has the capabilities and/or certification deliver or provide one or more services or products corresponding to or represented by a UI Widget. Based on the remote technician's capabilities and certifications, the support UI may determine which UI widgets to display and enable a remote technician to select. If the remote technician does not have the appropriate capabilities and certification for any of the service, the support UI may not display any UI widgets. the remote technician does not have the appropriate capabilities and certification for any of the services, the support UI may disable the UI widgets. If the remote technician has the appropriate capabilities and certification for a subset of services, the support UI may display and/or enable the UI widgets corresponding to or representing the subset of services and the support UI may hide and/or disable the UI widgets corresponding to or represent those other services to which the remote technician does not have the appropriate capabilities and/or certifications. The support UI may be designed and constructed to display/hide and enable/disable UI widgets based on the context of the remote technician logged into or signed into the support UI. For example, if a different remote technician signs into the support UI, the support UI may automatically display/hide and enable/disable UI widgets based on the capabilities and/or certification of the new remote technician.

In view of the above, the support UI may be designed and constructed to display and/or enable a UI widget responsive to both: i) to a user's entitlement to one or more services or products and ii) an agent's capabilities and/or certifications to access, deliver or provide one or more services or products corresponding to or represented by a UI Widget. In an example embodiments, a user may be entitled to a service to be provided by UI Widget A. However, remote technician A is not certified to provide the service and therefore on the support UI display for remote technician A, UI Widget A is not shown or shown and disabled. Remote technician B is certified to provide the service therefore on the support UI display for remote technician A, UI Widget A is shown and enabled. In another example, remote technicians A and B are certified to provide a service corresponding to UI Widget A. However, user A is not entitled to such a service and therefore, UI Widget A is not shown or shown and disabled on the Support UIs of each of remote technician A and B. User B is entitled to such a service and therefore when remote technicians A and B are working on User B's service call/request, UI Widget A is shown and enabled.

Although generally described herein in terms of entitlement to a user, the systems and methods described herein apply as well to entitlement to entities and devices. As such, the support UI and the UI Widgets may be shown/hidden and/or enabled/disabled responsive to the entitlement of a device to obtain, access or receive a corresponding product or service. The support UI and the UI Widgets may be shown/hidden and/or enabled/disabled responsive to the entitlement of an entity (e.g., a company and any company users) to obtain, access or receive a corresponding product or service.

Figure 12B:
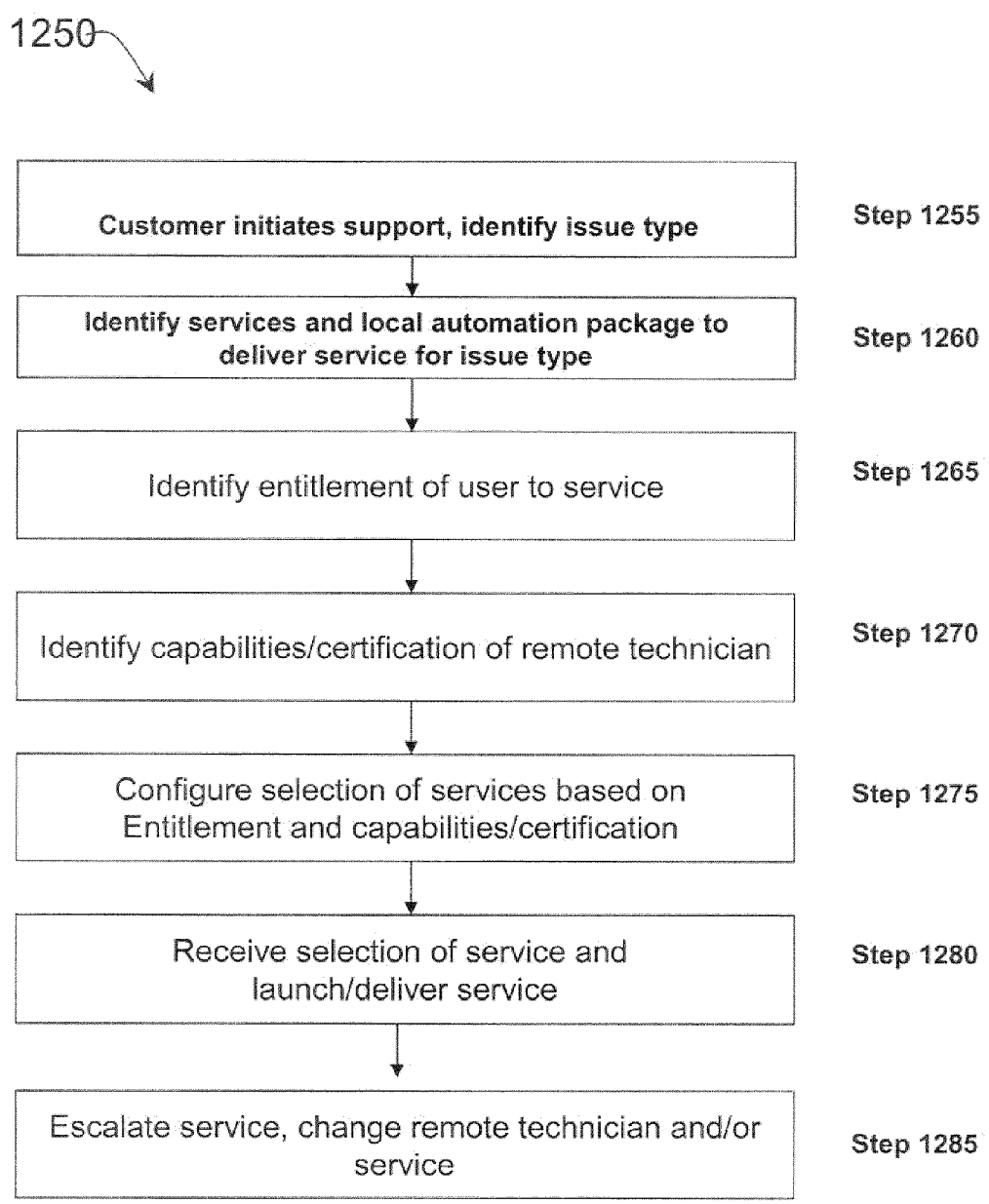
FIG. 12B is a flow diagram that depicts an embodiment of a method for configuring and launching automated services.

Referring to FIG. 12B, an embodiment of a method 1250 for configuring and automating the delivery of local automation services to a device is depicted. In brief overview, at step 1255, the centralized service receives a customer support request and identifies an issue or work type for the request. At step 1260, the centralized service identifies a service to perform on the device based on the issue or work type. At step 1265, the centralized service identifies entitlement of user to service. At step 1270, the centralized service may identify the capabilities and certifications of a remote technician assigned to work on the request. At step 1275, the centralized service configures the support UI to present UI widgets selectable to perform the service based on the user's entitlement and/or the remote technician's capabilities and certifications. At step 1280, the centralized service receives selection of the UI widget to launch or deliver the service via a local automation service or script to the device. At step 1285, the support request may be escalated to a different remote technician or another service may be performed The centralized service may the support UI of the different remote technician to present UI widgets selectable to perform the new service or the escalated service based on the user's entitlement and/or the remote technician's capabilities and certifications In further details, at step 1255, customer may initiate a request to the centralized service via any one of a plurality of means, including but not limited to telephone request, fax, instant messaging, agent 307, email, web based submission, etc. The customer may be a new user to the centralized service or an existing user. The customer may be an entity or corporate account. The customer may contact the centralized service, or personnel associated with the centralized service, with a problem. The request may be for an issue with one or more devices of the user. The request may be for an a known issue with one or more devices of the user. The request may be for an unknown issue with one or more devices of the user. The request may be a request for service of one or more devices.

Upon agreeing to, accepting or otherwise initiating service for the customer, the centralized service or personnel thereof places the customer or request into a work queue, such as work queue of the remote connectivity tool, for support by the centralized service, such as via an agent or support automation tool. The centralized service or personnel may submit a work order/item in a work queue, such as in accordance with any of the systems and methods previously described herein.

The support automation tool may detect work available in a work queue and/or the remote connectivity tool. The support automation tool may receive an event or other communication from the remote connectivity tool upon new work items in one or more work queues. The support automation tool may receive an event or other communication from a work queue upon new work items in the work queue. The support automation tool may receive an event or other communication from a support agent regarding new work items in one or more work queues. The support automation tool may query one or more work queues on a predetermined frequency or basis. The support automation tool may monitor one or more work queues on a predetermined frequency or basis. The support automation tool may comprise an API, function call, script or other programmatic means to interface with the remote connectivity tool and/or a work queue to obtain an item in the work and any information thereof, such as network address of the remote device of the customer.

Via information from the item from the work queue, the support automation tool connects with the remote device using or via the remote connectivity tool. The support automation tool may collection information from the device, such as via agent 307. The support automation tool may verify the issue with the device. The support automation tool may use the information collected from the remote device to verify the type of issue with the logic automation engine.

The centralized service, such as via the Intelligent Switch 106, may identify or determine the work type or type of work 202 for the request, such as in accordance with any of the systems and methods previously described herein, such as in connection with. In some embodiments, the intelligent switch automatically and programmatically determines the work type. In some embodiments, a support agent, customer representative or remote technician determines the work type. In some embodiments, the customer determines the work type. In some embodiments, an onsite technician determines the work type and identifies the work type to the centralized service.

At step 1260, the centralized service identifies or determines one or more service to deliver to the device of the customer. The centralized service may determine the service based on the work type identified at step 1255. For example, the intelligent switch 106 may determine the service. A remote technician, support agent or customer representative identifies or determines the service. In some embodiments, the customer requests or identifies the service. The centralized service may identify one or more local automation services to deliver to the remote device corresponding to the identified service. The local automation service may be configured to perform, deliver or provide the identified service. For example, a local automation service may be designed, constructed or configured to perform, deliver or provide any one or more of the following: virus removal, spyware removal, operating system installation, computer tune up, e-mail setup, peripheral configuration, software or application installation, network setup, wireless setup, browser support, new computer setup, file transfer, database backup service, antivirus installation, computer accessories setup, troubleshooting, diagnostics and printer setup.

In some embodiments, the centralized service may dynamically and automatically configure or create a local automation service to perform a selected service or a plurality of selected services. The centralized service may dynamically and automatically configure or create a local automation service responsive to the customer request and/or identification of a work type. In some embodiments, the centralized service may dynamically and automatically configure or create a customized local automation service to perform a selected service or a plurality of selected services for a particular device or user. In some embodiments, the centralized service may dynamically and automatically configure or create a customized local automation service to perform a selected service or a plurality of selected services for a particular operating system. In some embodiments, the centralized service may dynamically and automatically configure or create a customized local automation service to perform a selected service or a plurality of selected services for a particular application. In some embodiments, the centralized service may dynamically and automatically configure or create a customized local automation service to perform a selected service or a plurality of selected services for a particular network. In some embodiments, the centralized service may dynamically and automatically configure or create a customized local automation service to perform a selected service or a plurality of selected services for a particular situation of the user.

In some embodiments, the centralized service via support automation tool and/or logic automation engine may identify, determine or select one or more local automation services to deploy to the remote device. The logic automation engine may identify, determine or select a local automation service based on or corresponding to the type of issue, such as the type of issue confirmed by the logic automation engine. The logic automation engine may identify, determine or select a local automation service based on the remote device. The logic automation engine may identify, determine or select a local automation service based on the customer.

At step 1265, the centralized service identifies or determines an entitlement of the user to receive the identified services. Any portion of the centralized service, such as the support automation tool, intelligent switch or support UI, may query the entitlement database via the entitlement engine. The support automation tool may query the entitlement database via the entitlement engine based on an identifier of the user. The support automation tool may query the entitlement database via the entitlement engine based on an identifier of the user and the identified service. The entitlement engine may return a result to the query that identifies whether or not the user is entitled to obtain, access or receive the service. The entitlement engine may communicate to the requestor an indication of whether or not the user is entitled to obtain, access or receive the service. The entitlement engine may communicate or identify that the user is entitled to the service. The entitlement engine may communicate or identify that the user is not entitled to the service. The entitlement engine may communicate or identify that the user's entitlement to service has expired. The entitlement engine may communicate or identify that the user's entitlement to service needs to be renewed.

At step 1270, the centralized service identifies or determines the capabilities and certifications of a remote technician assigned to the customer request. Any portion of the centralized service, such as the support automation tool, intelligent switch or support UI, may query the technician database 215 to identify or determine a technician's capabilities and/or certifications. The centralized service may query the technician database to determine whether a technician assigned to perform the service has a predetermined set of capabilities. The centralized service may query the technician database to determine whether the capabilities of the technician assigned to perform the service meets a predetermined threshold. The centralized service may query the technician database to determine whether the technician is certified to perform the identified service.

At step 1275, the centralized service configures or serves the support UI to present UI widgets to launch or deliver services corresponding to the identified service that the user is entitled to receive and/or the remote technician is qualified to provide. Responsive to the user being entitled to the service, the support UI for the assigned remote technician displays and/or enables a UI widget that calls, executes, launches or delivers the identified service. Responsive to the remote technician having the appropriate capabilities and/or certifications, the support UI for the assigned remote technician displays and/or enables a UI widget that calls, executes, launches or delivers the identified service. Responsive to the user being entitled to the service and the remote technician having the appropriate capabilities and/or certifications, the support UI for the assigned remote technician displays and/or enables a UI widget that calls, executes, launches or delivers the identified service.

If the user is not entitled to the service, the support UI hides and/or disables the UI widget that calls, executes, launches or delivers the identified service. If the remote technician does not have appropriate capabilities and/or certifications, the support UI for the assigned remote technician may hide and disable the UI widget that calls, executes, launches or delivers the identified service.

If the support UI displays or provides UI widgets for other services and the user is not entitled to those services, the support UI may hide or disable these UI widgets for other services. If the support UI displays or provides UI widgets for other services and remote technician does not have appropriate capabilities and/or certifications, the support UI may hide or disable these UI widgets for other services. If the support UI displays or provides UI widgets for other services and the user is not entitled to those services and remote technician does not have appropriate capabilities and/or certifications, the support UI may hide or disable these UI widgets for other services.

At step 1280, the centralized service receives selection of the UI widget by the remote technician. A single selection of a single UI widget may launch or deliver a complex set of actions via a local automation service. Responsive to receipt of the selection, the centralized service delivers the local automation service to the remote device via the connection provided by the remote connectivity tool. The support automation tool may dynamically and automatically transmit the local automation service corresponding to the selected UI widget via the remote connectivity tool to the remote device. Upon receipt of the local automation service to the remote device, the local automation service may automatically perform the service, such as via unpackaging, installation and/or execution of the local automation service. In some embodiments, the local agent on the device may execute or operate the local automation service to perform the service on the device. While the service has been launched, the support UI may disable the UI widget so that the automated service cannot be launched a second time.

At step 1285, the centralized service may change the remote technician to service the device and/or move on to a second automated service to deliver to the device. In some embodiments, the centralized service detects an error, issue or problem with the execution of the local automation service. In some embodiments, the centralized service detects completion of execution of the local automation service. In some embodiments, the centralized service determines that a second service is to be delivered to the device upon completion of the first service. In some embodiments, the centralized service detects a communication from the user of the device, such an IM message indicating needed further support or service. In some embodiments, the centralized service receives identification that support or service on the device is to be escalated. In some embodiments, from monitoring the delivery of service or support to the device, the centralized service determines to escalate support or service to the device.

In some embodiments, upon the service to the device being escalated, the centralized service may determine to deliver an escalated set of one or more services that may correspond to or be represented by one or more local automation services. The centralized service may determine via the entitlement engine and database whether or not the user is entitled to such escalated services. If the user is entitled to such services, the support UI may display and/or enable a UI widget corresponding to the set of one or more escalated services. If the currently assigned technician does not have the capabilities or certifications to perform the escalated service, the support UI may hide and/or disable the UI widget corresponding to the escalated services.

In some embodiments, the centralized service may determine to deliver a second or subsequent services to the device. The centralized service may determine via the entitlement engine and database whether or not the user is entitled to such second or subsequent services. If the user is entitled to such services, the support UI may display and/or enable a UI widget corresponding to the set of one or more second or subsequent services. If the currently assigned technician does not have the capabilities or certifications to perform the second or subsequent service, the support UI may hide and/or disable the UI widget corresponding to the second or subsequent services.

For the escalated, second or subsequent services, the centralized service may determine via the technician database whether or not the currently assigned technician has capabilities and/or certifications at a predetermined level or threshold to provide or deliver these services. In some embodiments, the centralized service may determine via the technician database whether or not a newly assigned or to be assigned technician has capabilities and/or certifications at a predetermined level or threshold to provide or deliver these services. If the technician is of appropriate capabilities and/or certifications, the support UI may display and/or enable a UI widget corresponding to the set of one or more services. Based on entitlement of the user and the technicians capabilities and/or certifications, the support UI may display and/or enable a UI widget corresponding to a second set of services for the same or different technician.

H. Systems and Methods for Providing a Hierarchy of Services

Figure 13A:
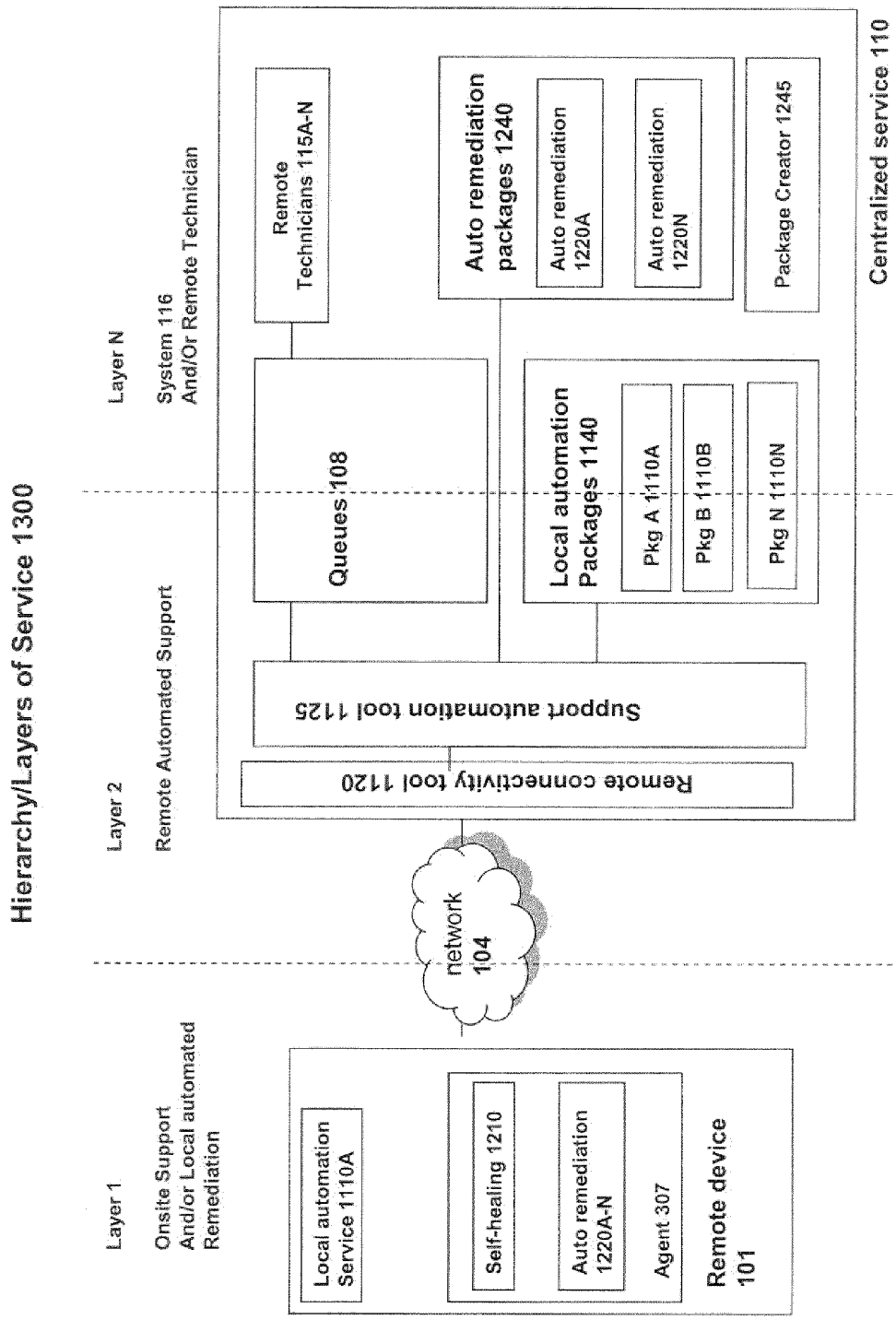
FIG. 13A is a block diagram that depicts an embodiment of a system for a hierarchy of services.
Figure 13B:
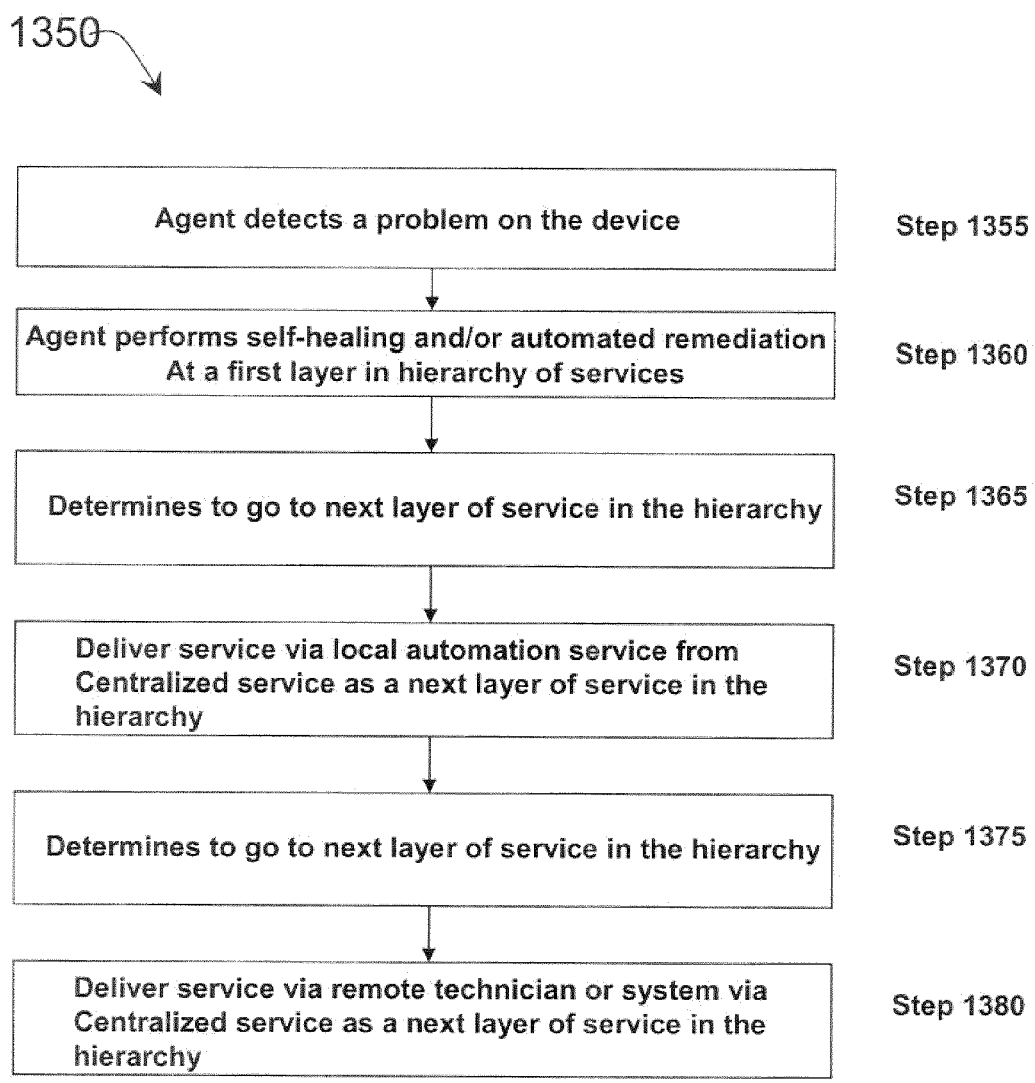
FIG. 13B is a flow diagram that depicts an embodiment of a method for providing a hierarchy of services.

Referring now to FIGS. 13A and 13B, systems and methods of the present solution provide for the delivery of a hierarchy or layers of services to a device via localized automation services and services delivered remotely via the centralized service. As depicted in FIG. 13A, embodiments of the present solution provide a hierarchy or layers of service

1300 that may include a first layer referred to as layer 1, a second layer referred to as layer 2 and any one or more subsequent layers referred to as layer N. The first layer in the multiple layers of the hierarchy may include those services performed on the desktop of the device to which support is being provided. Layer 1 service may be provided an agent on the desktop that performs self-healing and automated remediation of problems or issues detected on the device. Layer 1 service may also be provided by local onsite support, such as via a technician dispatched from the centralized service or the user of the device performing support with assistance from the agent or the centralized service. Layer 2 or the next layer of service in the hierarchy may be provided by the support automation tool of the centralized service that automatically delivers local automation packages to perform services on the remote device. The centralized service may deliver any one or more of such packages to perform or provide any number of services to the remote device in an automated manner. Layer 3 or the next layer of service in the hierarchy may be provided by via any system 116, such as a third party provider system, or via any one or more remote technicians who connect remotely via the remote connectivity tool to the device to perform support and services on the device. Such remote technicians may also be third party services providers who gain access to the device via the centralized service and the remote connectivity tool.

Referring now to FIG. 13A, embodiments of a system for providing a hierarchy or layers of service 1300 is depicted. In brief overview, as described above, the hierarchy or layers of service 1300 may include layers 1 through layer N. Services for each of these layers may be provided and/or implemented via a combination of the agents and centralized service components described herein. A remote device 101 may be in communication via a network 104 with a centralized service 110. The remote device may include an agent 307, such as an agent downloaded or provided by the centralized service via the network 104. The agent may 207 may include self-healing capabilities and functionality 1210. The agent may also include automated remediation tools or packages 1220A-N to perform local automated remediation of problems on the device detected by the agent. The agent may obtain or be configured with these packages 1220A-N via the centralized service, which stores a plurality of automated remediation packages 1240. The agent with the self-healing capabilities and automated remediation may provide or implement layer 1 in the hierarchy. A package creation tool 1245 may be used to design, create and/or configure any one or more automated remediation packages.

The centralized service 110 may include a remote connectivity tool 1120 for establishing remote connectivity to the device 101. Via the remote connectivity, the centralized service may deliver a plurality of different services via automated services and remote technicians. A support automation tool 1125 of the centralized service may automatically determine one or more local automation services 1110A-1110N to deliver to the remote device and automatically communicate these local automation service to perform services on the device. Layers 2 and subsequent layers may be provided by the support automation tool and delivery of one or more local automation packages to the remote device. A package creation tool 1245 may be used to design, create and/or configure any one or more local automation packages.

Via the remote connectivity, the centralized service may deliver a plurality of different services via remote technicians 115A-115N. A service request may be submitted to a work queue 108A-N for a remote technician to select and work on. Upon working on the service request, the remote technician may connect to the device via the remote connectivity of the remote connectivity tool 1120 and perform one or more services. In some cases, a service request may be submitted to a work queue 108 for a system 116 or for third party service personnel. The system and third party service personnel may remotely access the device via the remote connection of the remote connectivity tool and via the centralized service. As such, Layer N may be provided by remote technicians dispatched or provided via the centralized service and/or one or more systems or third party service personnel.

In further details, layer 1 service may be provided via the agent 307. The agent may comprise any of the embodiments of the agent previously described herein, such as but not limited to in conjunction with FIG. 1 and FIG. 2. The agent may further designed and constructed to implement proactive solutions to incidents automatically. The agent may automatically and/or actively monitor the device, including configuration of hardware and software and changes to the same. The agent may monitor the device to discover, diagnose and remediate common, reoccurring problems (e.g., network connectivity, printer access, etc.). The agent may monitor the device to ensure system settings are consistent with any policies such as policies regarding the firewall being enabled, virus protection being up-to-date, etc. These policies may be set by the entity controlling the device. These policies may be set by the centralized service. These policies may be set by a user of the device, such as an administrator level user of the device.

Responsive to monitoring, the agent may detect an issue and take the appropriate actions to resolve the issue, which may referred to as proactive Self-healing 1210. Self-healing may be used to resolve common, reoccurring problems before those problems affect the end-user and result in a request for service, such as via the centralized service. As a result of automated self-healing, call deflection rates may increase, which may depend on the environment and service desk analytics.

Self-healing functions 1210 may include an application, program, library, service, script, process, task or any type and form of executable instructions executable or executing on a device. Self-healing may include rules, logic, functions or operations to perform one or more actions to create, edit, modify, update or change the configuration of any software and/or hardware of the device. Self-healing actions may be those actions that can be performed or executed without user permission, user input or user assistance. Self-healing may execute and operate without user interaction. Self-healing may execute transparently to the user. Self-healing may execute seamlessly and transparently to the operate of the device or user of the device by the user.

Self-healing may automatically repair the installation of any software or application on the device. Self-healing may automatically reset or restore the configuration of any software or application on the device. Self-healing may automatically reset or restore the profile of any user on the device. Self-healing may automatically adjust the use or allocation of any resources (CPU, memory or storage) used by the user or made available by the device. Self-healing may automatically release, free or optimize any resource, such as freeing up unused memory, killing defunct process or defragmenting storage. Self-healing may automatically backup any data or files on the device. Self-healing may automatically update to or install a predetermined version of software or application on the device. Self-healing may automatically restore, repair, update, modify or adjust the configuration of any software or hardware on the device to correspond to or in accordance with any one or more polices or rules. Self-healing may be condition driven and perform the predetermined actions upon detection or confirmation of one or more conditions, such as the state or version of the configuration of software and hardware on the device.

If remediation is necessary or desired, the agent may be designed and constructed to automatically take corrective actions to remediate the problem with or without the end-users involvement, such as via automated remediation tools 1220A-1220N (generally referred to as auto or automated remediation 1220). In some embodiments, an automation remediation tool may comprise any embodiments of the local automation service described herein. Each of the automated remediation tools may comprise modular, configurable set of instructions to perform a set of actions to remediate an issue, perform a corrective action or provide a solution to a problem. An automated remediation tool may comprise any type and form of executable instructions, such as scripts. An automated remediation tool may comprise any type and form of wizard or guided screens to take a user through a series of input and/or actions. An automated remediation tool may comprise any type and form of installer or installation wizard. An automation remediation tool may comprise any type and form of user interface to interact with a user if necessary or otherwise to receive user input and/or confirmation.

In some embodiments, each of the automation remediation tools may perform a predetermined remediation or set of predetermined remediations. In some embodiments, an automated remediation tool may perform a predetermined set of one or more diagnostic routines. In some embodiments, an automated remediation tool may perform any functionality or service of the self-healing. In some embodiments, an automated remediation tool may perform any self-healing that requires user input or confirmation. In some embodiments, an automated remediation tool comprises any one or more actions to be performed on the device that may disrupt, interrupt or change operation of the device. In some embodiments, an automated remediation tool comprises any one or more actions to be performed on the device that may affect use of the device by the user. In some embodiments, an automated remediation tool comprises any one or more actions to be performed on the device that may requires a choice, selection or decision by the user. The automated remediation may be condition driven and perform the predetermined actions upon detection or confirmation of one or more conditions, such as the state or version of the configuration of software and hardware on the device.

The agent, via the self-healing and/or automated remediation may perform or provide any of the following functionality. The agent may detect and address connectivity problems, reset proxy settings, connect to network printer, identify and resolve device conflicts, such as those that occur during mobile device synchronization. The agent may monitor and reset application and configuration data to meet policy or organization standards, such information technology department standards. The agent may ensure anti-virus software running and up to date, determine firewalls are correctly activated, confirm trusted URLs are up to date and verify standard background applications are installed and active. The agent may ensure successful initial installation, set-up, and activation, prepare for new version of an application, install local or network printer and configure VPN access. The agent may perform routine maintenance to optimize system performance, such as perform routine file clean up, monitor and defrag disk capacity, and monitor memory usage and automatically adjust virtual memory settings. The agent may simplify "how to" issues such as reset passwords, set up and activate new accounts and personalize desktops. The agent may detect and repair application issues, such as when applications will not launch or unexpectedly shut down, applications freeze or won't respond or when a user receives error messages related to file corruption or connectivity. Any of the above functionality may be performed by the self-healer to the extent the problem does not require remediation or user input, confirmation or assistance. Any of the above functionality may be performed by one or more automated remediation tools.

The agent may be designed and constructed to interface or communicate with the centralized service to create, track and modify an incident report or service call. The agent may update incident or service records with data and information related to the problem, self-healing and/or automated remediation on the device. The agent may update incident or service records with data and information related to any actions performed by the agent, such as via self-healing and/or automated remediation on the device. The agent may update incident or service records with data and information related to resolution of the problem and/or solution to the problem.

The agent may be designed and constructed to identify or determine when human assistance is needed or when the problem may not be resolved by the self-healing and/or auto remediation of the agent. Responsive to such identification or determination, the agent may automatically generate and transmit a request to the centralized service. In some embodiments, responsive to the identification or determination, the agent may prompt the user to send a request to the centralized service. In some embodiments, responsive to the identification or determination, the agent automatically establishes a communication channel, connection or application with the centralized service, such as a chat window, instant messenger or email.

In some embodiments, the agent includes a portion of the centralized service. In some embodiments, the agent is programmatically connected to the centralized service. In some embodiments, the agent makes one or more API calls to interface to the centralized service to request service. In some embodiments, the agent sends a message or makes an API call to the centralized service to initiate, launch, call or caused to be delivered one or more services from the centralized service. In some embodiments, the agent sends a message or makes an API call to the centralized service initiate, launch, call or caused to be delivered one or more layer 2 or layer N services from the centralized service. In some embodiments, the agent is programmatically automated to deliver layer 1 services to a predetermined point or event and to call, initiate or launch one or more layer 2 or layer N services.

The package creator 1245 may comprise an application, tool, program, library, service, process, task or any type and form of executable instructions executable on a device. The package creator may provide a user interface and logic, functions and operation to design, construct and/or configure any one or more automated functions, such as problem diagnostics and problem resolution. The package creator may provide a user interface and logic, functions and operation to design, construct and/or configure any one or more of the self-healing functionality, automated remediation or local automation packages. The package creator may provide a user interface and logic, functions and operation to design, construct and/or configure any one or more conditions or prerequisites for the self-healing functionality, automated remediation or local automation service, such as the state or version of configuration of software or hardware on the device. The package creator may store the design, construction and configuration for the self-healing functionality, automated remediation or local automation service to a database or as files stored on a device, such as a server of the centralized service. The package creator may create self-healing functionality, automated remediation or local automation services that are readable and processable by the agent. The package creator may create self-healing functionality, automated remediation or local automation services that are executable by the device or stand-alone executables.

Any portion or component of the centralized service may be designed, constructed and/or configured to operate and respond according to the hierarchy of services 1300. In some embodiments, the intelligent switch, remote connectivity tool and/or support automation tool may be designed and constructed to understand and operate according to what layer in the hierarchy is currently being performed and when to transition form one layer to the next layer. For example, the intelligent switch or support automation tool may be informed when layer 1 service in the hierarchy is being performed by the agent and when a layer 2 service is requested or required. In some embodiments, the service compiler previously described herein may aggregate or compile services in accordance with the hierarchy of services 1300, such as in layers of service. The centralized service may package or provide a set of services in accordance with the hierarchy of services and any of the embodiments of the systems and methods described herein may operate in accordance with or responsive to the hierarchy of services. The centralized service may perform each service in the hierarchy and any transitions between layers using or via any embodiments of the systems and methods described in connection with FIGS. 12A and 12B. As such, the layers of service may be provided based on user entitlement and/or remote technician capabilities and/or certifications.

Referring now to FIG. 12B, embodiments of a method for delivering a hierarchy of services is depicted. In brief overview of the method 1350, at step 1355, the agents detects a problem on a device. At step 1360, the agents performs self-healing and/or automated remediation at a first layer in the hierarchy of services. At step 1365, the agent or centralized service determines to go to a next layer of service in the hierarchy. At step 1370, the centralized service delivers a next layer of service via one or more local automation services. At step 1375, the centralized service determines to go to a next layer of service in the hierarchy. At step 1380, the centralized service delivers a next layer of service in the hierarchy via a remote technician and/or a system 116.

In further details, at step 1355, the agent executing on a device detects any one or more problems or issues on the device. The agent may be automatically downloaded and installed by the centralized service to the device, such as based on user login or registration with the centralized service. The agent may be seamlessly and transparently downloaded and installed on the device. In some embodiments, the user of the device downloads and installs the agent. In some embodiments, a remote technician may download and install the agent. The agent automatically monitors the configuration of software and hardware on the device and any changes thereto. The agent may detect that there is a change in the configuration that is not in accordance with a policy or rule. The agent may operate as a layer 1 service in the hierarchy of services. The centralized service may deliver, provide or operate the agent as a first layer in the hierarchy of services. In a compilation or aggregation of services by the centralized service, the agent may provide or is delivered, installed or executed to provide a first layer of service or first line automated support.

At step 1360, responsive to the detection, the agent may perform self-healing and/or automaton remediation on the device. If the problem or issue is the type of which may be self-healed, the agent may execute or operate the self-healing functions to automatically and seamless address, resolve or fix the problem or issue on the device. If the problem or issue is the type which requires remediation or for which remediation is desired, the agent may execute one or more automated remediations on the device. In some embodiments, the agent first performs self-healing and if a problem or issues persists or a new problem or issue arises, the agent next performs automated remediation. In some embodiments, the agent perform self-healing responsive to user entitlement as described in connection with FIGS. 12A and 12B. In some embodiments, the agent performs automated remediation responsive to user entitlement as described in connection with FIGS. 12A and 12B. In some embodiments, the agent performs self-healing and/or automated remediation responsive to a level of subscription or service assigned to or purchased for the user. In some embodiments, the agent performs self-healing and/or automated remediation responsive to a compilation of services for layer 1 of a hierarchy of services determined, provided or recommended by the centralized service.

At step 1365, an agent, user or the centralized service determines that a next level of service in the hierarchy of services is to be provided or delivered to the device. In some embodiments, the agent determines that self-healing and/or automated remediation has not solved the problem or that an issue or problem persists. In some embodiments, the agent determines that the self-healing and/or automation remediation will not solve the problem or address the issue. In some embodiments, a remote technician determines that a service other than self-help or automated remediation is needed, suggested or recommended to be performed on the device. In some embodiments, a user of the device requests to escalate support or service on the device. In some embodiments, a user of the device requests another service on the device. In some embodiments, a user of the device requests additional service on the device. In some embodiments, the agent determines that the first layer of service has been completed and the next service layer should be performed. In some embodiments, the agent determines that a result or status of the first layer of service has reached a predetermined threshold or event and the next service layer should be performed. In some embodiments, the agent determines that performance or execution of the first layer of service has reached a predetermined threshold or event and the next service layer should be performed. The user may send an electronic communication or request for service to the centralized service, such as a request to perform a next, additional or different service. The agent may send an electronic communication or request for service to the centralized service, such as a request to perform a next, additional or different service. The agent may interface or communicate programmatically with the centralized service to initiate, launch, call or request to deliver a next service layer in the hierarchy of services.

At step 1370, the centralized service, such as via the support automation tool, may deliver one or more local automation services to the device. Responsive to receipt of a request, such as from the agent or the user, the centralized service may automatically identify one or more services to perform on the device. The centralized service may automatically identify the type of work from the request and automatically determine one or more services corresponding to the type of work. For the one or more services, the centralized service may automatically identify or determine one or more local automation services corresponding to the service or otherwise designed and constructed to perform the desired service. The centralized service may automatically deliver, transmit or communicate the one or more local automation services via a remote connection to the device provided via the remote connectivity tool. The agent on the device may receive and execute the local automation services on the device. In some embodiments, the remote connectivity tool automatically executes the local automation service(s) on the device. In some embodiments, the local automation service(s) are self-installed and/or self-executed on the device.

The centralized service may determine which local automation services provide a predetermined set of services in a compilation services to be provided by the centralized service to the user or the device. The centralized service may determine which local automation services provide a predetermined set of services in a layer of service in the hierarchy to be provided by the centralized service to the user or the device. The centralized service may determine which local automation services to provide at a next layer of services in the hierarchy based on user entitlement, such as using any of the systems and methods described in connection with FIGS. 12A and 12B. The centralized service may determine which local automation services to provide at a next layer of services in the hierarchy based on information, data or diagnostics provided by or performed by the agent for the first layer of services. The centralized service may determine which local automation services to provide at a next layer of services in the hierarchy based on information, data or diagnostics provide by or performed by an onsite technician for the first layer of services. The centralized service may determine which local automation services to provide at a next layer of services in the hierarchy based on information, data or diagnostics provided by or performed by a user of the device for the first layer of services. For example, the agent may assist a user of the device to identify and collect data and information and to perform diagnostics on the device. In some embodiments, the agent or user of the device requests escalation of support or service on the device to trigger a transition to a next layer of service in the hierarchy.

At step 1375, a user of the device, remote technician or the centralized service determines that a next level of service in the hierarchy of services is to be provided or delivered to the device. In some embodiments, a remote technician determines that execution of a local automation service did not resolve the problem or issue. In some embodiments, a remote technician determines that a service other than the service provided by the local automation service is needed, suggested or recommended to be performed on the device. In some embodiments, a remote technician requests to escalate support or service on the device. In some embodiments, the centralized service determines to escalate support or service on the device. In some embodiments, a user of the device requests another service on the device. In some embodiments, a user of the device requests additional service on the device. In some embodiments, the support automation tool determines that a second layer of service has been completed and the next service layer should be performed. In some embodiments, the support automation tool determines that a result or status of the second layer of service has reached a predetermined threshold or event and the next service layer should be performed. In some embodiments, the support automation tool determines that performance or execution of the second layer of service has reached a predetermined threshold or event and the next service layer should be performed. The user may send an electronic communication or request for service to the centralized service, such as a request to perform a next, additional or different service. The support automation tool may send an electronic communication or request for service to the centralized service, such as a request to perform a next, additional or different service. The support automation tool may interface or communicate programmatically with the centralized service to initiate, launch, call or request to deliver a next service layer in the hierarchy of services. The support automation tool may automatically initiate, launch or execute a next service layer in the hierarchy of services.

At step 1380, the centralized service may deliver support via one or more remote technicians and/or systems 116 to the device. The centralized service may determine that the next layer of service in the hierarchy of services, which may be a compilation of services, is to be provided by a remote technician. The centralized service may determine that the next layer of service in the hierarchy of services, which may be a compilation of services, is to be provided by a third party service provider. The centralized service may determine that the next layer of service in the hierarchy of services, which may be a compilation of services, is to be provided by a system 116. The centralized service may determine that the next layer of service in the hierarchy of services based on user entitlement, such as via any of the systems and methods described in connection with FIGS. 12A and 12B. The centralized service may determine that the next layer of service in the hierarchy of services based on data, information or diagnostics received from execution of a local automation service. The centralized service may determine that the next layer of service in the hierarchy of services based on data, information or diagnostics received from a remote technician.

In some embodiments, the centralized service may place a work order or item in a queue 108 for a remote technician from a pool of remote technicians to select and work on the item. In some embodiments, the centralized service may forward the service request to a remote technician. In some embodiments, the centralized service may place a work order or item in a queue 108 for an onsite technician from a pool of onsite technicians to select and work on the item. In some embodiments, the centralized service may forward the service request to an onsite technician. In some embodiments, the centralized service may place a service request in a queue of a third party service provider. In some embodiments, the centralized service may place a service request in a queue of a system 116, such as a support automation tool or centralized service of another party. The service request may be for a new or additional service in the next layer of services in the hierarchy of services. The remote agent, system or third party may access and perform the service via the centralized service. The remote agent, system or third party may access the device via the remote connection provided by the remote connectivity tool to the device.

What is claimed:

1. A method for providing a hierarchy of automated local and remote support services to a device, the method comprising:
    (a) detecting, by an agent configured and executing on a device, a problem to be remediated on the device;
    (b) performing, by the agent responsive to the detection, an automated remediation of the detected problem on the device;
    (c) determining, by a centralized service operating on one or more servers remote to the device responsive to receiving a request for support on the device, a type of work to perform on the device, the centralized service identifying a local automation package that is configured to execute on the device to perform the type of work independent of the agent; and
    (d) communicating, automatically by the centralized service via a remote connectivity tool providing a remote connection to the device via which the centralized service interacts with the device, the local automation package to execute on the device to perform the type of work independent of the agent.

2. The method of claim 1, wherein step (a) further comprises detecting, by the agent, the problem with one or more of the following: network connectivity, compliance with a policy, resource usage and application issues.

3. The method of claim 1, wherein step (a) further comprises monitoring, by the agent, a configuration of hardware and software on the device.

4. The method of claim 1, wherein step (b) further comprises prompting, by the agent, a user of the device to select a self-healing automation tool to remediate the problem.

5. The method of claim 1, wherein step (b) further comprises executing, by the agent, a self-healing automation tool to remediate the problem.

6. The method of claim 1, wherein step (b) further comprises receiving, by the agent, from the centralized service a self-healing automation tool to remediate the problem.

7. The method of claim 1, wherein step (c) further comprises determining automatically, by the centralized service responsive to the request, a type of work for the request and the local automation package corresponding to the type of work.

8. The method of claim 1, wherein step (c) further comprises communicating, automatically by a support automation tool of the centralized service, the local automation package to the remote device without interaction from a remote support agent.

9. The method of claim 1, wherein step (c) further comprises establishing, automatically by the centralized service, the remote connection via the remote connectivity tool to the remote device.

10. The method of claim 1, wherein step (d) further comprises transferring, automatically by the centralized service, access via the remote connection to the device to a remote support agent responsive to a predetermined event associated with execution of the local automation package.

11. The method of claim 1, wherein step (d) further comprises transferring, automatically by the centralized service, access via the remote connection to the device to a remote support agent responsive to completion of the type of work via the local automation package.

12. A system for providing a hierarchy of automated local and remote support services to a device, the system comprising:

an agent configured and executing on a device, the agent detecting a problem to be remediated on the device and performing, responsive to the detection, an automated remediation of the detected problem on the device;

a centralized service operating on one or more servers remote to the device responsive to receiving a request for support on the device;

a support automation tool of the centralized service determining a type of work to perform on the device and identifying a local automation package that is configured to execute on the device to perform the type of work independent of the agent;

a remote connectivity tool of the centralized service establishing a remote connection to the device via which the centralized service interacts with the device; and wherein the support automation tool automatically communicates, via the remote connection to the device established by the remote connectivity tool, the local automation package to execute on the device to perform the type of work independent of the agent.

13. The system of claim 12, wherein the agent detects the problem with one or more of the following: network connectivity, compliance with a policy, resource usage and application issues.

14. The system of claim 12, wherein the agent monitors a configuration of hardware and software on the device.

15. The system of claim 12, wherein the agent prompts a user of the device to select a self-healing automation tool to remediate the problem.

16. The system of claim 12, wherein the agent executes a self-healing automation tool to remediate the problem.

17. The system of claim 12, wherein the agent receives from the centralized service a self-healing automation tool to remediate the problem.

18. The system of claim 12, wherein the support automation tool determines a type of work for the request and the local automation package corresponding to the type of work.

19. The system of claim 12, wherein the support automation tool automatically communicates the local automation package to the remote device without interaction from a remote support agent.

20. The system of claim 12, wherein the remote connectivity tool automatically establishes, responsive to the request, the remote connection the device.

21. The system of claim 12, wherein the centralized service automatically transfers access via the remote connection to the device to a remote support agent responsive to a predetermined event associated with execution of the local automation package.

22. The system of claim 12, wherein the centralized service automatically transfers access via the remote connection to the device to a remote support agent responsive up completion of the service via the local automation package.

* * * * *